(12) United States Patent
Adachi

(10) Patent No.: US 11,968,592 B2
(45) Date of Patent: Apr. 23, 2024

(54) POSITION DETERMINATION SYSTEM, POSITION DETERMINATION APPARATUS, POSITION DETERMINATION METHOD, POSITION DETERMINATION PROGRAM, AND COMPUTER-READABLE STORAGE MEDIUM AND STORAGE DEVICE

(71) Applicant: PaylessGate Corporation, Osaka (JP)

(72) Inventor: Yasuhiko Adachi, Osaka (JP)

(73) Assignee: PAYLESSGATE CORPORATION, Osaka (JP)

( * ) Notice: Subject to any disclaimer, the term of this patent is extended or adjusted under 35 U.S.C. 154(b) by 390 days.

(21) Appl. No.: 17/285,382

(22) PCT Filed: Oct. 11, 2019

(86) PCT No.: PCT/JP2019/040332
§ 371 (c)(1),
(2) Date: Apr. 14, 2021

(87) PCT Pub. No.: WO2020/080314
PCT Pub. Date: Apr. 23, 2020

(65) Prior Publication Data
US 2021/0321223 A1    Oct. 14, 2021

(30) Foreign Application Priority Data

Oct. 15, 2018 (JP) ................. 2018-194488

(51) Int. Cl.
*H04B 17/318* (2015.01)
*H04L 9/08* (2006.01)
(Continued)

(52) U.S. Cl.
CPC .......... *H04W 4/029* (2018.02); *H04B 17/318* (2015.01); *H04L 9/0825* (2013.01);
(Continued)

(58) Field of Classification Search
CPC ... H04W 4/029; H04W 4/023; H04W 12/068; H04W 12/069; H04W 12/041;
(Continued)

(56) References Cited

U.S. PATENT DOCUMENTS

| 5,796,827 A | 8/1998 | Coppersmith et al. |
| 6,981,157 B2 | 12/2005 | Jakobsson et al. |

(Continued)

FOREIGN PATENT DOCUMENTS

| EP | 1 811 719 | 7/2007 |
| EP | 1 926 335 | 5/2008 |

(Continued)

OTHER PUBLICATIONS

Non-Final Office Action dated Dec. 22, 2022 in related U.S. Appl. No. 17/285,549.

(Continued)

*Primary Examiner* — William Nealon
(74) *Attorney, Agent, or Firm* — Wenderoth, Lind & Ponack, L.L.P.

(57) ABSTRACT

A personal portable terminal includes a transmitter that transmits a position determination signal to be used for position determination to a position determination device, and a controller that controls the transmitter. The position determination apparatus includes a plurality of first and second receivers that are arranged at different first and second positions which are spaced at first and second distances away from the personal portable terminal, respectively, to receive the position determination signal transmitted by the transmitter, and a calculator that determines the position of the personal portable terminal based on a difference between an intensity of the position determination signal that is received by the first receivers and an intensity of the position determination signal that is received by the (Continued)

second receivers. The second distance is greater than the first distance.

19 Claims, 37 Drawing Sheets

(51) Int. Cl.
  *H04L 9/32* (2006.01)
  *H04W 4/02* (2018.01)
  *H04W 4/029* (2018.01)
  *H04W 12/041* (2021.01)
  *H04W 12/06* (2021.01)
  *H04W 12/069* (2021.01)
  *H04W 64/00* (2009.01)

(52) U.S. Cl.
  CPC ............ *H04L 9/0861* (2013.01); *H04L 9/088* (2013.01); *H04L 9/3234* (2013.01); *H04W 4/023* (2013.01); *H04W 12/041* (2021.01); *H04W 12/068* (2021.01); *H04W 12/069* (2021.01); *H04W 64/00* (2013.01)

(58) Field of Classification Search
  CPC .... H04W 64/00; H04B 17/318; H04L 9/0825; H04L 9/0861; H04L 9/088; H04L 9/3234
  See application file for complete search history.

(56) References Cited

U.S. PATENT DOCUMENTS

| | | | |
|---|---|---|---|
| 10,313,339 B1 | 6/2019 | Power et al. | |
| 11,164,409 B2 | 11/2021 | Han et al. | |
| 2002/0002066 A1* | 1/2002 | Pallonen | G01S 3/28 455/562.1 |
| 2003/0218570 A1 | 11/2003 | Moore et al. | |
| 2004/0022214 A1 | 2/2004 | Goren et al. | |
| 2008/0126804 A1 | 5/2008 | Zhang et al. | |
| 2008/0261622 A1* | 10/2008 | Lee | H04W 64/00 455/456.2 |
| 2010/0197271 A1 | 8/2010 | Yoshikawa et al. | |
| 2010/0317390 A1 | 12/2010 | Rekimoto | |
| 2011/0287784 A1* | 11/2011 | Levin | H04W 64/00 455/456.2 |
| 2012/0021768 A1 | 1/2012 | Rudland et al. | |
| 2012/0235812 A1 | 9/2012 | Maia et al. | |
| 2013/0176107 A1* | 7/2013 | Dumas | G07C 9/00571 340/5.61 |
| 2013/0217332 A1 | 8/2013 | Altman et al. | |
| 2014/0179338 A1* | 6/2014 | Shang | H04W 4/023 455/456.1 |
| 2015/0072618 A1 | 3/2015 | Granbery | |
| 2016/0094525 A1 | 3/2016 | Lin et al. | |
| 2016/0100311 A1 | 4/2016 | Kumar | |
| 2016/0198341 A1 | 7/2016 | Fransen | |
| 2017/0208631 A1 | 7/2017 | Freudiger et al. | |
| 2017/0272914 A1 | 9/2017 | Saito et al. | |
| 2017/0293012 A1 | 10/2017 | Motomura et al. | |
| 2017/0301160 A1 | 10/2017 | Somani et al. | |
| 2018/0013502 A1* | 1/2018 | Kitahara | H04B 17/318 |
| 2018/0068290 A1 | 3/2018 | Xia | |
| 2018/0124586 A1 | 5/2018 | Ikezaki et al. | |
| 2018/0167784 A1* | 6/2018 | Sute | H04W 4/023 |
| 2018/0317044 A1* | 11/2018 | Chen | G01S 5/02 |
| 2019/0028995 A1 | 1/2019 | Uchijima et al. | |

FOREIGN PATENT DOCUMENTS

| | | |
|---|---|---|
| EP | 3 118 820 | 1/2017 |
| JP | 10-41936 | 2/1998 |
| JP | 10-228524 | 8/1998 |
| JP | 2001-313972 | 11/2001 |
| JP | 2003-078962 | 3/2003 |
| JP | 2004-040775 | 2/2004 |
| JP | 2005-165976 | 6/2005 |
| JP | 2006-074487 | 3/2006 |
| JP | 2007-124466 | 5/2007 |
| JP | 2007-538265 | 12/2007 |
| JP | 2008-104029 | 5/2008 |
| JP | 2008-259183 | 10/2008 |
| JP | 2010-282322 | 12/2010 |
| JP | 4678184 | 4/2011 |
| JP | 2012-181595 | 9/2012 |
| JP | 2012-521557 | 9/2012 |
| JP | 2013-115570 | 6/2013 |
| JP | 2013-238965 | 11/2013 |
| JP | 2014-238599 | 12/2014 |
| JP | 2015-200504 | 11/2015 |
| JP | 5850270 | 2/2016 |
| JP | 2016-070838 | 5/2016 |
| JP | 2016-529841 | 9/2016 |
| JP | 2016-200561 | 12/2016 |
| JP | 2016-223854 | 12/2016 |
| JP | 2017-017491 | 1/2017 |
| JP | 2017-500822 | 1/2017 |
| JP | 2017-501620 | 1/2017 |
| JP | 2017-076993 | 4/2017 |
| JP | 2017-090284 | 5/2017 |
| JP | 2017-130923 | 7/2017 |
| JP | 2017-134711 | 8/2017 |
| JP | 2017-156125 | 9/2017 |
| JP | 2017-158009 | 9/2017 |
| JP | 2017-166889 | 9/2017 |
| JP | 2017-198567 | 11/2017 |
| JP | 2017-203756 | 11/2017 |
| JP | 2017-228989 | 12/2017 |
| JP | 2018-007204 | 1/2018 |
| JP | 6290104 | 3/2018 |
| JP | 2018-078578 | 5/2018 |
| JP | 2018-522333 | 8/2018 |
| JP | 6501330 | 4/2019 |
| KR | 10-2008-0041230 | 5/2008 |
| WO | 2007/026745 | 3/2007 |
| WO | 2010/135412 | 11/2010 |
| WO | 2013/076823 | 5/2013 |
| WO | 2013/126759 | 8/2013 |
| WO | 2015/031011 | 3/2015 |
| WO | 2015/034755 | 3/2015 |
| WO | 2016/045280 | 3/2016 |
| WO | 2016/103498 | 6/2016 |
| WO | WO2016/103498 | 6/2016 |
| WO | 2016/188281 | 12/2016 |

OTHER PUBLICATIONS

International Search Report dated Dec. 24, 2019 in International (PCT) Application No. PCT/JP2019/040332 with English translation.

D. Balfanz, G. Durfee, N. Shanker, D. Smetters, J. Staddon, H.C. Wong "Secret Handshakes from Pairing-Based Key Agreements", IEEE Symposium on Security and Privacy, 2003.

Y. Michalevsky, S. Nath, J. Liu, "MASHaBLE: Mobile Applications of Secret Handshakes over Bluetooth Le", MobiCom'16, 2016.

Alfred J. Menezes' Handbook of Applied Cryptography, CRC Press (1996.)

Extended European Search Report dated Sep. 7, 2022 in corresponding European Patent Application No. 19872378.5.

Japanese Notice of Reasons for Refusal dated Apr. 14, 2020 in corresponding Japanese Application No. 2020-504031 with English machine translation.

Suining He et al., "Contour-based Trilateration for Indoor Fingerprinting Localization", 2015, pp. 225-238.

International Search Report dated Dec. 24, 2019 in International Application No. PCT/JP2019/040257 with English translation.

Japanese Notice of Reasons for Refusal dated Apr. 21, 2020 in Japanese Application No. 2020-511418 with English translation.

Supplementary European Search Report dated Jul. 4, 2022 in corresponding European Patent Application No. 19872754.7

R. Pugazendi et al., "A Secured Model for trusted communication in Network using Zero Interaction authentication", 3rd International

(56) References Cited

OTHER PUBLICATIONS

Conference on Sensing Technology, Nov. 30-Dec. 3, 2008, Tainan, Taiwan, IEEE 2008, IEEE Xplore, pp. 374-378
Kiyoaki Komai et al., "Beacon-Based Multi-Person Activity Monitoring System for Day Care Center", The First IEEE International Workshop on PervAsive Technologies and care systems for sustainable Aging-in-Place, 2016, IEEE Xplore, pp. 1-6.

* cited by examiner

Distribution of Differences between Averaged Radio Wave Intensities Received by Two Sets of Receivers (Total Four) at Short and Long Distances (Two Receivers At Each Distance)

Three Elements of Authentication

Advance Phase

Advance Phase

POSITION DETERMINATION SYSTEM, POSITION DETERMINATION APPARATUS, POSITION DETERMINATION METHOD, POSITION DETERMINATION PROGRAM, AND COMPUTER-READABLE STORAGE MEDIUM AND STORAGE DEVICE

TECHNICAL FIELD

The present disclosure relates to a position determination system, a position determination apparatus, a position determination method, position determination program, and computer-readable storage medium and storage device.

BACKGROUND ART

One of known technologies to detect and measure a position of a mobile terminal, object, or the like can be provided by GPS (Global Positioning System). Also, to measure such a position even in buildings having walls through which GPS radio waves can hardly pass, known technique measures the position of a mobile terminal, etc. based on its conditions of wireless communication with base stations, access points, and the like.

Various types of such indoor positioning technique are known. Typical indoor positioning systems to locate a mobile terminal, etc. can be provided by Wi-Fi positioning, base-station positioning, acoustic positioning, Bluetooth positioning (BLE beacon), visible light positioning, camera image positioning, barometric pressure positioning, PDR (Pedestrian Dead-Reckoning), magnetic positioning, GPS, IMES (Indoor Messaging System), and the like. Among them, systems that use barometric pressure, PDR, the earth's magnetic field, wireless communication, and light can be used to measure positions of users in a touchless manner even when the users do not pick up their smartphone terminal, etc.

Also, known typical algorithms which measure such positions can be provided by triangulation which measures the intensity of radio waves or light, TOF which measures communication angle and time of periodic radio waves and light reflected from an object, algorithm which measures a position based on the relativity by using positional information on a plurality of highly accurate devices such as atomic clocks, PDR which predicts the movement directions and speeds of a mobile terminal, etc. using sensors such as accelerometer, gyroscope and geomagnetic sensor, so-called fingerprinting algorithm which previously creates a database of physical information uniquely identified by the environment and uses matching to measure a position, and the like (JP2008-104029A; JP2012-521557A; and He, Suining, Tianyang Hu, and S-H. Gary Chan. "Contour-based trilateration for indoor fingerprinting localization." Proceedings of the 13th ACM Conference on Embedded Networked Sensor Systems. ACM, 2015).

The physical systems and the algorithms are often selectively used together to measure positions. One of the wireless communication systems detects the comings and goings of terminals into and out of a beacon area by receiving beacon signals which are periodically transmitted by a base station, the terminals, and the like. One type of the beacon signals can be provided by BLE beacons which require very low power consumption to transmit a communication based on general-purpose BLE (Bluetooth Low Energy) standards and are produced at low cost. The BLE beacons require very low power consumption and have general versatility relative to other wireless standards. If people who bring their smartphone terminal, etc. can be acquired, identified, and recognized one by one within a short time with high accuracy by using the BLE beacons, it can be considered that automatic touchless operations by the BLE beacons can be used not only to determine the locations of people but also to replace actions required for authentication. For example, when a user approaches a door the door lock can be opened, that is, key can be replaced by the approaching action. In addition, actions of a user required for authentication can be replaced by the automatic touchless operations. To address this, efforts are put into improvement of position accuracy (JP2015-200504A; and JP2017-17491A).

For example, to ensure the security for payment authentication, a system which authorizes both a beacon base station and terminals (JP2017-501620A). However, the system does not link a payment with position measurement. For this reason, to determine a customer who completes a payment, his or her face is displayed on an electronic cash register or the like so that a store clerk visually determines the customer and hands over a paid item to him or her. In addition to this, although systems which authorize terminals which complete a payment by using NFC, two-dimensional bar codes, and the like have been proposed, a security system which links a payment with position measurement in a touchless manner is not provided.

It is an object of the present invention to provide a position determination system, a position determination apparatus, a position determination method, position determination program, and computer-readable storage medium and storage device capable of stably determining a position even in buildings.

SUMMARY OF INVENTION

A position determination system according a first aspect of the present invention includes a personal portable terminal that is to be carried by a person whose position is determined, and a position determination apparatus that determines the position of the personal portable terminal. The personal portable terminal includes a personal terminal side transmitter and a personal terminal side controller. The personal terminal side transmitter transmits a position determination signal to be used for position determination to the position determination apparatus. The personal terminal side controller controls the personal terminal side transmitter. The position determination apparatus includes a plurality of first and second position determination side receivers, and a position determination side calculator. The plurality of first and second position determination side receivers are arranged at different first and second positions which are spaced at first and second distances away from the personal portable terminal, respectively, to receive the position determination signal which is transmitted by the personal terminal side transmitter. The second distance is greater than the first distance. The position determination side calculator determines the position of the personal portable terminal based on a difference between an intensity of the position determination signal that is received by the first position determination side receivers and an intensity of the position determination signal that is received by the second position determination side receivers. According to this aspect, when the personal terminal side transmitter transmits the position determination signal, variation of intensities of the signal which are received by the position determination side receivers can be reduced by using difference between the received intensities of the position determination signal.

Therefore, the position of the personal portable terminal can be accurately measured within a short time.

In a position determination system according to a second aspect of the present invention, in addition to the aforementioned aspect, the position determination side calculator evaluates a conditional expression in which whether a difference between a radio wave intensity of the position determination signal that is received by the first position determination side receivers and a radio wave intensity of the position determination signal that is received by the second position determination side receivers is greater than a predetermined threshold is decided to determine the position of the personal portable terminal.

In a position determination system according to a third aspect of the present invention, in addition to any of the aforementioned aspects, the position determination side calculator evaluates a conditional expression in which whether a difference between the average of radio wave intensities of the position determination signal that are received by the first position determination side receivers and the average of radio wave intensities of the position determination signal that are received by the second position determination side receivers is greater than a predetermined threshold is decided to determine the position of the personal portable terminal.

In a position determination system according to a fourth aspect of the present invention, in addition to any of the aforementioned aspects, the personal terminal side controller directs the personal terminal side transmitter to transmit the position determination signal to the position determination apparatus when detecting that the personal portable terminal comes into an area within a predetermined distance (e.g., 10 and 100 meters) from the position determination apparatus. According to this aspect, before the user who carries the personal portable terminal reaches the position determination apparatus, the personal terminal side transmitter can be directed to transmit the position determination signal to the position determination apparatus. As a result, position determination operations between the personal portable terminal and the position determination apparatus can be smoothly executed.

In a position determination system according to a fifth aspect of the present invention, in addition to any of the aforementioned aspects, the system further includes an activation signal transmitter that is arranged at a position spaced at a predetermined distance (e.g., 10 and 100 meters) away from the position determination apparatus and transmits an activation signal to the personal portable terminal. The activation signal activates the transmission operation in which the personal terminal side transmitter transmits the position determination signal to the position determination apparatus. According to this aspect, prior to arrival of a user who carries the personal portable terminal at the position determination apparatus, the personal terminal side transmitter can be activated. As a result, position determination operations between the personal portable terminal and the position determination apparatus can be smoothly executed.

In a position determination system according to a sixth aspect of the present invention, in addition to any of the aforementioned aspects, the personal terminal side transmitter and the position determination side receiver can bidirectionally communicate with each other. In addition, the position determination side calculator performs authentication of the personal portable terminal based on the communication of the position determination side receiver with the personal terminal side transmitter. According to this aspect, the user who carries the personal portable terminal can be authenticated, and the position of the user can be detected.

In a position determination system according to a seventh aspect of the present invention, in addition to any of the aforementioned aspects, the personal portable terminal further includes a personal terminal side storage device that stores previously-assigned unique identification information. In addition, the personal terminal side controller can provide the unique identification information which is stored in the personal terminal side storage device and a one-time password that is uniquely provided to the unique identification information. The one-time password can be used only once when communicating with the position determination side receiver through the personal terminal side transmitter. Additionally, the position determination side calculator authenticates the identification information and the one-time password which are received from the personal terminal side transmitter through the position determination side receiver.

In a position determination system according to an eighth aspect of the present invention, in addition to any of the aforementioned aspects, the personal portable terminal further includes a personal terminal side clock that issues information relating to a time. In addition, the personal terminal side storage device stores a unique common key and a predetermined function. The unique common key is uniquely provided to the identification information which is provided to the personal portable terminal, and is previously exchanged between the personal portable terminal and the position determination apparatus. The predetermined function is used to issue the one-time password. Also, the position determination apparatus further includes a position determination side storage device, and a position determination side clock. The position determination side storage device stores the identification information which is provided to the personal portable terminal and the unique common key which is provided to the identification information so that the associated identification information and unique common key are associates with each other. The position determination side clock issues information relating to a time. In the transmission of the identification information and the one-time password by the personal portable terminal to the position determination apparatus, the personal terminal side controller obtains information relating to an issue time from the personal terminal side clock when the one-time password is issued. The personal terminal side controller applies the information to the predetermined function which is stored in the personal terminal side storage device.

The personal terminal side controller further encrypts the information which is obtained by the predetermined function with the common key which is stored in the personal terminal side storage device whereby issuing the one-time password. In addition, the position determination side calculator is configured to obtain a reception time by using the position determination side clock when the position determination side receiver receives the identification information and the one-time password from the personal terminal side transmitter, to retrieve the common key corresponding to the identification information from the position determination side storage device based on the received identification information, decrypt the one-time password by using the obtained common key, and obtain the information relating to the issue time to which the function is applied, to compare a difference between the information relating to the issue time that is obtained at one reception time and information relating to the one reception time with a difference between the information relating to the issue time that is obtained at another reception time and information relating to the another reception time, and to authenticate the personal portable terminal if the compared difference falls within a predetermined time range, or disable the authentication of the personal portable terminal if the compared difference falls out of the predetermined time range.

In a position determination system according to a ninth aspect of the present invention, in addition to any of the aforementioned aspects, the position determination side calculator stores the difference between the information relating to the issue time that is obtained at one reception time and information relating to the one reception time as authentication reference information in the position determination side storage device, and compares the difference between the information relating to the issue time that is obtained at another reception time and information relating to the another reception time with the authentication reference information which is saved in the position determination side storage device whereby performing the authentication of the personal portable terminal. According to this construction, because authentication reference information is held to be compared with data that is sequentially obtained after the authentication reference information is obtained, the data which is sequentially obtained in a series of communications can be easily authenticated.

In a position determination system according to a tenth aspect of the present invention, in addition to any of the aforementioned aspects, the authentication reference information which is saved in the position determination side storage device is deleted after a predetermined time period (e.g., 1 or 10 minutes, or 1 hour) elapses. According to this aspect, when a new communication starts, authentication reference information to be used as the reference of authentication is necessarily newly obtained. As a result, spoofing attacks can be prevented. Therefore, the security can be further improved.

In a position determination system according to an eleventh aspect of the present invention, in addition to any of the aforementioned aspects, the position determination side calculator makes a payment when authenticating the personal portable terminal.

In a position determination system according to a twelfth aspect of the present invention, in addition to any of the aforementioned aspects, the position determination apparatus further includes a position determination side controller that controls operations for restricting movement of the person who carries the personal portable terminal in accordance with the position of the personal portable terminal that is measured by the position determination side calculator. According to this aspect, a person who carries the personal portable terminal can be recognized while movement of the person can be restricted in accordance with the position of the person.

In a position determination system according to a thirteenth aspect of the present invention, in addition to any of the aforementioned aspects, the position determination apparatus is a gate including a door that opens/closes to control access of the person who carries the personal portable terminal. In addition, the position determination side controller controls opening/closing of the door. According to this aspect, it can be determined based on the recognition of a person who carries a personal portable terminal and the detected position whether the door of the gate which can restrict passage of the person is opened or closed.

In a position determination system according to a fourteenth aspect of the present invention, in addition to any of the aforementioned aspects, the personal terminal side transmitter and the position determination side receiver communicates through BLE, RFID, or Wi-Fi with each other.

In a position determination system according to a fifteenth aspect of the present invention, in addition to any of the aforementioned aspects, the personal portable terminal serves as a ticket of public transportation, and the position determination apparatus makes the authentication of the person who carries the personal portable terminal and a payment for the person's ticket.

A position determination system according to a sixteenth aspect of the present invention includes a personal portable terminal that is to be carried by a person whose position is determined, and a position determination apparatus that determines the position of the personal portable terminal. The personal portable terminal includes a personal terminal side transmitter, a personal terminal side controller, a personal terminal side storage device, and a personal terminal side clock. The personal terminal side transmitter bidirectionally communicates with the position determination apparatus. The personal terminal side controller controls the personal terminal side transmitter. The personal terminal side storage device stores unique identification information, a unique common key, and a predetermined function. The unique identification information is provided to the personal portable terminal. The unique common key is uniquely provided to the identification information which is previously exchanged between the personal portable terminal and the position determination apparatus. The predetermined function is used to issue the one-time password. The personal terminal side clock issues information relating to a time. Also, the personal terminal side controller includes a position determination side receiver, a position determination side calculator, a position determination side storage device, and a position determination side clock. The position determination side receiver bidirectionally communicates with the personal terminal side transmitter. The position determination side calculator performs authentication of the personal portable terminal based on the communication of the position determination side receiver with the personal terminal side transmitter. The position determination side storage device stores the identification information which is provided to the personal portable terminal and the unique common key which is provided to the identification information so that the associated identification information and unique common key are associates with each other. The position determination side clock issues information relating to a time. In addition, the personal terminal side controller can provide the unique identification information which is stored in the personal terminal side storage device and a one-time password that is uniquely provided to the unique identification information. The one-time password can be used only once when the communicating with the position determination side receiver through the personal terminal side transmitter. In addition, the position determination side calculator authenticates the identification information and the one-time password which are received from the personal terminal side transmitter through the position determination side receiver. In the transmission of the identification information and the one-time password by the personal portable terminal to the position determination apparatus, the personal terminal side controller obtains information relating to an issue time from the personal terminal side clock when the one-time password is issued, applies the information to the predetermined function which is stored in the personal terminal side storage device, and further encrypts the information which is obtained by the predetermined function with the common key which is stored in the personal terminal side storage device whereby issuing the one-time password. Additionally, the position determination side calculator is configured to obtain a reception time by using the position determination side clock when the position determination side receiver receives the identification information and the one-time password from the personal terminal side transmitter, to retrieve the common key corresponding to the identification information from the position determination side storage device based on the received identification information, decrypt the one-time password by using the obtained common key, and obtain the information relating to the issue time to which the function is applied, to compare a difference between the information relating to the issue time that is obtained at one reception time and information relating to the one reception time with a difference between the information relating to the issue time that is obtained at another reception time and information relating to the another reception time, and to authenticate the personal portable terminal if the compared difference falls within a predetermined time range, or disable the authentication of the personal portable terminal if the compared difference falls out of the predetermined time range. According to this aspect, the user who carries the personal portable terminal can be authenticated, and the position of the user can be detected.

A position determination apparatus according to a seventeenth aspect of the present invention is a position determination apparatus which determines the position of a personal portable terminal that is to be carried by a person whose position is determined. The position determination apparatus includes a plurality of first position determination side receivers, a plurality of second position determination side receivers, and a position determination side calculator. The plurality of first position determination side receivers are arranged at a first position which is spaced at a first distance away from the personal portable terminal to receive a position determination signal that is transmitted by the personal portable terminal through a personal terminal side transmitter to the position determination apparatus to determine the position of the personal portable terminal. The plurality of second position determination side receivers are arranged at a second position which is different from the first position and spaced at a second distance greater than the first distance away from the personal portable terminal. The position determination side calculator determines the position of the personal portable terminal based on a difference between an intensity of the position determination signal that is received by the first position determination side receivers and an intensity of the position determination signal that is received by the second position determination side receivers. According to this aspect, when the personal terminal side transmitter transmits the position determination signal, variation of intensities of the signal which are received by the position determination side receivers can be reduced by using difference between the received intensities of the position determination signal. Therefore, the position of the personal portable terminal can be accurately measured within a short time.

A position determination method according to an eighteenth aspect of the present invention is used in a position determination system which includes a personal portable terminal and a position determination apparatus. The personal portable terminal is to be carried by a person whose position is determined. The position determination apparatus determines the position of the personal portable terminal to determine the position of the personal portable terminal. The position determination method includes detection, transmission, reception and determination. In the detection, it is detected that the person who carries the personal portable terminal comes into an area within a predetermined distance from the position determination apparatus by using the personal portable terminal so that a personal terminal side transmitter is activated by using a personal terminal side controller. In the transmission, a position determination signal to be used for position determination is transmitted to the position determination apparatus through the personal terminal side transmitter by using the personal portable terminal. In the reception, the position determination signal which is transmitted by the personal terminal side transmitter is received through a plurality of first and second position determination side receivers that are arranged at different first and second positions which are spaced at first and second distances away from the personal portable terminal, respectively, by using the position determination apparatus. The second distance is greater than the first distance. In the determination, the position of the personal portable terminal is determined based on a difference between an intensity of the position determination signal that is received by the first position determination side receivers and an intensity of the position determination signal that is received by the second position determination side receivers by using a position determination side calculator included in the position determination apparatus. According to this aspect, when the personal terminal side transmitter transmits the position determination signal, variation of intensities of the signal which are received by the position determination side receivers can be reduced by using difference between the received intensities of the position determination signal. Therefore, the position of the personal portable terminal can be accurately measured within a short time.

In a position determination method according to a nineteenth aspect of the present invention, in addition to the aforementioned aspect, prior to the transmission of the position determination signal through the personal terminal side transmitter, the method further includes transmission of unique identification information and a one-time password, and authentication determination of the personal portable terminal by using the determination side calculator. In the transmission of unique identification information, unique identification information that is stored in a personal terminal side storage device included in the personal portable terminal and a one-time password that is uniquely provided to the unique identification information are transmitted. The one-time password can be used only once to the position determination side receiver by using the personal terminal side transmitter. In the authentication determination of the personal portable terminal, authentication of the personal portable terminal is performed based on the identification information and the one-time password by using the position determination side calculator. In addition, the transmission of the identification information and the one-time password by the personal portable terminal to the position determination apparatus includes obtainment of information relating to an issue time. In the obtainment of information relating to an issue time, information relating to an issue time when the one-time password is issued obtained by using the personal terminal side controller from a personal terminal side clock included in the personal portable terminal. The information is applied to a predetermined function that is stored in the personal terminal side storage device. The information which is obtained by the predetermined function is further encrypted with a common key that is stored in the personal terminal side storage device whereby issuing the one-time password. In addition, the authentication of the personal portable terminal based on the identification information and the one-time password by using the determination side calculator includes obtainment of a reception time, retrieval, comparison, and authentication of the personal portable terminal. In the obtainment of a reception time, a reception time is obtained by using the determination side clock when the determination side receiver receives the identification information and the one-time password from the personal terminal side transmitter. In the retrieval, the common key corresponding to the identification information is retrieved based on the received identification information. The one-time password is decrypted by using the obtained common key so that the information relating to the issue time to which the function is applied is obtained. In the comparison, a difference between the information relating to the issue time that is obtained at one reception time and information relating to the one reception time is compared with a difference between the information relating to the issue time that is obtained at another reception time and information relating to the another reception time. In the authentication of the personal portable terminal, the personal portable terminal is authenticated if the compared difference falls within a predetermined time range, or the authentication of the personal portable terminal is disabled if the compared difference falls out of the predetermined time range. According to this aspect, the user who carries the personal portable terminal can be authenticated, and the position of the user can be detected.

A position determination program according to a twentieth aspect of the present invention is a position determination program which is used in a position determination system including a personal portable terminal and a position determination apparatus. The personal portable terminal is to be carried by a person whose position is determined. The position determination apparatus determines the position of the personal portable terminal. The position determination program executes a computer to perform detection, transmission, reception and determination. In the detection, it is detected that the person who carries the personal portable terminal comes into an area within a predetermined distance from the position determination apparatus by using the personal portable terminal so that a personal terminal side transmitter is activated by using a personal terminal side controller. In the transmission, a position determination signal to be used for position determination is transmitted to the position determination apparatus through the personal terminal side transmitter by using the personal portable terminal. In the reception, the position determination signal which is transmitted by the personal terminal side transmitter is received through a plurality of first and second position determination side receivers that are arranged at different first and second positions which are spaced at first and second distances away from the personal portable terminal, respectively, by using the position determination apparatus. The second distance is greater than the first distance. In the determination, the position of the personal portable terminal is determined based on a difference between an intensity of the position determination signal that is received by the first position determination side receivers and an intensity of the position determination signal that is received by the second position determination side receivers by using a position determination side calculator included in the position determination apparatus. According to this aspect, when the personal terminal side transmitter transmits the position determination signal, variation of intensities of the signal which are received by the position determination side receivers can be reduced by using difference between the received intensities of the position determination signal. Therefore, the position of the personal portable terminal can be accurately measured within a short time.

A computer-readable storage medium or storage device according to a twenty-first aspect of the present invention the aforementioned program. The storage medium can be CD-ROM, CD-R, CD-RW, flexible disk, magnetic tape, MO, DVD-ROM, DVD-RAM, DVD-R, DVD+R, DVD-RW, DVD+RW, Blu-ray (registered trademark), magnetic disk such as HD DVD (AOD), optical disc, magneto-optical disk, semiconductor memory, other medium that can store the program. The program can be distributed in a form stored in the storage medium, and be also distributed through network such as the Internet (downloaded). The storage medium can include a device that can store the program, for example, a general-purpose device or special-purpose device on which the aforementioned program is installed in a form of executable software, firmware on the like. Processes or functions included in the program can be executed by the program software that can be executed by a computer. The processes of parts can be realized by hardware such as certain gate array (FPGA, ASIC, DSP), or a form of combination of program software and partial hardware module that realizes parts of elements of hardware.

DETAILED DESCRIPTION OF THE EMBODIMENT(S)

Figure 1:
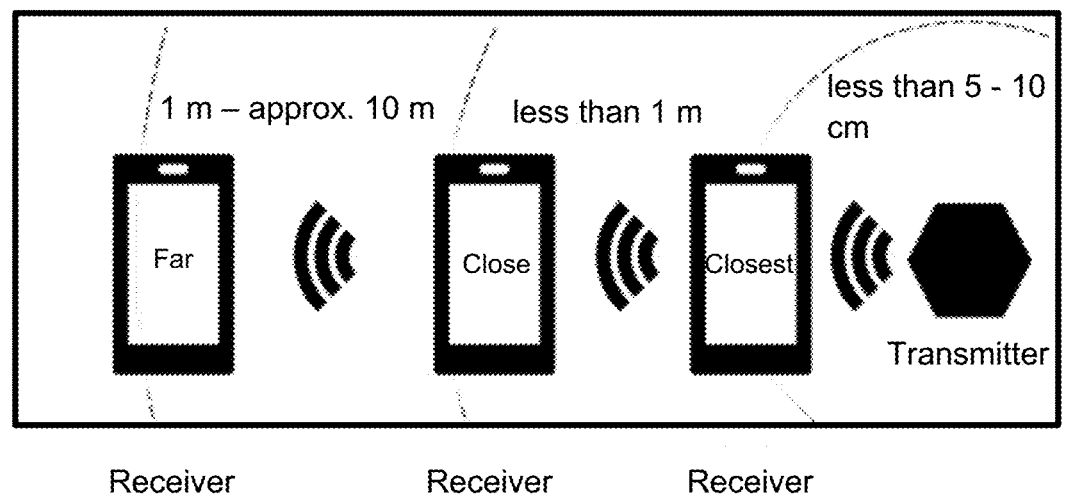
FIG. 1 is a conceptual illustration showing measurement of distances between a BLE transmitter and a receiver.

The following description will describe embodiments according to the present invention with reference to the drawings. In the following description, although terms for indicating particular directions or positions (e.g., "upper" and "lower", and other terms including these terms) will be used as necessary for ease of understanding the present with reference to the drawings, the technical scope of the present invention is not limited by these terms. Portions attached with the same reference sign in different drawings show the portions or members same as or similar to each other. The term "comprising" a member used in this specification means that the member is included both as a separate member and a unitary member. The term "comprising" a member used in this specification means that the member may be either a separate member or a unitary member.

It should be appreciated, however, that embodiments described below are illustrations of a position determination system, a position determination apparatus, a position determination method, position determination program, and computer-readable storage medium and storage device to give a concrete form to technical ideas of the invention, and a position determination system, a position determination apparatus, a position determination method, position determination program, and computer-readable storage medium and storage device of the invention are not specifically limited to description below. Unless otherwise specified, any dimensions, materials, shapes and relative arrangements of the parts described below are given as an example and not as a limitation. In addition, the description for one embodiment may be applied to other embodiments or examples. Additionally, the sizes and the arrangement relationships of the members in the drawings are occasionally exaggerated for ease of explanation.

The term "smartphone terminal" or "smartphone" refers not only to a smartphone but also to a terminal which has a communication function such as tablet, WIFI router, portable music player, and the like in this specification.

According to embodiments of the present invention, a position of a user who moves together with his or her smartphone terminal or the like can be recognized within a short time with high accuracy. For example, in the case in which smartphone terminals realize a ticket of public transportation, concert, or the like, users necessarily bring their smartphone terminal close to or in touch with an automatic ticket gate or entrance gate in the known art. However, users are required to pick up their smartphone terminal for the touch. For this reason, there is a problem that the gate cannot be opened when a user holds his or her baby or when a handicapped person cannot pick up his or her smartphone terminal for the touch. To address this, in the position determination system according to the embodiments, passage of users through an automatic ticket gate or entrance gate can be detected in a touchless manner by detecting their positions by using wireless communication. In addition, administration of comings and goings, and automatic payment can be realized by combination the passage detection and later-discussed user authentication function. For example, the position determination system can be applied to payment or the like in supermarkets, and convenience stores.

(Distance Measurement Method Using BLE)

Firstly, BLE beacon, a distance measurement method using the BLE beacon, and a position determination method using the BLE beacon, and a position determination method according to an embodiment of the present invention will be described. A one-directional authentic method according to an embodiment of the present invention will be then described.

(BLE Beacon)

A BLE beacon is first described. The BLE beacon is manufactured under Bluetooth standards 4.0 and later. BLE is an abbreviation of Bluetooth Low Energy. BLE operates in 2.4 GHz band but has two communicate modes of broadcasting and connection modes. In the broadcasting mode, one BLE device one-directionally broadcasts data to every BLE device around it (transmits data in an open manner). In this communication mode, the device transmits data within a certain fixed radio wave intensity range from the temporal viewpoint. On the other hand, in the connection mode, one BLE device bidirectionally communicates (transmits and receives) data with (to and from) another BLE device in a private manner. In this communication mode, the device on the transmission side temporally varies radio wave intensity to adjust the radio wave intensity to a fixed value. In the both communication modes, devices transmits data within a very short time (e.g., sub-micro seconds) at a fixed period (e.g., several or several tens micro seconds) so that their power consumption can be greatly reduced.

(Distance Measurement Method Using BLE Beacon)

A typical distance measurement method using a BLE beacon is now described. FIG. 1 shows measurement of distances in which a BLE beacon and a smartphone terminal are used as a BLE transmitter and a BLE receiver. In the broadcasting mode, the BLE transmitter transmits a radio wave signal at a fixed radio wave intensity which does not temporally vary (for example, −43 dBm, etc. on average). The radio wave intensity decreases with the distance from the BLE transmitter. Accordingly, when the radio wave intensity that is provided from the BLE transmitter is included in the radio wave signal in the transmission of the radio wave signal, an attenuation (propagation loss) of the radio wave intensity can be obtained by measuring a received radio wave intensity RSSI (Received Signal Strength Indication) so that the distance from the BLE transmitter to be measured can be calculated. Here, the relational expression between propagation loss and distance is shown in Equation 1.

$$L = 10 \log_{10} d^n \qquad \text{Equation 1}$$

(where L is propagation loss [dB], d is distance [m], and n is attenuation index)

Although the attenuation index n is 2 in a vacuum, it can be greater than 2 in actual environments. From Equation 1, it is found that obtained RSSI decreases to 6 dBm or more with double increase in measurement distance. However, the gain of transmission/reception antennas of smartphone terminals which are used for distance measurement is not stable in actual use. For this reason or other reasons, it can be considered that the radio wave intensity is not stable.

Figure 2:
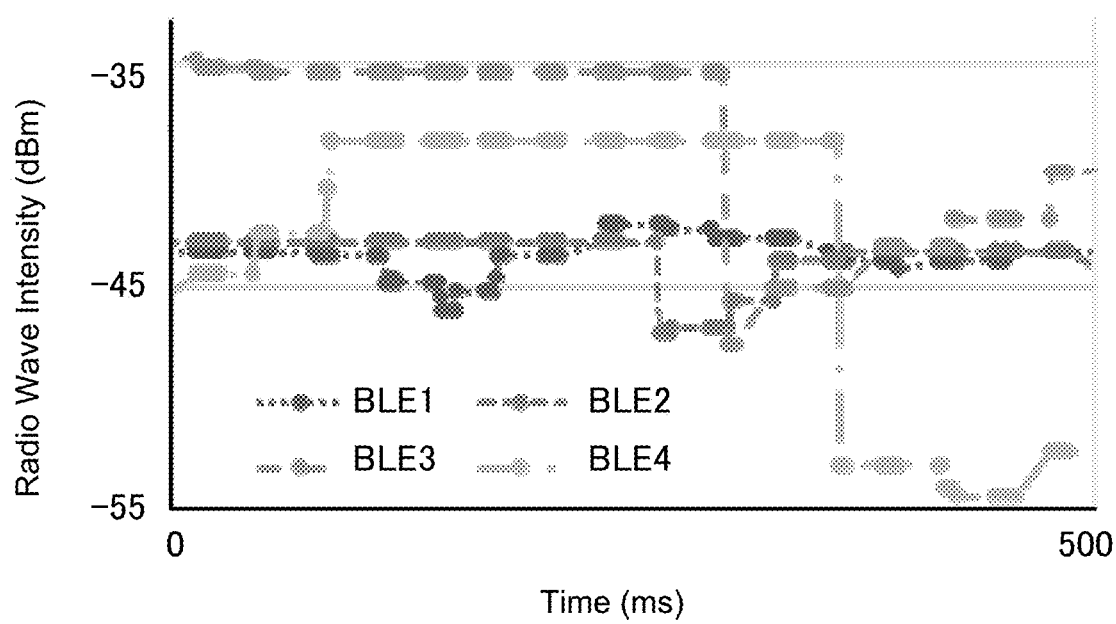
FIG. 2 is a graph showing temporal variation of detected radio wave intensities of BLEs 1 to 4 which are spaced at the same distance away from a BLE transmitter.

FIG. 2 shows radio wave intensities of four BLE receivers BLEs 1 to 4 which are spaced at substantially the same distance (e.g., 1 meter) away from a BLE transmitter with time axis. In this case, the BLE receivers obtain data at period of about 4 microseconds. From this graph, it is found that the radio wave intensity fluctuates in a range of about 20 dB within a time period of several hundred micro seconds. This fluctuation is caused by temporal measurement variation of transmission radio wave intensity and reception radio wave intensity of BLEs. Such fluctuation disallows accurate measurement of radio wave intensity. For this reason, conventionally, radio waves are constantly received at the same location for a sufficient time period (e.g., one minute) so that propagation loss values which are stable in terms of time are obtained by averaging obtained RSSI whereby calculating a measurement distance based on the propagation loss values. Such a conventional method cannot accurately measure the distance within a short time.

(Position Determination Method Using BLE Beacon)

Figure 3:
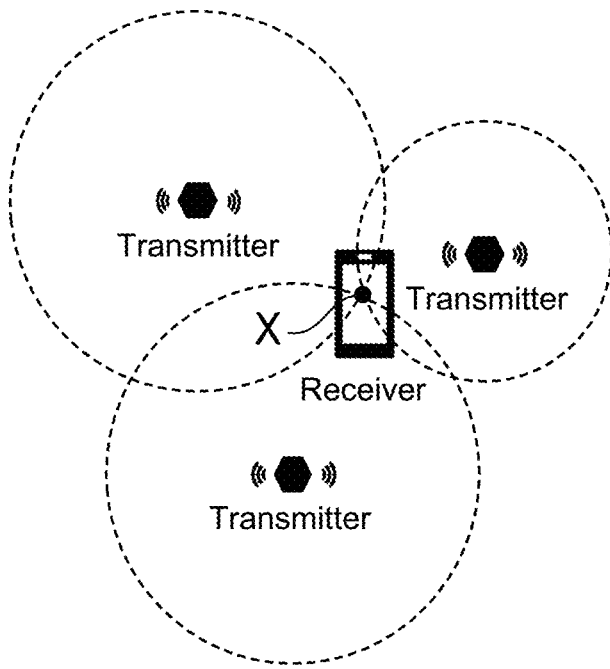
FIG. 3 is a schematic view showing an exemplary position determination method which uses BLE beacons.

A position determination method using BLE beacons is now described. FIG. 3 shows an example of typical triangulation using BLE beacons. In this illustrated arrangement, a BLE receiver such as smartphone terminal receives signals from three BLE beacon transmitters in sufficient time, and the terminal measures distances calculated based on Equation 1. As a result, the position can be accurately measured. When circles having the measured distance from their corresponding BLE beacon transmitter as their radius are drawn, a point X at which all the circles intersect each other can be obtained. For example, in the case in which BLE beacon transmitters transmit signals at transmission electric power of −40 dBm, and if the smartphone as receiver receives electric power values −51 dBm, −55 dBm, and −46 dBm, it is found that the propagation loss values are 11 dB, 15 dB, and 6 dB, respectively. Because the attenuation index is 2 (n=2) in the case in which radio wave absorption is almost zero, radii of circles can be calculated so that corresponding circles can be drawn. The point X locates the BLE receiver. However, the position may not be measured because the distances cannot be accurately measured within a short time.

Figure 4:
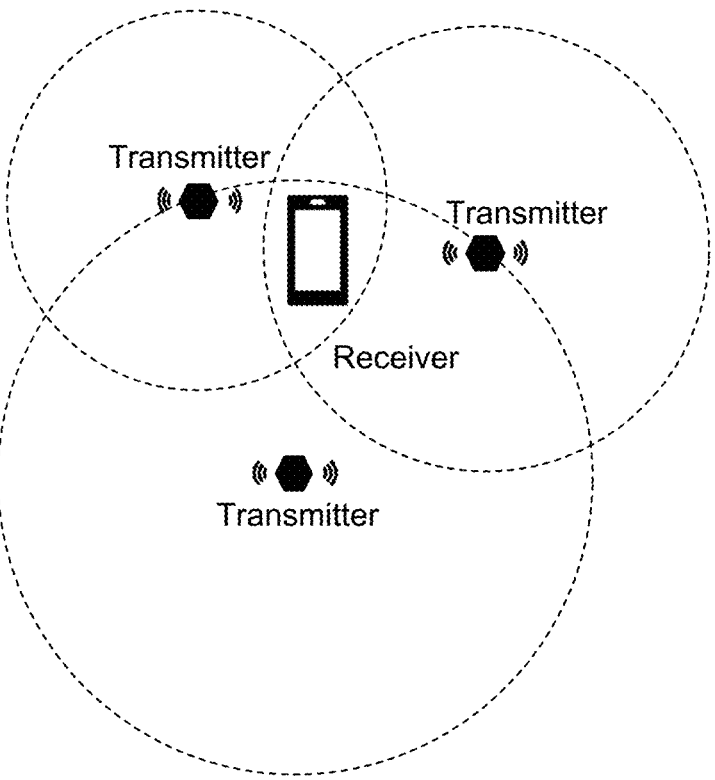
FIG. 4 is a schematic view showing short time triangulation which uses BLE beacons.

Also, FIG. 4 shows short time triangulation which uses BLE beacons. In the arrangement in which three BLE beacon transmitters are arranged similar to FIG. 3, if a BLE receiver such as smartphone terminal receives signals from the BLE beacon transmitters within a short time, the terminal measures distances calculated based on Equation 1 but the measured distances are not accurate. For this reason, even when circles having the measured distance from their corresponding BLE beacon transmitter as their radius are drawn, overlap areas between two of the circles will be large. As a result, a point X at which all the circles intersect each other cannot be obtained. In other words, the point at which the BLE receiver is positioned is unclear.

Although a method which uses BLE to determine or detect the distances and the position has been stated, technique used in position detection or the like is not limited to BLE but other wireless communication standards such as other Bluetooth standards, Wi-Fi, RFID (Radio Frequency Identifier), IMES, ultrasonic waves, and ZigBee can be used. Even in other wireless communication standards, it is difficult to detect the distances and the position with high accuracy within a short time. That is, such position detection using other wireless communication standards cannot be used in practical levels. For example, in order to detect passage of a user through railway ticket gates in a touchless manner, it is necessary to distinguish one user from another user close to the one user and distinguish one ticket gate from another ticket gate close to the one ticket gate. For this reason, the required margin of measurement error is not greater than 40 cm. In consideration of users' walking speed, the position determination is required to complete within not longer than 100 microseconds. In addition, in the in which smartphone terminals, etc. are held in users' bag or pocket, it is necessarily considered that difference between the radio wave intensity transmitted by a BLE transmitter and RSSI obtained by a BLE receiver is not always provided by propagation loss in space. Such processing time (speed) and locating accuracy are required not only payment at ticket and entrance gates but also at electronic cash registers in supermarket, convenience store, and the like.

First Embodiment

As stated above, the conventional position determination using smartphone terminals, etc. which are carried by users as BLE receivers to determine their position is unusable for practical applications from viewpoint of accuracy and processing speed. To address this, in a position determination method according to a first embodiment of the present invention, a smartphone terminal, etc. is used not as a BLE receiver but as a BLE transmitter, and BLE receivers are arranged at different positions so that a plurality of BLE receivers are arranged at each position in order to realize locating accuracy and processing speed which satisfy requirement in actual environments. According to this arrangement, the position can be determined based on a difference between radio wave intensities of the BLE receivers, and as a result the accuracy and processing speed which satisfy requirement in actual environments can be realized. Consequently, moving users who carry their smartphone terminal, etc. can be acquired, identified, and recognized one by one within a short time with high accuracy. In addition, actions of a user required for authentication can be replaced by automatic touchless operations, and the user's actions can be grasped. For example, in an electronic cash register or ticket gate, even if a user moves he or she can be determined without incorrect recognition.

Figure 5:
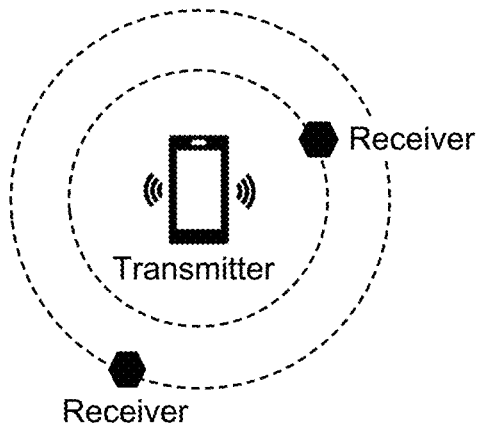
FIG. 5 is a conceptual illustration showing an exemplary arrangement in which a smartphone terminal or the like serves as a BLE transmitter, and BLE receivers are arranged at two locations.

FIG. 5 shows an exemplary arrangement in which a smart phone, etc. serves as a BLE transmitter, and BLE receivers are arranged at two locations; In this case, even in the case in which a smartphone terminal, etc. is held in user's bag or pocket, if an output electric wave intensity immediately outside the bag or pocket is different from the original output electric wave intensity of the smartphone terminal, etc., differences between radio wave intensities of the BLE receivers are not changed. In addition, according to this arrangement, because temporal measurement variation of transmission radio wave intensity of the BLE transmitter can be absorbed, this arrangement can facilitate accurate radio wave intensity measurement.

Figure 6:
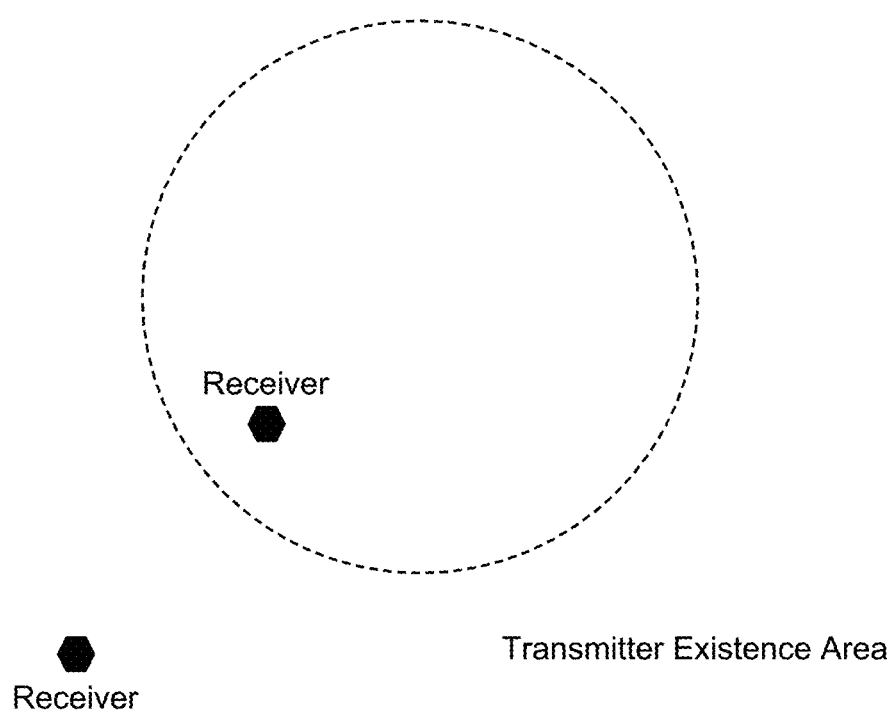
FIG. 6 is a conceptual illustration showing an example of existence area of the transmitter which is predicted based on a difference between radio wave intensities of the BLE receivers in the exemplary arrangement of FIG. 5.

FIG. 6 shows an example of existence area of a BLE transmitter which is predicted based on a difference between radio wave intensities of BLE receivers in the case in which a smartphone terminal etc. serves as the BLE transmitter, and the BLE receivers are arranged at two locations. The existence area of a transmitter which is predicted based on a difference between radio wave intensities of BLE receivers will be represented by Apollonius' circle or a straight line.

The reason is that the radio wave intensity is logarithmically represented so that a constant difference between radio wave intensities (e.g., 10 dB) can be considered to provide the set of points that have a constant ratio of distances (e.g., ten times, etc.). It is noted that the existence area of the BLE transmitter cannot be pinpointed only by one circle or straight line.

Figure 7:
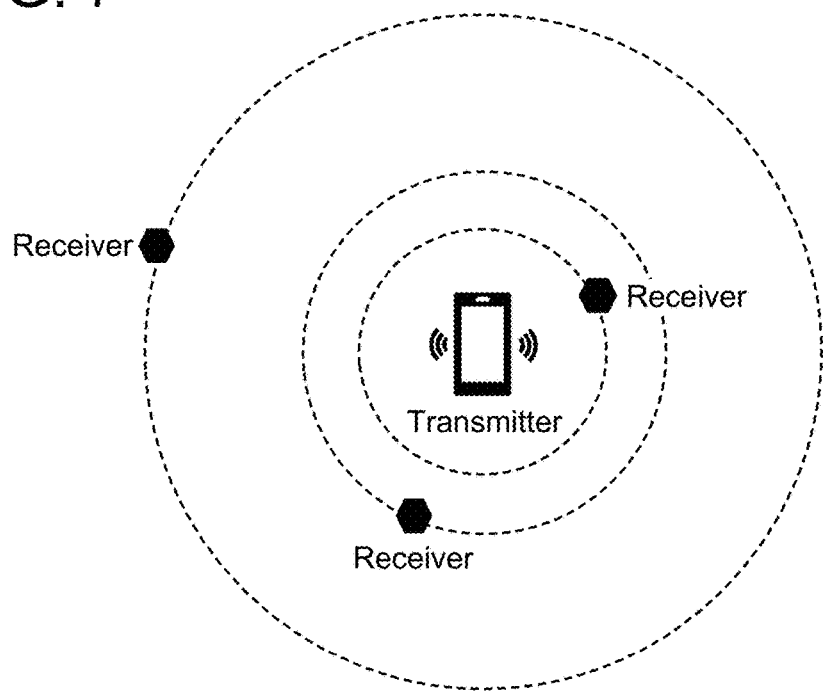
FIG. 7 is a conceptual diagram showing an exemplary arrangement in which a smartphone terminal or the like serves as a BLE transmitter, and three BLE receivers are arranged at different locations.
Figure 8:
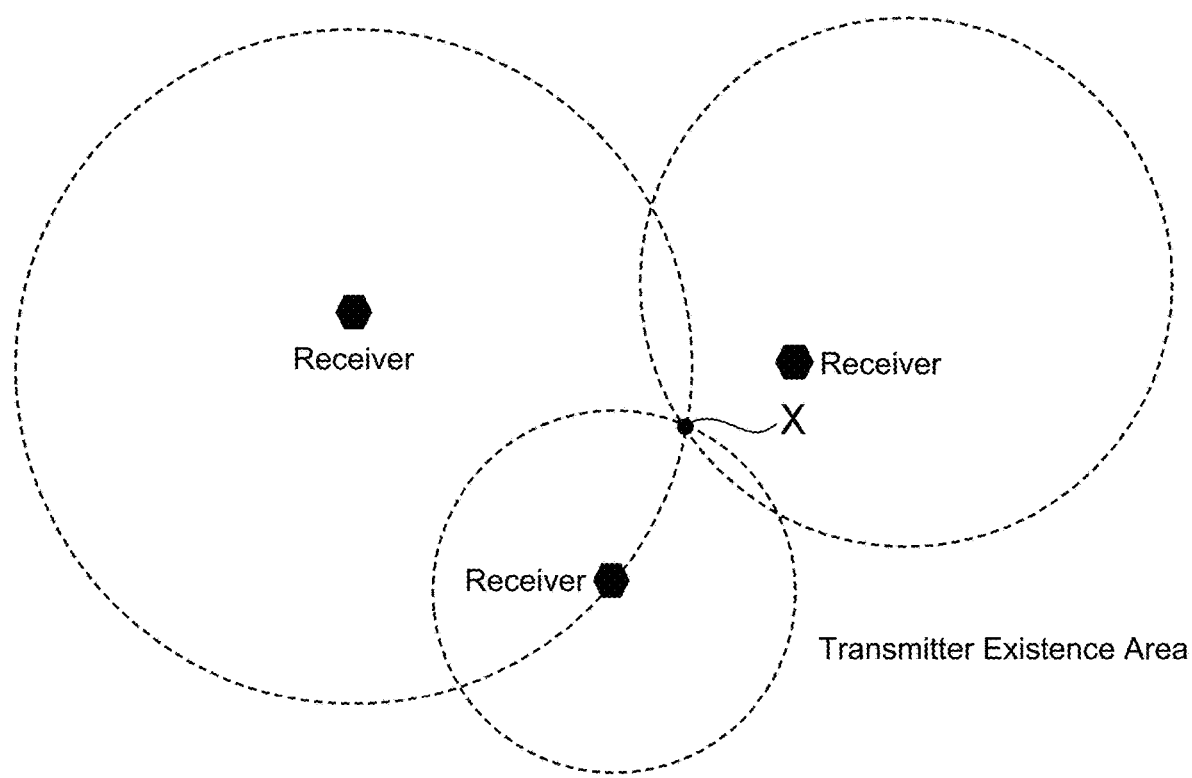
FIG. 8 is a conceptual illustration showing an example of existence area of the transmitter which is predicted based on differences between radio wave intensities of the BLE receivers in the exemplary arrangement of FIG. 7.

FIG. 7 shows an exemplary arrangement in which a smartphone terminal, etc. serves as a BLE transmitter, and BLE receivers are arranged at three locations. FIG. 8 shows an example of existence area of the BLE transmitter which is predicted based on differences between radio wave intensities of the BLE receivers in the case shown in FIG. 7. In this case, three Apollonius' circles or straight lines can be drawn. When three Apollonius' circles are drawn, a point X at which all the circles intersect each other can be obtained. The point X pinpoints the existence area of the BLE transmitter. However, if only one straight line is drawn, the position of the BLE transmitter cannot be pinpointed. The condition to always pinpoint the position is that four or more BLE receivers are arranged to form a quadrangle which have sides not in parallel to each other.

Alternatively, in the case of FIG. 6, if the existence area of the BLE transmitter is defined in a required size (e.g., circle having diameter of not greater than 40 cm), this existence area can be determined as the position of the BLE transmitter. For example, a BLE receiver is arranged to be spaced at different distances away from two BLE transmitters which are arranged at two locations. If a certain threshold (e.g., 10 dB) is defined, when a difference between radio wave intensities received by the BLE receivers is not smaller than the threshold, the existence area of the BLE transmitter can be determined inside entire the Apollonius' circle which is calculated by the difference between radio wave intensities of the BLE receivers. This threshold can determine the existence area.

Figure 9:
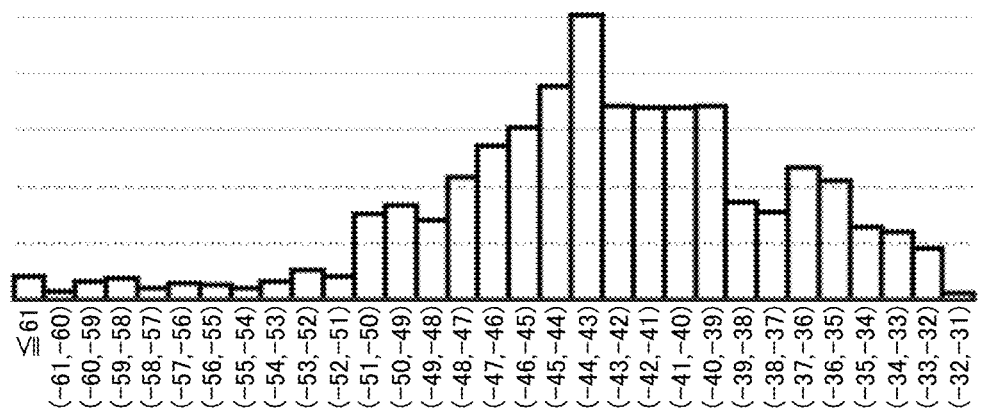
FIG. 9 is a histogram showing radio wave intensities of one BLE receiver which is spaced at a fixed distance away from a BLE transmitter.

FIG. 9 is a histogram showing radio wave intensities detected by one BLE receiver which is spaced at a fixed distance (e.g., 1 meter) away from a BLE transmitter (for example, which transmits signal at an average radio wave intensity of −43 dBm) similar to the case of FIG. 2. This graph shows that fluctuation and standard deviation of radio wave intensities detected by the BLE receiver are approximately 30 dB and 5.85, respectively. According to this graph, the fluctuation of radio wave intensity is very large, and the difference between the maximum and the minimum intensities is also large. For this reason, if a distance is calculated based on such fluctuating radio wave intensity, variation of the distance becomes correspondingly large.

Figure 10:
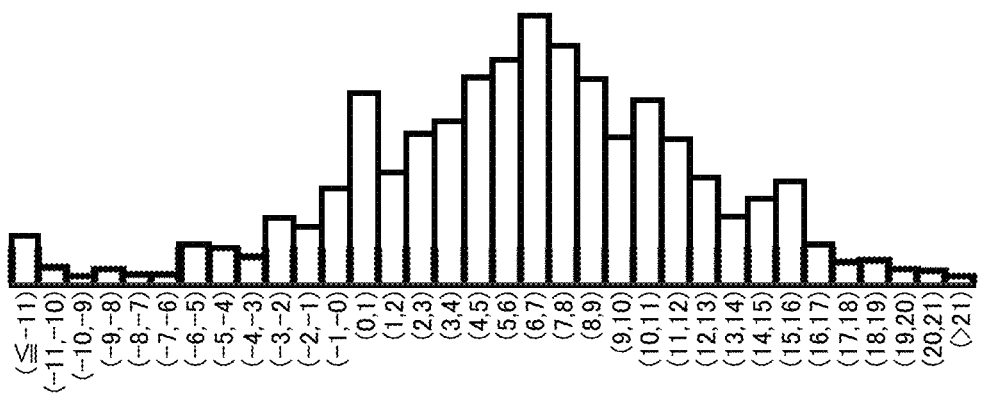
FIG. 10 is a histogram showing differences between radio wave intensities of two BLE receivers which are spaced at different distances away from the BLE transmitter.

Also, FIG. 10 is a histogram showing differences between radio wave intensities detected by two BLE receivers which are spaced at different distances (e.g., 1 meter and 3 meters) away from a BLE transmitter (for example, which transmits signal at an average radio wave intensity of −43 dBm), that is, showing distribution of differences between radio wave intensities each of which is detected by their corresponding one (closer distance or close distance) of the BLE receivers. The standard deviation is approximately 6.21. Generally, a radio wave intensity of the closer BLE receiver is greater than the further BLE receiver away from the BLE transmitter. It can be found that the bar height relationship does not agree with normal increasing or decreasing order. According to this, it is found that the fluctuation of radio wave intensity difference is large, and heights of some bars in the histogram do not agree with proper increasing or decreasing order of a normal distribution histogram.

Also, it is known that when differences between two probability distributions having the same ideal normal distribution histogram are calculated the standard deviation will be approximately $\sqrt{2}$. Relative to this, the standard deviation in FIG. 10 is smaller than the value of $\sqrt{2}$ times the standard deviation in FIG. 9. Accordingly, it is found that temporal measurement variation of transmission BLE radio wave intensity is absorbed, and this arrangement facilitates accurate radio wave intensity measurement to a certain extent. However, if the standard deviation in FIG. 10 cannot be much smaller, high-speed and highly accurate position determination cannot be realized.

To address this, temporal measurement variation of received BLE radio wave intensity is necessarily properly absorbed. From the graph shown in FIG. 2, it is found that radio wave intensities of four BLE receivers, which are spaced at the same distance (e.g., 1 meter) away from the BLE transmitter with time axis, substantially independently fluctuate. In addition, it is known that when the average of n independent probability distributions having the same ideal normal distribution histogram is calculated the standard deviation will be approximately $1/\sqrt{n}$. For this reason, it is expected that temporal measurement variation of the reception radio wave intensity of BLE can be reduced by averaging radio wave intensity in a plurality of BLE receivers which are arranged in the same position.

Figure 11:
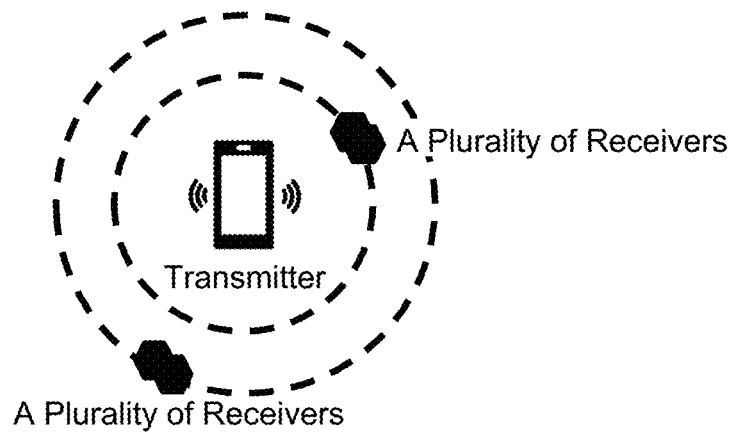
FIG. 11 is a schematic diagram showing a position determination system according to a first embodiment.

FIG. 11 shows an exemplary arrangement in which a smart phone or the like serves as a BLE transmitter, and two sets of BLE receivers are arranged at two locations. A plurality of BLE receivers are arranged at each position. For example, in the case in which two BLE receivers are arranged at each position so that totally four BLE receivers are provided, the standard deviation which can be obtained from the histogram of this arrangement by averaging the intensity of the four BLE receivers is approximately 2.63. It can be confirmed that this value becomes about a half the standard deviation which is obtained from the histogram of the radio wave intensities which are detected by one BLE receiver which is spaced at a fixed distance (e.g., 1 meter, etc.) from a BLE transmitter. Consequently, it is found that temporal measurement variation of received BLE radio wave intensity can be absorbed.

Figure 12:
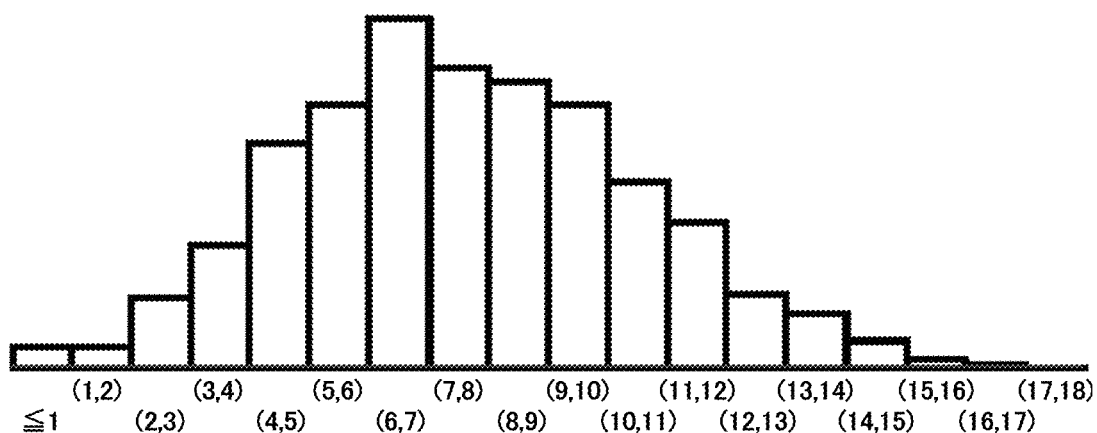
FIG. 12 is a histogram showing differences between averaged radio wave intensities at two locations each of which is obtained by averaging radio wave intensity in two BLE receivers at each location (totally four BLE receivers), the two locations being spaced at different distances away from a BLE transmitter.

Also, FIG. 12 is a histogram showing differences between radio wave intensities each of which are obtained by averaging radio wave intensity in two BLE receivers at each of two locations in the case in which two sets of BLE receivers are arranged are spaced at different distances (e.g., 1 meter and 3 meters) away from a BLE transmitter (for example, which transmits signal at an average radio wave intensity of −43 dBm) so that totally four BLE receivers. Form this graph, it is found that radio-wave-intensity fluctuation is smaller as compared with the graph of FIG. 10, etc., and heights of bars in the histogram agree with proper increasing or decreasing order of a normal distribution histogram. Also, the standard deviation is approximately 2.85. Consequently, it is found that temporal measurement variation of transmission and reception BLE radio wave intensity can be sufficiently reduced by obtaining averaged differences between radio wave intensities detected at two locations each of which is obtained by averaging radio wave intensity in a plurality of BLE receivers at each location. The two locations are spaced at different distances away from a BLE transmitter.

Figure 13:
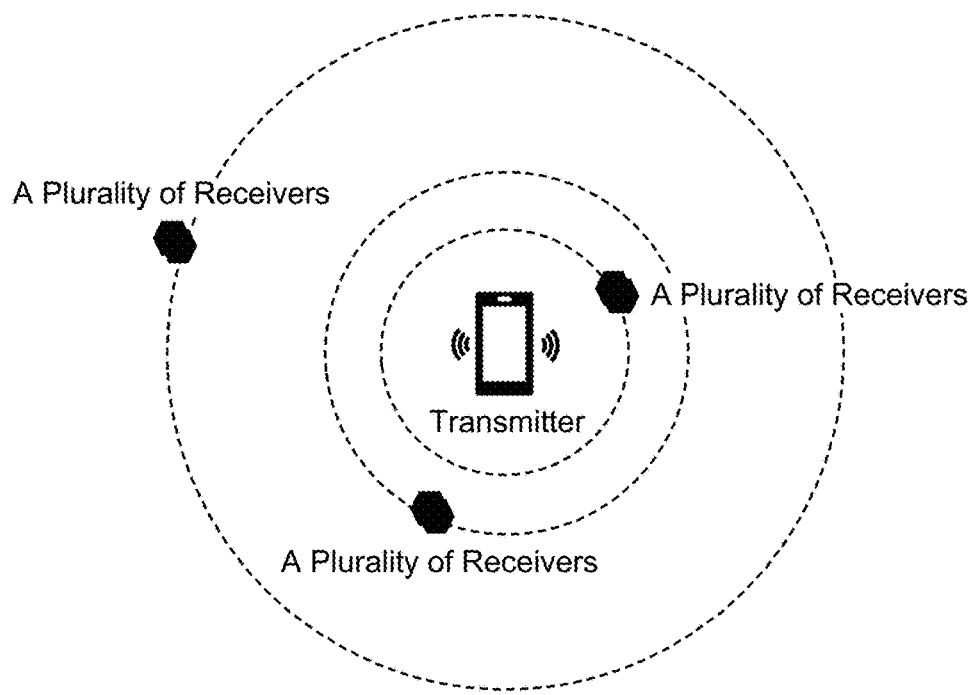
FIG. 13 is a schematic diagram showing an exemplary arrangement of a BLE transmitter and three sets of BLE receivers at three locations, a plurality of BLE receivers being arranged at each location.

FIG. 13 shows an exemplary arrangement in which a smart phone or the like serves as a BLE transmitter, and three sets of BLE receivers are arranged at three locations. A plurality of BLE receivers are arranged at each position.

Figure 14:
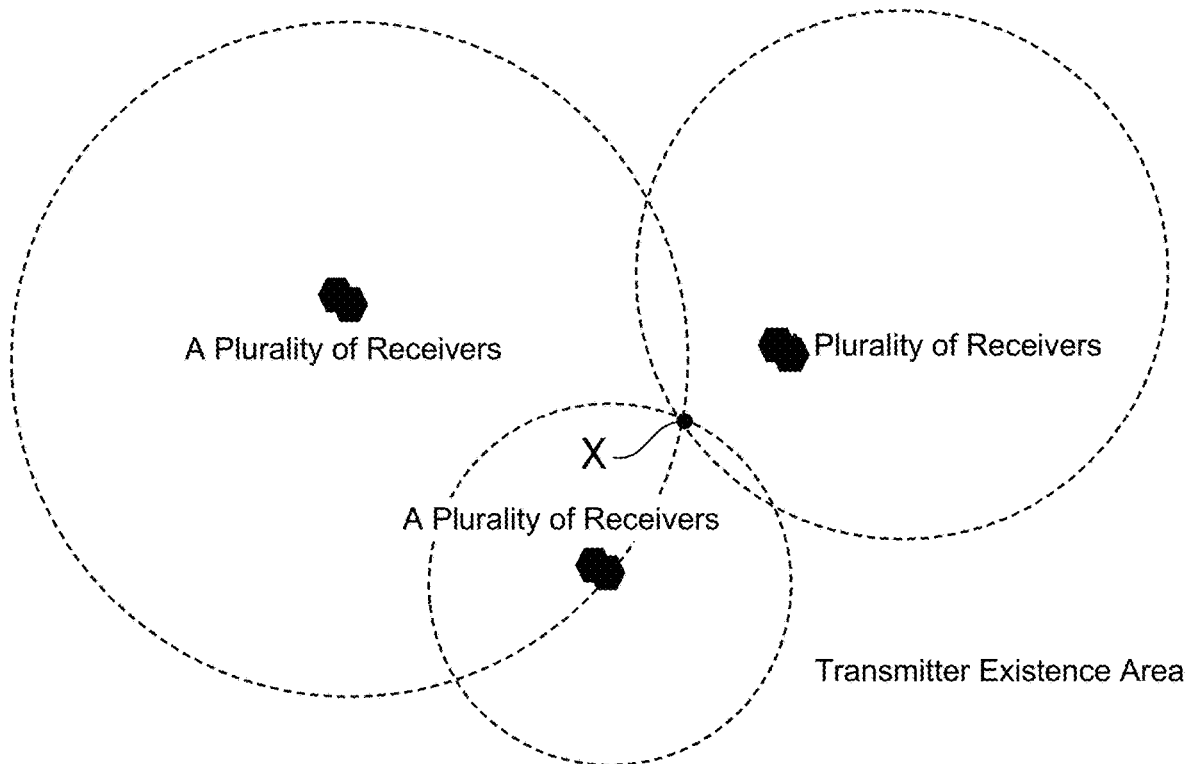
FIG. 14 is a schematic diagram showing an example of existence area of the BLE transmitter which is predicted based on differences between averaged radio wave intensities at the locations each of which is obtained by averaging radio wave intensity in the plurality of BLE receivers at each location in FIG. 13.

FIG. 14 is shows an example of existence area of the BLE transmitter which is predicted based on differences between averaged radio wave intensities at the locations each of which is obtained by averaging radio wave intensity in the plurality of BLE receivers at each location in the arrangement of the BLE transmitter and receivers shown in FIG. 13. In this case, three Apollonius' circles or straight lines can be drawn. When three Apollonius' circles are drawn, a point X at which all the circles intersect each other can be obtained. The point X pinpoints the existence area of the BLE transmitter. However, if only one straight line is drawn, the position of the BLE transmitter cannot be pinpointed. Here, the condition to always pinpoint the position is that four or more BLE receivers are arranged to form a quadrangle which have sides not in parallel to each other.

Figure 15:
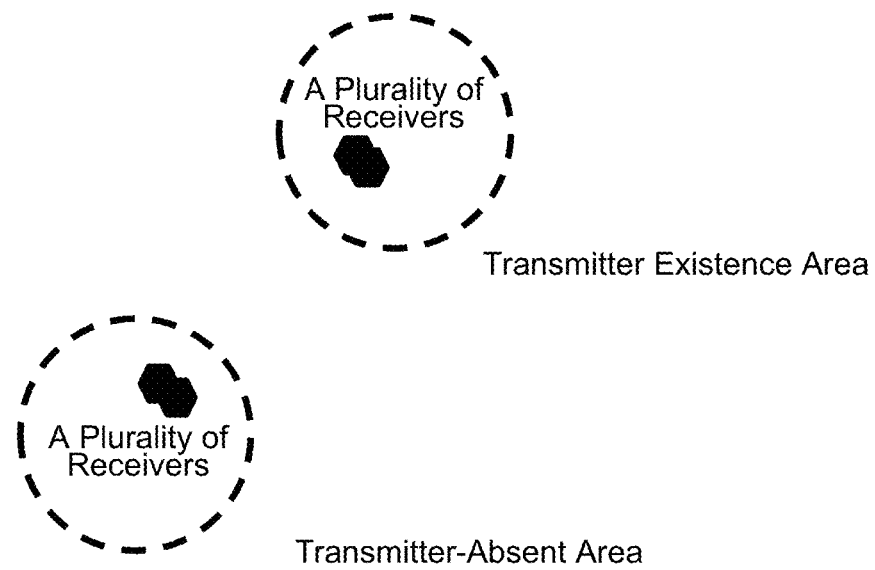
FIG. 15 is a schematic diagram showing an example of position determination of a BLE transmitter in which a position of the BLE transmitter is determined by narrowing its location area.

Alternatively, if the existence area of the BLE transmitter is defined in a required size (e.g., circle having diameter of not greater than 40 cm), this existence area can be determined as the position of the BLE transmitter. FIG. 15 shows an example of position determination of a BLE transmitter in which a position of the BLE transmitter is determined by narrowing its location area. The existence area of a BLE transmitter can be narrowed to an area which can distinguish one user who moves together with his or her smartphone terminal, etc. from other users who move together with their smartphone terminal, etc. (e.g., an area inside a circle having a diameter not greater than 40 cm) with high accuracy by adjusting determination conditions. For example, in the case in which two sets of BLE receivers are arranged at two locations which are spaced at a certain distance (e.g., 2 meters) away from each other arranged at two locations, a determination condition is defined that a difference between averaged radio wave intensities at the two locations each of which is obtained by averaging radio wave intensity in a plurality of BLE receivers in each location is not smaller than a predetermined threshold (e.g., 10 dB). If this condition is satisfied, the existence area of a BLE transmitter can be determined inside an area inside an Apollonius' circles which is drawn based on the difference between averaged radio wave intensities at the two locations each of which is obtained by averaging radio wave intensity in the plurality of BLE receivers in each location.

Figure 16:
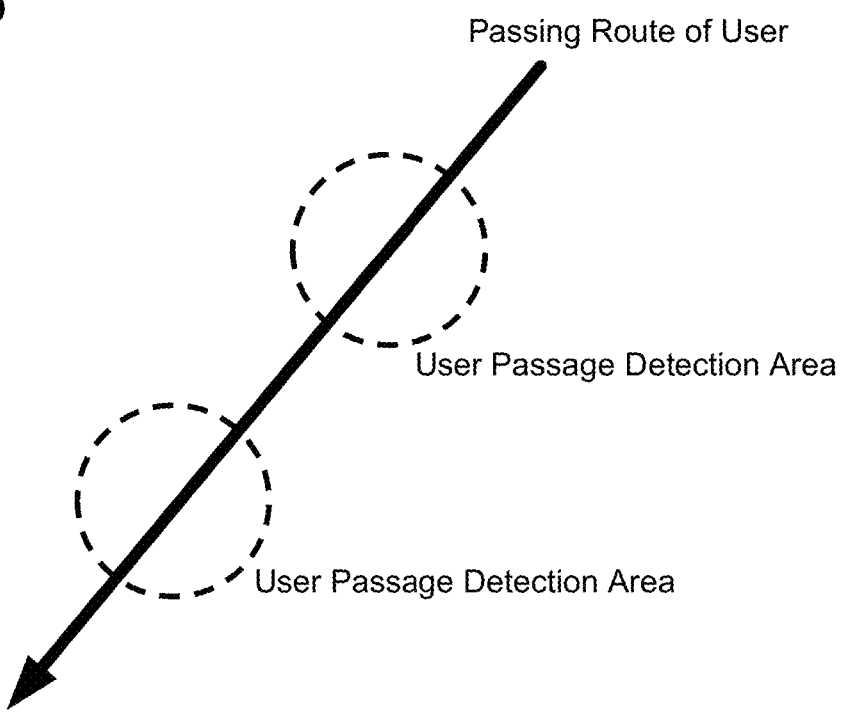
FIG. 16 is a schematic diagram showing an exemplary arrangement in which passage detection areas are arranged in two places on users' passing route.

However, when a user pays at an electronic cash register or ticket gate for example, if it is incorrectly determined that the user is located in an area where any BLE transmitter is not arranged, problems will arise. Form this viewpoint, such incorrect determination is defined as misrecognition. Generally, it is necessary to reduce the probability of misrecognition. In the case in which highly accurate recognition is required such as in the case of payment or the like, it is necessarily to take additional measures to further reduce misrecognition. FIG. 16 shows exemplary additional measures which further reduce misrecognition in the case in which highly accurate recognition is required such as in the case of payment or the like. In the arrangement shown in FIG. 16, two passage detection areas which detect passage of users are arranged. Authentication of a user is made only when the user passes through the both passage detection areas within a certain time period (e.g., 0.5 to 2 seconds, etc.). As a result, misrecognition can be further reduced. That is, even if a user unintentionally approaches one of the user passage detection areas and authentication of the user is made in the one user passage detection area, it is not determined that the user passes through the passage detection areas except when the authentication of the user is made in another user passage detection area.

Also, the arrangement shown in FIG. 15 can be used in the additional measures. That is, in the case in which a first user passage detection area is defined, a determination method is used in which two sets of BLE receivers are arranged at two locations which are spaced at a certain distance (e.g., 2 meters) away from each other as in the arrangement shown in FIG. 15, and a determination condition is defined that a difference between averaged radio wave intensities at the two locations each of which is obtained by averaging radio wave intensity in a plurality of BLE receivers in each location is not smaller than a predetermined threshold. Also, in the case in which a second user passage detection area is defined, a determination method similar to FIG. 16 can be used in which two sets of BLE receivers are arranged at two locations which are spaced at a certain distance away from each other as in an inverted arrangement from FIG. 15, and a determination condition is defined that a difference between averaged radio wave intensities at the two locations each of which is obtained by averaging radio wave intensity in a plurality of BLE receivers in each location is not smaller than a predetermined threshold (e.g., 10 dB).

Figure 17:
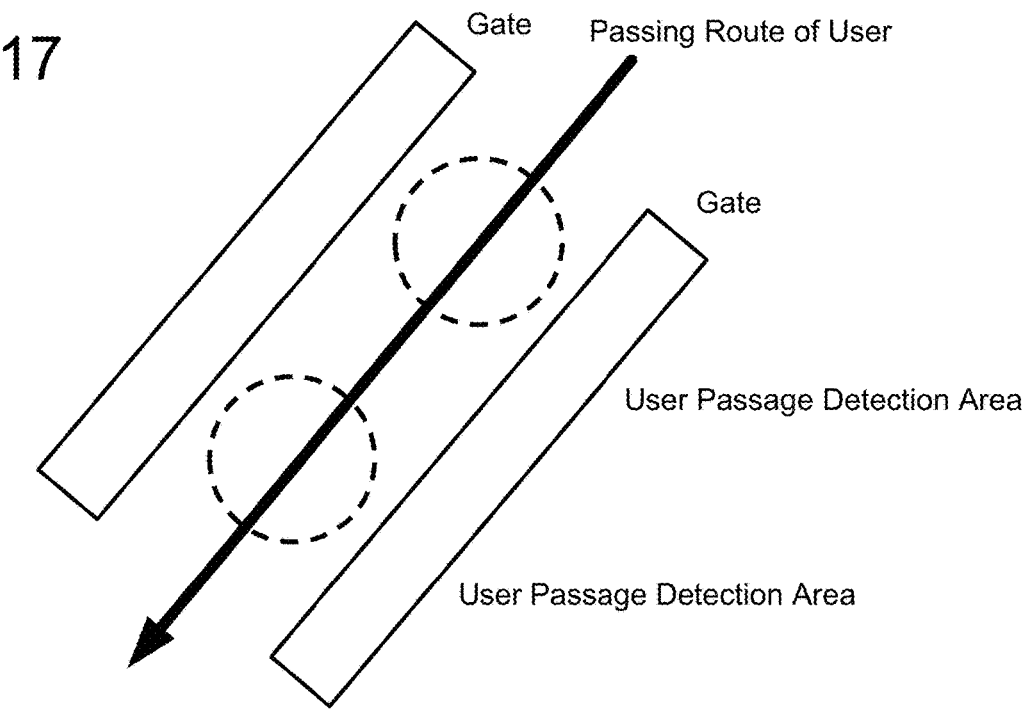
FIG. 17 is a schematic diagram showing an exemplary arrangement in which a gate is arranged to define the users' passing route shown in FIG. 16.

FIG. 17 shows measures which limit user passage shown in FIG. 16. As shown in FIG. 17, an automatic ticket gate is installed as a gate which defines users' passing route.

Also, in the case in which the user passage detection areas are defined as shown in FIGS. 16 and 17, two sets of BLE receivers may be arranged at two locations which are spaced at different distances away from a BLE transmitter so that a plurality of BLE receivers are arranged at each location. A difference between the different distances in one direction (i.e., distance between two sets of BLE receivers at two locations) can be 2 meters, for example. In this case, the existence area of the BLE transmitter can be determined based on a condition that a difference between averaged radio wave intensities at the two locations each of which is obtained by averaging radio wave intensity in a plurality of BLE receivers in each location is not smaller than a predetermined threshold (e.g., 10 dB). For example, in the case of the arrangement shown in FIG. 15 in which two sets of two BLE receivers are arranged at two locations at two locations so that two BLE receivers are arranged at each location, the two sets of BLE receivers can be used to determine user passage through both the two locations.

It is noted that three Apollonius' circles or straight lines which are drawn as an existence area of a BLE transmitter based on radio wave intensities do not always intersect each other at one point in actual determination dissimilar to FIGS. 8 and 14. For this reason, it is preferable that three or more Apollonius' circles or straight lines are prepared to determine a point which minimizes error as the position of the BLE transmitter. For example, this error can be calculated by applying least-squares method to distances or radio wave intensities or by using other regression calculation such as nonlinear least-squares method.

Consequently, when two or more sets of BLE receivers are arranged at two or more locations so that four BLE receivers are used at each location for example, an existence area of a BLE transmitter can be determined with a recognition probability of not lower than 95% and misrecognition can be reduced to hundredths percentage or less (0.0%). Also, measuring time can be not greater than ten microseconds on average. As a result, according to this embodiment, high-speed and highly accurate position determination cannot be realized. Therefore, positions of users can be detected in real time.

As discussed above, two or more sets of BLE receivers are arranged at two or more locations to be spaced at different distances from a BLE transmitter so that a plurality of BLE receivers are arranged at each location. In this arrangement, a position of the BLE transmitter can be determined by obtaining averaged differences between radio wave intensities detected at the two or more locations each of which is obtained by averaging radio wave intensity in the plurality of BLE receivers at each location as shown in FIG. 6, or 8, 12, 14, etc. Accordingly, temporal measurement variation of transmission and reception BLE radio wave intensity can be sufficiently reduced so that a position of a BLE transmitter can be determined within a short time (at high speed) with high accuracy. In addition, moving users who carry their smartphone terminal, etc. can be acquired, identified, and recognized one by one within a short time with high accuracy. Therefore, actions of a user required for authentication can be replaced by the automatic touchless operations.

(Functional Block Diagram of Position Determination System)

Figure 18:
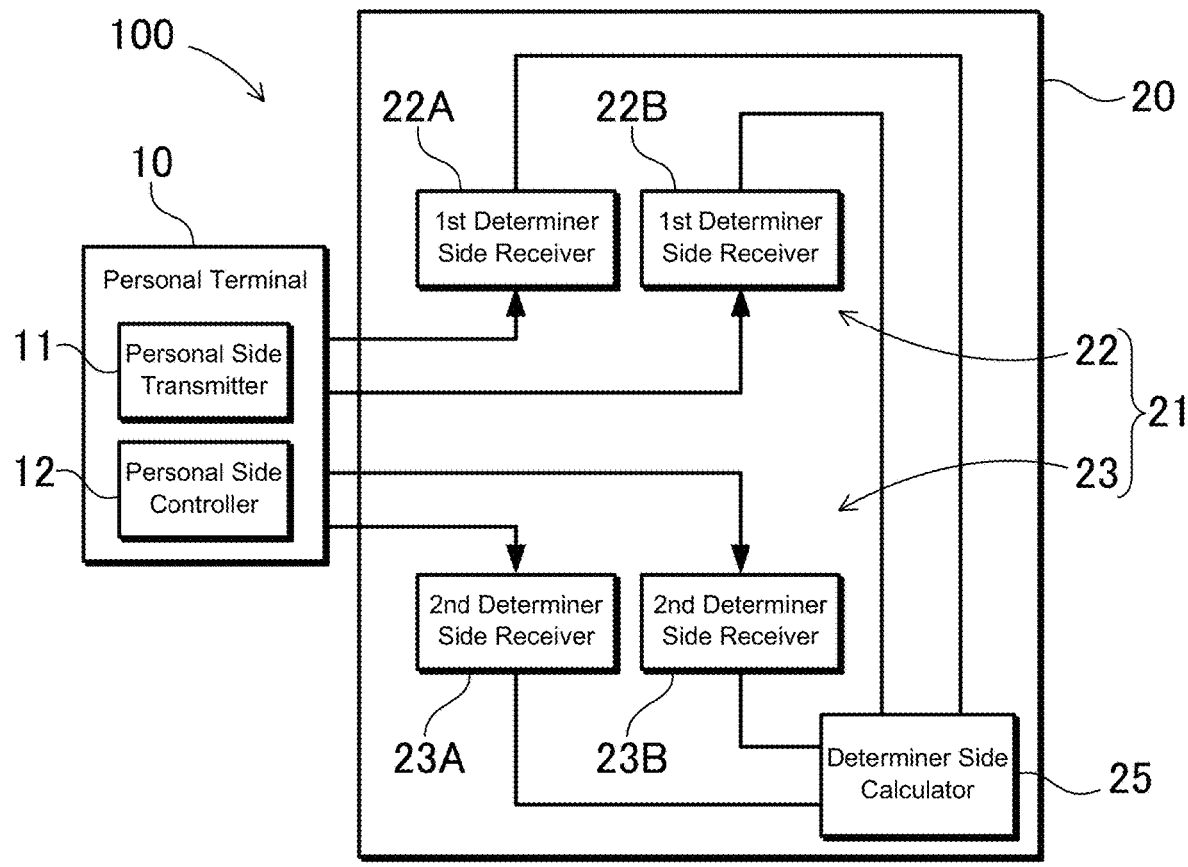
FIG. 18 is a functional block diagram showing the position determination system according to the first embodiment.

FIG. 18 is a functional block diagram of a position determination system. This illustrated position determination system 100 includes a personal portable terminal 10 that is to be carried by a person whose position is determined, and a position determination apparatus 20 that determines the position of the personal portable terminal 10.

The personal portable terminal 10 includes a personal terminal side transmitter 11 and a personal terminal side controller 12. The personal terminal side transmitter 11 serves to communicate with the position determination apparatus 20. Specifically, the personal terminal side transmitter 11 transmits a position determination signal to be used for position determination to the position determination apparatus 20. Also, the personal terminal side controller 12 controls the personal terminal side transmitter 11.

The position determination apparatus 20 includes a position determination side receiver 21 and a position determination side calculator 25. The position determination side receiver 21 receives the position determination signal which is transmitted by the personal terminal side transmitter 11, and includes a plurality of first position determination side receivers 22A and 22B and a plurality of second position determination side receivers 23A and 23B. The first position determination side receivers 22 are arranged side by side at a first position which will be spaced at a first distance away from the personal portable terminal 10. The second position determination side receivers 23 are arranged at a second position which is different from the first position and will be spaced at a second distance greater than the first distance away from the personal portable terminal 10.

The position determination side calculator 25 determines the position of the personal portable terminal 10 based on the intensity difference between the position determination signals which are received by the first and second position determination side receivers 22A and 22B, and 23A and 23B. Accordingly, when the personal terminal side transmitter 11 transmits the position determination signal, variation of intensities of the signal which are received by the position determination side receivers can be reduced by using difference between the received intensities of the position determination signal. Therefore, the position of the personal portable terminal 10 can be accurately measured within a short time.

The position determination side calculator 25 evaluates a conditional expression in which whether a difference between the radio wave intensity of the position determination signal that is received by the first position determination side receivers 22A and 22B and the radio wave intensity of the position determination signal that is received by the second position determination side receivers 23A and 23B is greater than a predetermined threshold is decided to determine the position of the personal portable terminal 10. For example, a conditional expression in which it is determined whether the radio wave intensity difference is greater than a predetermined threshold (e.g., 10 dB) is evaluated.

Alternatively, signal intensity variation can be reduced by averaging signal intensity in the plurality of position determination side receivers which are arranged at each of the first and second positions. In this case, the position determination side calculator 25 evaluates a conditional expression in which whether a difference between the averaged radio wave intensity of the position determination signal that is received by the first position determination side receivers 22A and 22B and the averaged radio wave intensity of the position determination signal that is received by the second position determination side receivers 23A and 23B is greater than a predetermined threshold is decided to determine the position of the personal portable terminal 10.

(Automatic Activation Function of Personal Terminal Side Transmitter 11)

In the aforementioned construction, the personal portable terminal 10 serves as a transmitter. In this case, power consumption can be reduced by using BLE communication. However, it is considered that users hesitate to keep the BLE function ON in their smartphone terminal because they may want to reduce battery power consumption. For this reason, it is considered that some users want to keep the BLE function OFF in their smartphone terminal. In the use of the aforementioned position determination system, the BLE function is necessarily turned ON in smartphone terminals. For example, when the position determination system is used as a ticket of public transportation such as subway, users will be required to manually turn the BLE function ON by operating their smartphone terminal before reaching an automatic ticket gate. This operation is inconvenient for users.

To address this, the personal terminal side transmitter 11 such as BLE function can have automatic activation function which automatically activates the BLE function before users reach the position determination apparatus 20. For example, when detecting that a user who carries the personal portable terminal 10 reaches an area within a certain distance from the position determination apparatus 20, the personal terminal side controller 12 automatically turns the BLE function ON to activate the personal terminal side transmitter 11, and directs the personal terminal side transmitter 11 to transmit the position determination signal to the position determination apparatus 20. According to this function, before the user who carries the personal portable terminal 10 reaches the position determination apparatus 20, the personal terminal side transmitter 11 can be directed to transmit the position determination signal to the position determination apparatus 20. As a result, position determination operations between the personal portable terminal 10 and the position determination apparatus 20 can be smoothly executed.

Also, the smartphone terminal, etc. can transmit a BLE beacon signal. For example, a BLE beacon is installed at a station entrance gate or the like so that BLE beacon transmits a signal to users' portable terminals, and a smartphone terminal, etc. of a user that receives the signal automatically transmits a BLE beacon signal (e.g., signal including ID information on the user's portable terminal). In another construction, a portable terminal may automatically transmit a signal when approaching particular places such as station by using its GPS function. In this construction, the geofence function and the like can be used.

(Activation Signal Transmitter 90)

Figure 19:
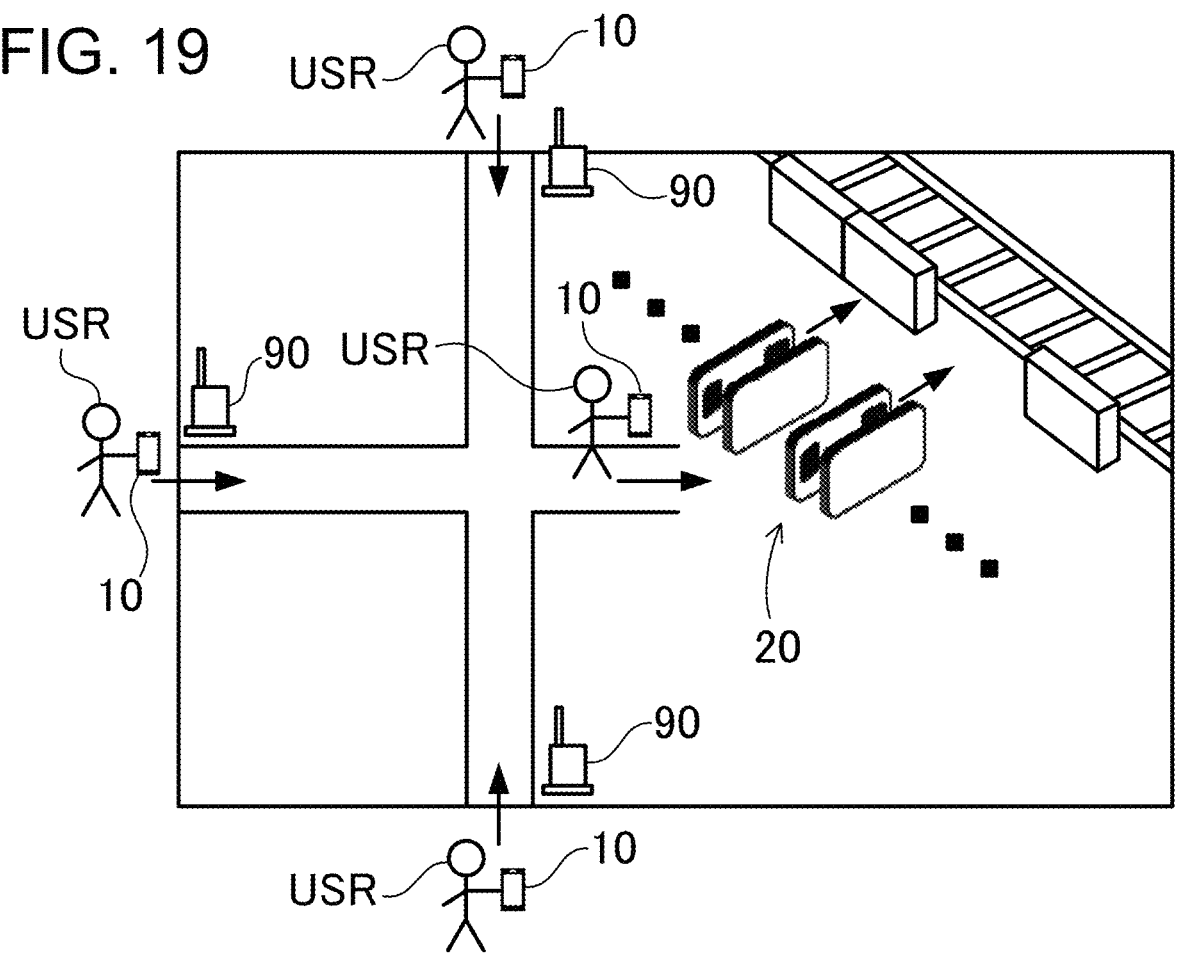
FIG. 19 is a block diagram of the position determination system.

Alternatively, an activator which activates the personal terminal side transmitter 11 may be provided. Specifically, the activation signal transmitter is installed at a position spaced at a certain distance away from the position determination apparatus 20. The activation signal transmitter transmits an activation signal which activates transmission of the position determination signal from the personal terminal side transmitter 11 to the position determination apparatus 20 to the personal portable terminal 10. Accordingly, prior to arrival of a user who carries the personal portable terminal 10 at the position determination apparatus 20, the personal terminal side transmitter 11 can be activated. As a result, position determination operations between the personal portable terminal 10 and the position determination apparatus 20 can be smoothly executed. For example, in the case in which the personal portable terminal is used as a ticket of public transportation such as subway, the activation signal transmitter is arranged at locations through which users will pass before reaching the position determination apparatus 20 as automatic ticket gate, for example, locations close to station entrance or ticket gate. FIG. 19 shows this arrangement. In this arrangement, the activation signal transmitters 90 are arranged at entrances of a railway station. The activation signal transmitter 90 turns ON the BLE function of smartphone terminals of users USR so that their smartphone terminals start transmitting position determination signals. As discussed above, because the activation signal transmitters 90 are previously arranged on routes along which the users USR walk to the position determination apparatus 20 such as automatic ticket gate, the transmission of position determination signal can start before the users USR reach the position determination apparatus 20 such as automatic ticket gate. Accordingly, when the users reach the position determination apparatus 20, the position determination apparatus 20 can detect position determination signals so that the position of their smartphone terminals can be determined.

Similarly, a termination signal transmitter may be additionally installed on a route of users USR to turn the BLE function OFF when users are leaving the position determination apparatuses 20 such as automatic ticket gate. For example, in the case in which the termination signal transmitter is arranged inside the station ticket gate station exit, or the like, the power consumption by BLE function can be reduced. Also, the activation signal transmitter may serve as the termination signal transmitter. For example, when a smartphone terminal, etc. moves toward the station yard, the activation signal transmitter which is arranged at the station entrance can turn its BLE function ON, and when a smartphone terminal, etc. leaves the station yard, the activation signal transmitter which is arranged at the station entrance can turn its BLE function OFF. BLE beacons or the like can be used as the activation and termination signal transmitters.

If the position of a personal portable terminal 10 such as smartphone terminal, etc. can be determined by using GPS, the position of the personal portable terminal 10 may be determined by using GPS. In such a case, when a smartphone terminal, etc. comes into buildings in which GPS is not available, the smartphone terminal, etc. may automatically turn its BLE function ON by itself and start transmitting the position determination signal.

In the case in which automatic ON/OFF switching of the BLE function is combined with the position determination as discussed above, smartphone terminals, etc. can kept OFF when the position determination is not used without sacrificing convenience of the position determination system according to this embodiment which provides touchless authentication and payments. Therefore, users' convenience can be further improved.

Second Embodiment

Figure 20:
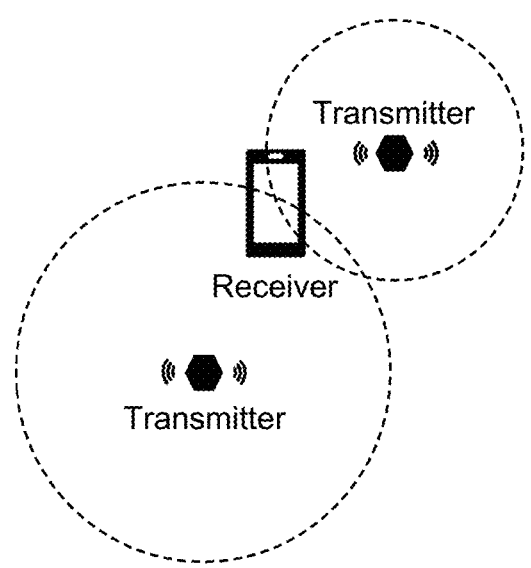
FIG. 20 is a schematic diagram showing a position determination system according to a second embodiment.

Although it has been described that portable devices such as smartphone terminals which are carried by users are used as BLE transmitter in the foregoing embodiment, the present invention is not limited to this. For example, portable devices such as smartphone terminal which are carried by a user can be used as BLE receiver to communicate with a plurality of BLE transmitters which are arranged at predetermined locations so that the positions of the portable devices are detected. This type of position determination system according to a second embodiment is shown in FIG. 20. In this illustrated position determination system, a smartphone terminal etc. is used as a BLE receiver, and BLE transmitters are arranged at two locations.

In the foregoing embodiment, smartphone terminals are used as transmitters, and two or more sets of receivers are arranged at two or more locations so that a plurality of receivers are arranged at each locations to reduce variation of receiver sensitivity by using the plurality of receivers and to reduce variation of radio wave intensity of a transmitter by using differences between radio wave intensities received at the two or more locations (cancelling out). Contrary to this, a smartphone terminal are used as a receiver, and two or more sets of transmitters are arranged at two or more locations so that a plurality of transmitters are arranged at each location to cancel out sensitivity of the receivers by calculating difference between radio wave intensities transmitted by the transmitters. That is, two or more sets of receivers or transmitters are arranged on at least one of receiver side and transmitter side to reduce amplifier variation on the transmitter side (variation of transmitted radio wave intensity) and amplifier variation on the receiver side (variation of reception sensitivity) whereby enhancing the cancelling-out effect. Here, variation of transmitter radio wave intensity cannot be reduced very much by one transmitter. On the other hand, in the case in which a plurality of transmitters are arranged at each location so that radio wave intensity in the plurality of transmitters is averaged at each location, the variation can be reduced to a certain extent.

Figure 21:
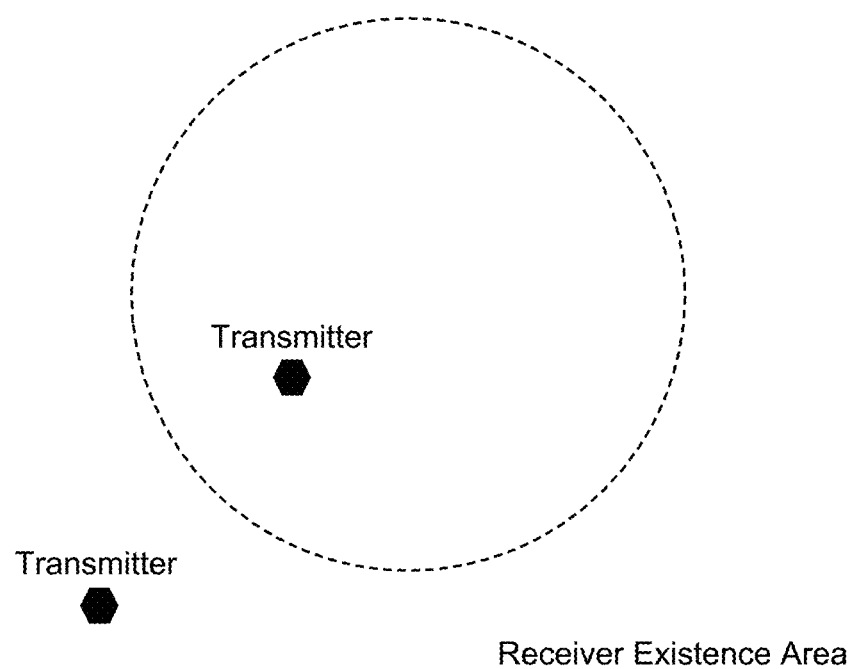
FIG. 21 is a schematic diagram showing an existence area of a BLE receiver which is predicted based on a difference between radio wave intensities of BLE transmitters in the exemplary arrangement of FIG. 20.

FIG. 21 shows an example of existence area of a BLE receiver which is predicted based on a difference between radio wave intensities of BLE transmitters in the exemplary arrangement of FIG. 20. The existence area of a BLE receiver which is predicted based on a difference between radio wave intensities of BLE receivers will be represented by Apollonius' circle or a straight line. It is noted that the existence area of the BLE transmitter cannot be pinpointed only by one circle or straight line.

Figure 22:
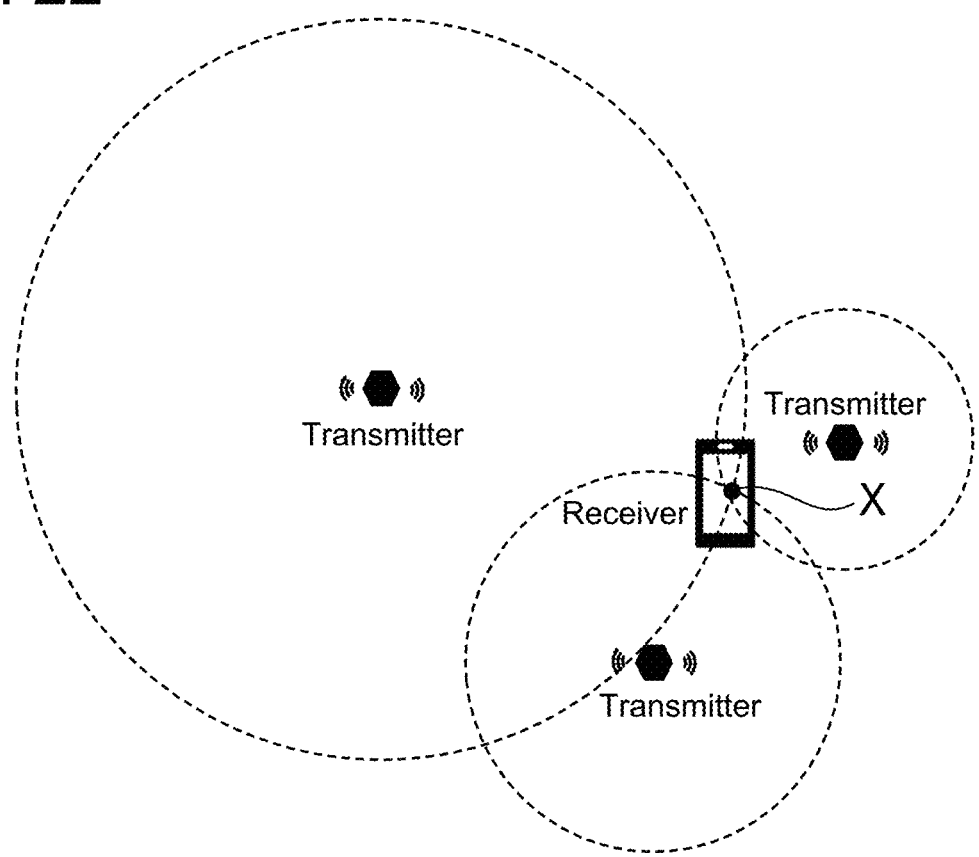
FIG. 22 is a schematic diagram showing an exemplary arrangement in which a smartphone terminal or the like serves as a BLE receiver, and BLE transmitters are arranged at three locations in the second embodiment.
Figure 23:
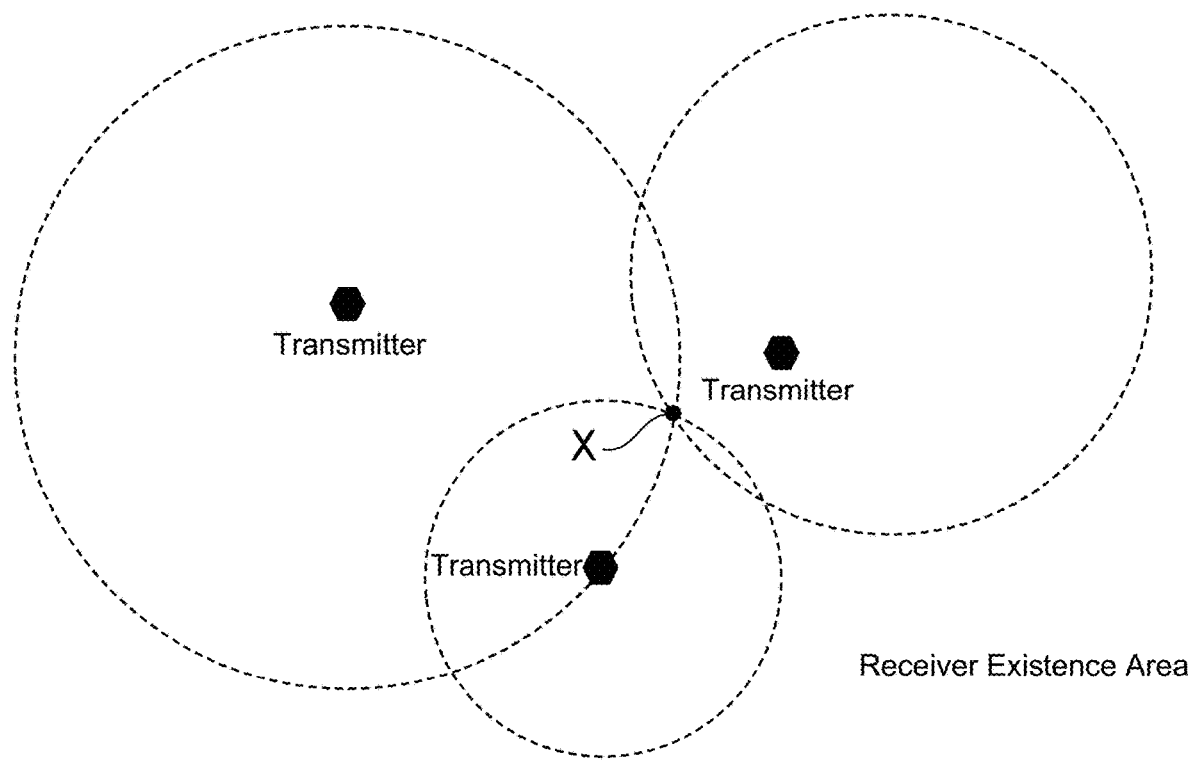
FIG. 23 is a schematic diagram showing an example of existence area of a BLE receiver which is predicted based on differences between radio wave intensities of BLE transmitters in the exemplary arrangement of FIG. 22.

FIG. 22 shows an exemplary arrangement in which a smartphone terminal or the like serves as a BLE receiver, and BLE transmitters are arranged at three locations. FIG. 23 shows an example of existence area of the BLE receiver which is predicted based on a difference between radio wave intensities of the BLE transmitters in the exemplary arrangement of FIG. 22. In this case, three Apollonius' circles or straight lines can be drawn. When three Apollonius' circles are drawn, a point X at which all the circles intersect each other can be obtained. The point X pinpoints the existence area of the BLE receiver. However, if only one straight line is drawn, the position of the BLE receiver cannot be pinpointed. The condition to always pinpoint the position is that four or more BLE transmitters are arranged to form a quadrangle which have sides not in parallel to each other.

Alternatively, in the case of FIG. 21, if the existence area of the BLE receiver is defined in a required size (e.g., circle having diameter of not greater than 40 cm), this existence area can be determined as the position of the BLE receiver. For example, a condition that a difference between radio wave intensities from the two BLE transmitters which are arranged at two locations which are spaced at different distances away from the BLE receiver is not smaller than a threshold can be defined to determine the existence area of the BLE receiver. If this condition is satisfied, the existence area of the BLE receiver can be determined within an entire area inside the Apollonius' circle. In other words, this condition can be useful.

Third Embodiment

Figure 24:
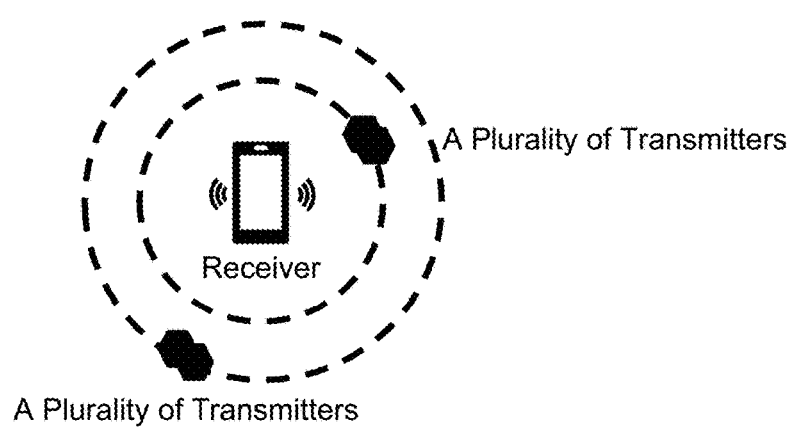
FIG. 24 is a schematic diagram showing a position determination system according to a third embodiment.

It has been described that one BLE transmitter is arranged at each of the two or more locations in the foregoing embodiment, the present invention is not limited to this arrangement. Two or more sets of BLE transmitters can be arranged at two or more locations so that a plurality of BLE transmitters are arranged at each location. This type of position determination system according to a third embodiment is shown in FIG. 24. FIG. 24 shows an exemplary arrangement in which a smartphone terminal or the like serves as a BLE receiver, and two sets of BLE transmitters are arranged at two locations so that a plurality of transmitters are arranged at each location. For example, in the case in which four BLE receivers are arranged, it can be found that the standard deviation which can be obtained from the histogram of this arrangement by averaging the intensity of the four BLE transmitters is approximately a half the standard deviation which can be obtained from the histogram of intensity of one BLE transmitter which is spaced a certain fixed distance from the BLE receiver. Consequently, it is found that temporal measurement variation of received BLE radio wave intensity can be absorbed.

Figure 25:
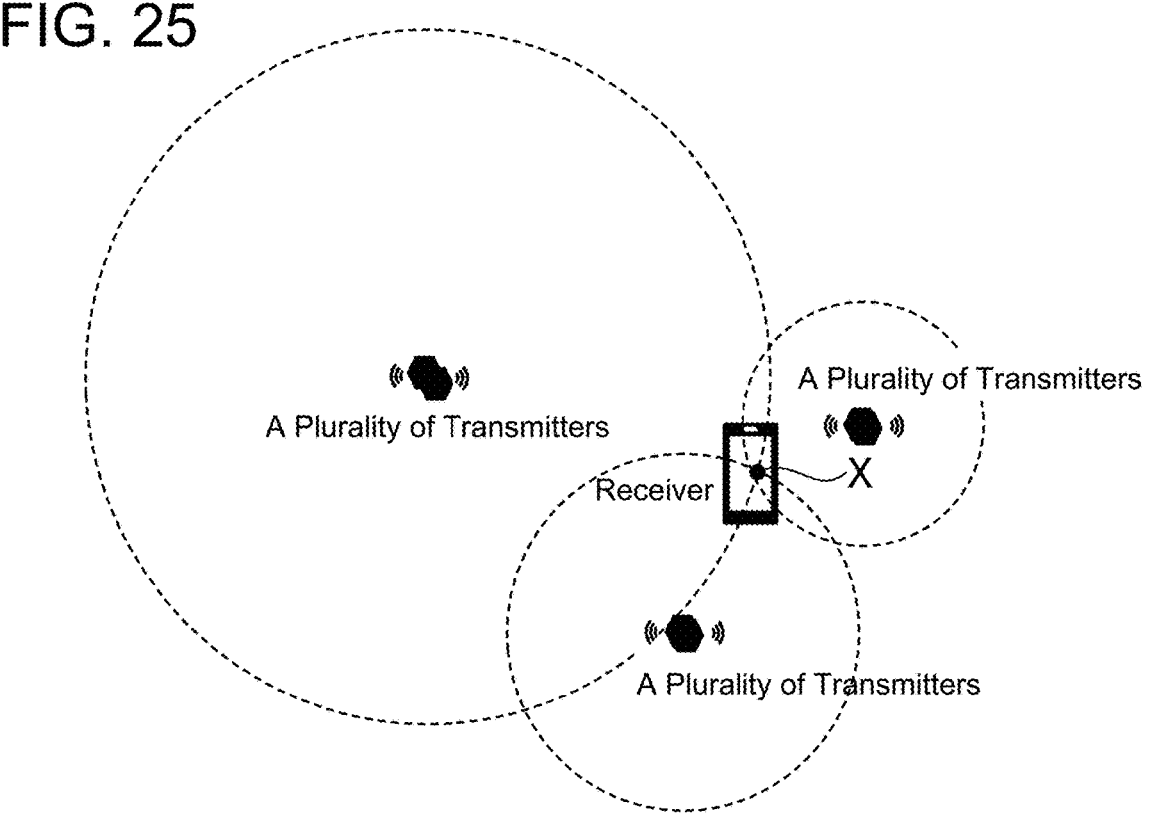
FIG. 25 is a schematic diagram showing an exemplary arrangement in which a smartphone terminal or the like serves as a BLE receiver, and three sets of BLE transmitters are arranged at three locations, a plurality of BLE transmitters being arranged at each location.
Figure 26:
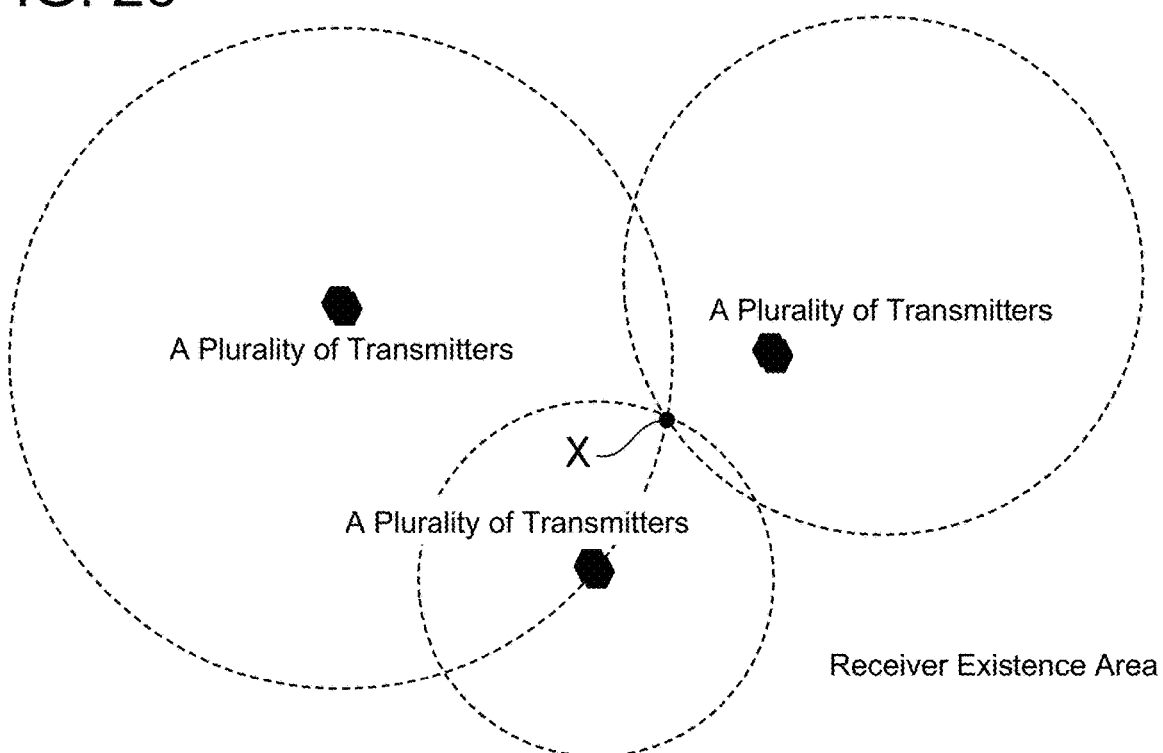
FIG. 26 is a schematic diagram showing an example of existence area of the BLE receiver which is predicted based on differences between averaged radio wave intensities at the locations each of which is obtained by averaging radio wave intensity in the plurality of BLE transmitters at each location in the exemplary arrangement of FIG. 25.

FIG. 25 shows an exemplary arrangement in which a smartphone terminal or the like serves as a BLE receiver, and three sets of BLE transmitters are arranged at three locations so that a plurality of transmitters are arranged at each location. FIG. 26 shows an example of existence area of the BLE receiver in the arrangement in which a smartphone terminal etc. is used as the BLE receiver, and three sets of BLE transmitters are arranged at three locations so that a plurality of transmitters are arranged at each location. The existence area of the BLE receiver is predicted based on differences between averaged radio wave intensities of BLE transmitters each of which is obtained by averaging radio wave intensity in the plurality of BLE receivers at each location. In this case, three Apollonius' circles or straight lines can be drawn. When three Apollonius' circles are drawn, a point X at which all the circles intersect each other can be obtained. The point X pinpoints the existence area of the BLE receiver. However, if only one straight line is drawn, the position of the BLE receiver cannot be pinpointed. The condition to always pinpoint the position is that four or more BLE transmitters are arranged to form a quadrangle which have sides not in parallel to each other.

Figure 27:
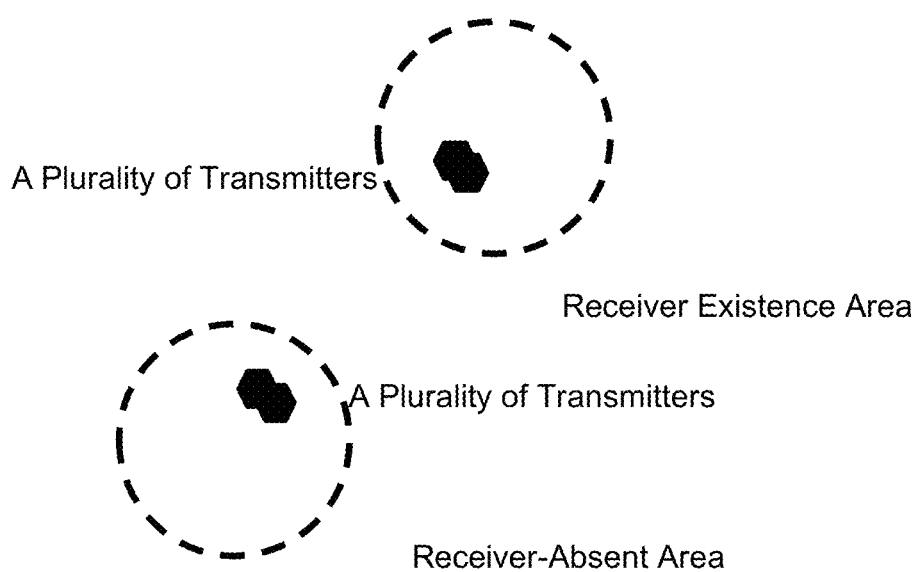
FIG. 27 is a schematic diagram showing an example of position determination of a BLE receiver in which a position of the BLE receiver is determined by narrowing its location area.

Alternatively, if the existence area of the BLE receiver is defined in a required size (e.g., circle having diameter of not greater than 40 cm), this existence area can be determined as the position of the BLE receiver. FIG. 27 shows an example of position determination of BLE receiver in which the position of the BLE receiver is determined by narrowing its location area. The existence area of a BLE receiver can be narrowed to an area which can distinguish one user who moves together with his or her smartphone terminal, etc. from other users who move together with their smartphone terminal, etc. (e.g., circle having a diameter not greater than 40 cm) with high accuracy by adjusting determination conditions. For example, two sets of BLE transmitters are arranged at two locations which are spaced at a certain fixed distance away from each other so that a plurality of BLE transmitters are arranged at each locations. In the case in which a determination condition is defined that a difference between averaged radio wave intensities at the locations each of which is obtained by averaging radio wave intensity in a plurality of BLE transmitters in each location corresponding to the plurality of BLE transmitters is not smaller than a predetermined threshold, if this condition is satisfied, the existence area of the BLE receiver can be determined inside an area inside an Apollonius' circles which is drawn based on the difference between averaged radio wave intensities at the locations each of which is obtained by averaging radio wave intensity in the plurality of BLE transmitters in each location.

In addition, in order that a plurality of BLE receivers can detect a similar level of radio wave intensity, a received radio wave intensity may be offset. Also, one of a plurality of BLE receivers on the far side from a BLE transmitter may be spaced at a certain interval away from the other BLE receivers on the near side in one location so that the one BLE receiver on the far side is considered as a far-side BLE receiver corresponding commonly to the other BLE receivers on the near side. In these cases, moving users who carry their smartphone terminal, etc. can be acquired, identified, and recognized one by one within a short time with high accuracy. Therefore, actions of a user required for authentication can be replaced by the automatic touchless operations.

Figure 28:
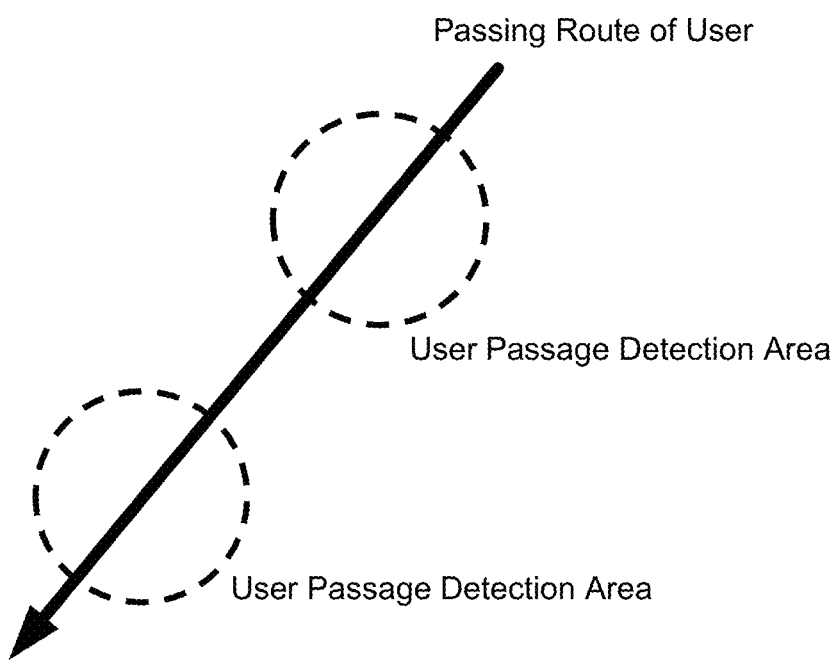
FIG. 28 is a schematic diagram showing an exemplary arrangement in which passage detection areas are arranged in two places on users' passing route.

However, when a user pays at an electronic cash register or ticket gate for example, if it is incorrectly determined that the user is located in an area where any BLE receiver is not arranged, problems will arise. Such incorrect determination is defined as misrecognition. Generally, it is necessary to reduce the probability of misrecognition. In the case in which highly accurate recognition is required such as in the case of payment or the like, it is necessarily to take additional measures to further reduce misrecognition. FIG. 28 shows exemplary additional measures which further reduce misrecognition in the case in which highly accurate recognition is required such as in the case of payment or the like. In the arrangement shown in FIG. 28, two passage detection areas which detect passage of users are arranged. A user is authenticated only when the user passes through the both passage detection areas within a certain time period. As a result, misrecognition can be further reduced. That is, even if a user unintentionally approaches one of the user passage detection areas and authentication of the user is made in the one user passage detection area, it is not determined that the user passes through the passage detection areas except when the authentication of the user is made in another user passage detection area. Also, the arrangement shown in FIG. 27 can be used in the additional measures. That is, in the case in which a first user passage detection area is defined, a determination method is used in which two sets of BLE transmitters are arranged at two locations which are spaced at different distances away from a BLE receiver as in the arrangement shown in FIG. 27, and a determination condition is defined that a difference between averaged radio wave intensities at the two locations each of which is obtained by averaging radio wave intensity in a plurality of BLE transmitters in each location is not smaller than a predetermined threshold. On the other hand, in the case in which a second user passage detection area is defined, a determination method is used in which two sets of BLE transmitters are arranged at two locations which are spaced at different distances away from a BLE receiver dissimilar to the arrangement shown in FIG. 27, and a determination condition is defined that a difference between averaged radio wave intensities at the two locations each of which is obtained by averaging radio wave intensity in a plurality of BLE transmitters in each location is not smaller than a predetermined threshold. However, in the case of the aforementioned arrangement in which a plurality of BLE transmitters are arranged, the BLE receiver is required to have an additional function which informs the position determination system of the measured radio wave intensity result, the position determination result based on the measured radio wave intensities, and the like.

It is noted that three Apollonius' circles or straight lines which are drawn as an existence area of a BLE transmitter based on radio wave intensities do not always intersect each other at one point in actual determination dissimilar to FIGS. 23 and 26. For this reason, it is preferable that three or more Apollonius' circles or straight lines are prepared to determine a point which minimizes error as the position of the BLE receiver. Accordingly, temporal measurement variation of transmission and reception BLE radio wave intensity can be sufficiently reduced so that a position of a BLE transmitter can be determined within a short time with high accuracy also in the second embodiment similar to the first embodiment.

It has been described that a method which determines or detects distances and position by using BLE in the first to third embodiments. However, the present invention is not limited to BLE. Other wireless communication standards, such as Bluetooth standards other than BLE, Wi-Fi, RFID, IMES, ultrasonic waves, ZigBee, optical communication can be used. User positions can be stably determined by using such wireless communications without using GPS, in other words, even in buildings.

(Authentication Method in One-Directional Communications)

In the case in which authentication is included in the position determination, security problems will arise. The reason is that, if a position of a person or terminal is determined as a position of another (authentication spoofing), the person can get items at an electronic cash register or pass through a ticket gate without required payments, for example. Authentication in one-directional communications according to another embodiment of the present invention is now described.

Figure 29:
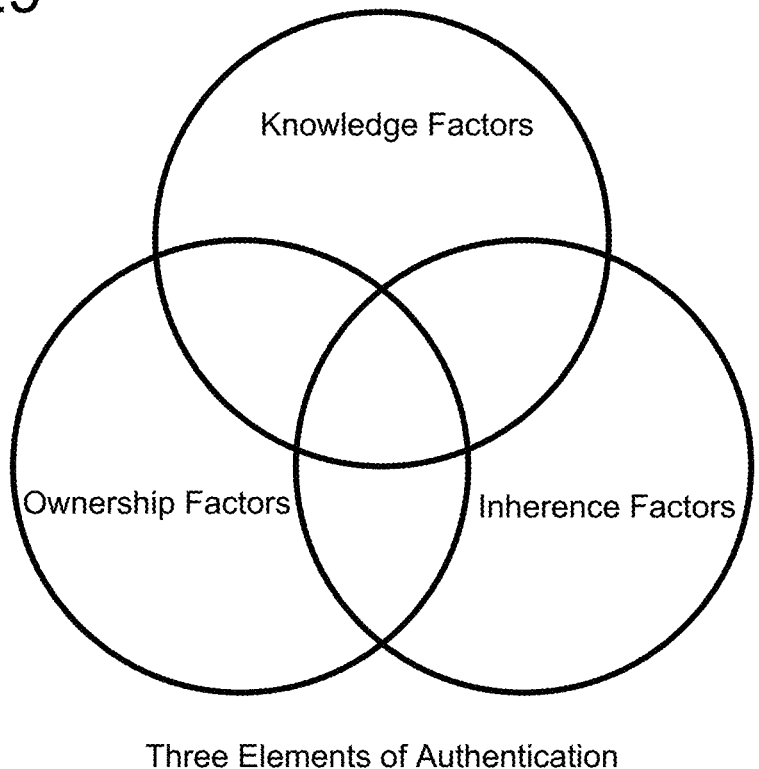
FIG. 29 is a schematic diagram showing three elements of authentication.

Firstly, various methods have been proposed for authentication. Here, FIG. 29 shows three elements of authentication. IDs and passwords which are widely used for authentication belong to knowledge factors which are something the user knows. As knowledge factors, in addition to ID and password, PIN number, challenge response (partially belongs to ownership factors), and the like can be provided.

IC cards used to unlock doors or the like belong to ownership factors which are something the user has. In addition to IC card, one-time password, USB token, SMS authentication, E-mail authentication, voice call, and smartphone application software authentication, checkerboard, and the like can be provided as ownership factors.

In addition, fingerprint or the like belongs to inherence factors which are something the user is or does. In addition to fingerprint, face, iris pattern, retinal pattern, vein patter, and the like can be provided as inherence factors.

In the authentication in this the position determination, the knowledge, ownership, and inherence factors can be used to prevent authentication spoofing. High levels of security can be provided by two-step authentication, multi-factor authentication, and the like in which a plurality of factors are used together.

In authentication methods which are currently used, no method is known which securely authenticate personal identification in a non-contact manner without inconvenience. For example, although a method which allows a user to unlock a car door by user's touch on its doorknob is known, this is not a non-contact method. Also, methods which allow a user to make payments by holding his or her IC card, smartphone terminal or the like over a corresponding reader, or by scanning a symbol such as QR code and bar code is known. Although the methods are not a contact method, they require users to bring users' IC card close to the reader or to bring their smartphone terminal, etc. close to the QR code or the like. For this reason, users necessarily pick their IC card, smartphone terminal or the like to hold it over a corresponding reader. This operation is inconvenient for users. Also, in a method which unlocks an automatic door when a user who carries a wireless device serving as a key reaches the door, the position of the user cannot be pinpointed. For this reason, if there are two or more users in front of the door, it is difficult identify which user is authenticated. As a result, it cannot be said high levels of security is provided.

To address this, it can be considered that authentication of user's personal identification is used together with user's positional information. That is, it can be understood that non-contact authentication of user's personal identification without inconvenience and the personal identification of a user who carries a terminal, IC card, or the like to be subjected to the authentication necessarily relate to certain positional information.

Some methods which measure such positional information can be illustratively provided. On the condition that positional information is measured in a non-contact manner without inconvenience, wireless communication (e.g., radio waves), light, or a physical medium such as air through which sound waves propagate is used. In the case of the outdoors, positions can be determined in wide areas with high accuracy by a small number of position determination apparatuses 20 by using measurement which uses relativity such as GPS. However, in buildings, obstructions to radio waves with various frequencies exist. For this reason, a large number of position determination apparatuses 20 are necessarily provided. When a position of a user is determined to ensure security, a positional accuracy of approximately 40 cm is required. From this viewpoint, distances between the position determination apparatuses 20 are preferably smaller. As a result, the number of the position determination apparatuses 20 is likely large. When positions of terminals are determined, they are required to communicate with some of or all of such a large number of position determination apparatuses 20. To achieve this, a large number of communication channels are necessarily provided. In other words, a large number of communication channels are necessarily provided to acquire the positional information.

Generally, there are many users whose positional information is required. If simple bidirectional communication is used in such conditions, bidirectional many-to-many communication will be performed. In such many-to-many bidirectional communication, the required number of communication channels is estimated by multiplying the number of users by the number of the position determination apparatuses 20. For this reason, a shortage of communication frequency bands will arise.

To address this, measures are conceivable which restrict the number of communication bands which can be used by one terminal, IC card, or the like which is subjected to authentication of a user who carries it to one or two, for example, or restrict the number of communication bands which can be used by one position determination apparatus 20 to one or two, for example.

However, in such restriction, it is difficult to ensure security. In an exemplary case, when a position of a user is determined by using a signal including ID or something corresponding to ID which is transmitted by a terminal, IC card, or the like to be subjected to the authentication of the user, authentication of the position determination and positional information is completed. In this case, ID or something corresponding to ID is necessarily encrypted. However, if the encryption always uses a fixed encryption key, the encrypted ID or something corresponding to ID is fixed. For this reason, such authentication is likely to be subjected to spoofing attack. That is, spoofing attack can be made by using copying and transmitting the encrypted ID or something corresponding to ID.

To address this, it is conceivable that the encryption key or the encryption procedure is changed in each communication, for example. However, such change cannot be used in this embodiment according to the present invention. Generally, communication terminals stably bidirectionally communicate with each other while synchronizing the change timing of the encryption key or encryption procedure, adjusting the communication in a case of failure, and performing other operations. In the case in which a signal including ID or something corresponding to ID propagates in one communication band, if the communication fails, it takes very long time for entire synchronization between the communication terminals. That is why such change cannot be used in this embodiment. For this reason, communication terminals that fail to communicate with each other cannot start communicating soon with each other.

To address this, in this embodiment, one-directional communication is used in the case of many-to-many communication. In this case, a terminal, IC card, or the like to be subjected to authentication of a user one-directionally communicates with the position determination apparatus 20 so that the position of the terminal, IC card, or the like to be subjected to authentication of the user relative to the position determination apparatus 20 is determined based on the information obtained in the one-directional communication. Alternatively, contrary to this, the position determination apparatus 20 one-directionally communicates with a terminal or the like to be subjected to authentication of a user so that the position of the terminal or the like relative to the position determination apparatus 20 is determined based on the information obtained in the one-directional communication. For example, in the case in which they have BLE communication function, BLE beacons can one-directionally communicates with a terminal or the like. In such one-directional one-to-one or one-to-many communication, the security problem can be solved by issuing one-time password in each communication.

It is noted that a method which measures positional information is not limited to this embodiment. For example, one-time password is added to a signal including ID or something corresponding to ID which is transmitted by a terminal, IC card, or the like to be subjected to authentication of a user in each communication, and the signal is transmitted so that the position of the user is determined based on the signal. As a result, a number of position determination apparatuses 20 can complete authentication of the position determination and positional information by authenticating the one-time password every when receiving the signal. Because such a signal can be used only once, second authentication cannot be completed even if the signal is tapped. In addition, even if any of a number of position determination apparatuses 20 fails to receive the signal, it can receive another signal again immediately after the failure of signal reception. Therefore, very stable communication can be realized.

(One-Time Password)

However, any existing one-time passwords do not satisfy the aforementioned requirements. Examples of currently available one-time passwords can be provided by (1) hash chain type, (2) time-synchronization type, (3) challenge type, (4) transaction type, and the like.

(1) Hash chain type passwords use one-way functions such as hash function. A hash function is applied to a seed (starting value) to obtain a value. Generally, the seed cannot be obtained from the obtained value. For this reason, a required number of series of passwords can be created by repeatedly applying a one-way function such as hash function. Each of the series of passwords is used as one-time password in the reverse order within each valid time period. Even if an attacker knows the password that is currently used, the attacker would not obtain next password within the next valid time period. The series of passwords cannot be infinitely created.

(2) Time synchronization type passwords use a token which is obtained from a clock. The same algorithm is used inside a device to be authenticated and a device to authenticate the authenticated device so that they obtain their tokens and the authenticating device authenticates the authenticated device base on whether their tokens agree with each other. Even if their clocks are deviated from each other, the authenticating device detects the deviated time and corrects its clock to the clock of the authenticated device to authenticate the authenticated device. Accordingly, authentication can be constantly performed based on synchronized clocks. However, synchronization between the clocks requires token update time of one minute, time deviation within one second, and the like. For this reason, clock correction in the order of microseconds cannot be realized.

(3) Challenge type passwords require a device to be authenticated to an answer (response) to a question (challenge) provided from a device to authenticate the authenticated device. To avoid duplicates of the answer, a system is usually involved which, if the same challenge is provided twice, requires a different answer. It is noted that the challenged type passwords are predicated on bidirectional communication.

(4) Transaction type passwords previously prepare a list of passwords so that the user is required to enter specific one of passwords from the list in each authentication. One password can be used only once. The list of passwords cannot be infinitely created.

Also, three conditions are required for one-time passwords to ensure security in one directional many-to-many communication. The three conditions are that (1) one-time passwords can be used in one directional communication; (2) one-time passwords can be used infinite times; and (3) one-time passwords can be used at high speed to determine positions and the like. However, one-time passwords which have been invented cannot satisfy all the conditions.

To address this, in this embodiment, the problems are solved by transmitting encrypted times. That is, when a certain communication environment is established, time difference between the transmission side and the reception side is substantially fixed in the certain communication environment, and accordingly, based on the substantially fixed time difference, the authenticity of a communication can be decided by checking time differences between transmission and reception. Specifically, when transmitting data to a position determination apparatus, a personal portable terminal transmits identification information and a one-time password. At this time, when issuing the one-time password, the personal portable terminal acquires the issue time, and uses a common key for encryption of information relating to the issue time whereby issuing the encrypted information as the one-time password. The personal portable terminal transmits the identification information and one-time password to the position determination apparatus.

On the other hand, when receiving the identification information and the one-time password from the personal terminal side transmitter, the position determination side receiver obtains a reception time by using its position determination side clock. Subsequently, the position determination side receiver to retrieves the common key corresponding to the identification information from its position determination side storage device based on the received identification information, decrypts the one-time password by using the obtained common key, and obtains information relating to the issue time to which a function is applied. Accordingly, because the information relating to the issue time when the one-time password is issued (i.e., transmission time on the personal portable terminal side) and information relating to the reception time can be obtained, the difference between the issue time and the reception time can be obtained.

As discussed above, the difference between the password issue time and the reception time of the data (i.e., time difference from the transmission time to the reception time) is measured in each data communication. Generally, in the case in which the transmission side and the reception side are located under a certain fixed communication environment, it is hardly considered that the communication environment sharply changes within a short time. For example, when a user who carried his or her smartphone terminal passes through an automatic ticket gate in a station, the communication speed through BLE can be expected constant until he or she leaves the automatic ticket gate.

For this reason, if time required for communication is constant in each communication (e.g., each packet), the time differences from the transmission time to the reception time will be also fixed. On the other hand, malicious access such as spoofing is considered in which a malicious user who passed through the automatic ticket gate tries to be determined as another proper user. In a case of such malicious access, it is hardly considered that the another proper user as whom the malicious user tries to be determined is in a place close to the malicious user, in other words, it is naturally considered that the malicious user accesses the system from a remote place through a communication path such as Internet. In this case, it is expected that the time difference between the transmission time and the reception time in the case of the malicious user is different from (e.g., longer than) the another proper user.

Based on the expectation, a time difference between the transmission time and the reception time is measured in each communication so that it can be determined that data is properly transmitted if measured time differences are fixed, and malicious access such as spoofing is suspected if measured time differences are not fixed. For this reason, malicious access can be detected by encrypting transmission times and transmitting the encrypted times, that is, malicious access is detected by monitoring time differences between transmission and reception if the time differences are substantially different from each other. Consequently, the personal portable terminal can be authenticated.

In addition, the authentication of the personal portable terminal is executed every when the personal portable terminal is located close to the position determination apparatus. For example, the authentication is executed every when a user who carries his or her smartphone terminal passes through the automatic ticket gate. Accordingly, even if transmissions speeds at automatic ticket gates are different from each other, the time difference between transmission and reception are measured in each environment. As a result, the user can be properly authenticated. For this reason, information on time difference which is has been obtained is preferably deleted after a certain time period elapses.

For example, a difference between issue time that is obtained at a reception time at certain timing (preferably, in an early stage of data communication) and a reception time at which the issue time that is obtained is stored as authentication reference information in the position determination side storage device or the like. The authentication is executed based on a time difference with respect to the authentication reference information for a predetermined time period after the authentication reference information is stored. That is, differences between the reception time and the issue time are compared with the authentication reference information for a series of communications data so that the authentication is executed if the time differences are in the same level as or substantially in the same level as the authentication reference information, and the authentication is not executed if the time differences are substantially different from the authentication reference information. Accordingly, the authentication can be smoothly executed. After a predetermined time period elapses, the authentication reference information is deleted. After that, when the smartphone terminal starts another communication, new authentication reference information is obtained so that the new authentication reference is rewritten in the storage device. Accordingly, even if spoofing attack is succeeded once, the spoofing attack can be eliminated in next authentication. Therefore, the security can be further improved.

Figure 30:
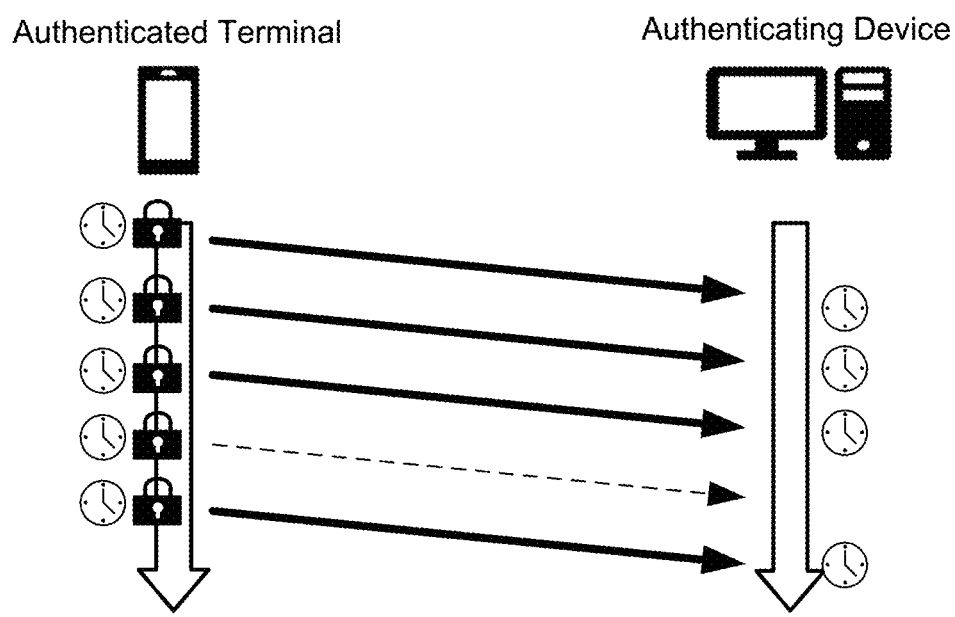
FIG. 30 is a schematic diagram showing authentication transmitting encrypted times.

FIG. 30 shows authentication in which encrypted times transmitted. For example, it is assumed that Alice one-directionally communicates with Bob. Alice and Bob securely share unique identification information of a terminal, etc. which is carried by Alice to be to be subjected to authentication (e.g., ID), and an encryption key which is paired with the ID in advance of the authentication. A time for example in the unit of microseconds (e.g., in Unix time which is seconds since 00:00:00 UTC on 1 Jan. 1970) which is provided the terminal, etc. at transmission (transmission time) is encrypted so that a signal is produced by combining the encrypted time with the unique ID, etc. of the terminal, etc. which is carried by Alice to be to be subjected to authentication on the Alice side. Alice transmits the signal to Bob. When receiving the signal, Bob retrieves the encryption key for decryption based on the received ID, etc., and decrypts the encrypted time by using the encryption key whereby obtaining a difference between a time when the signal is received (the reception time) and the decrypted transmission time. Subsequently, Bob similarly obtains a new time difference by applying the same processing to a received next signal at the next reception timing, and decides whether the new time difference obtained at the next reception timing is in agreement with the previous time difference. If the new time difference agrees with the previous time difference, the signal is decided as a new signal from Alice so that Alice is authenticated. If not, authentication is not executed. After that, the procedure is repeated. It is noted that the reference time to be compared with a new time can be defined by any signal which is produced at an arbitrary time.

Alternatively, when receiving the signal, Bob retrieves the encryption key for decryption based on the received ID, etc., and decrypts the encrypted time by using the encryption key whereby storing a time when the signal is received (the reception time) and the decrypted transmission time. Subsequently, Bob similarly obtains a new time difference by applying the same processing to a received next signal at the next reception timing, and decides whether a time difference between the previous and new decrypted transmission times in agreement with a time difference between previous and new reception times. If the transmission time difference agrees with the reception time difference, the signal is decided as a new signal from Alice so that Alice is authenticated. If not, authentication is not executed. After that, the procedure is repeated. It is noted that the reference time to be compared with a new time can be defined by any signal which is produced at an arbitrary time.

In actual use, an additional processing which adjusts the agreement to tolerate an error within a certain threshold (e.g., one microsecond) and so as not to tolerate disagreement in the order of seconds or the like may be provided.

In this method, because this signal can be used only once, it cannot be used second time for authentication even if stolen. In addition, even if any of a number of position determination apparatuses 20 fails to receive the signal, it can receive another signal again immediately after the failure of signal reception so that authentication can be executed soon after successful reception. Therefore, very stable authentication can be realized.

In particular, in a case in which communication data is stolen and the stolen data is transmitted, its receipt timing is different from the encrypted time. Accordingly, it cannot be used second time for authentication. In addition to this, even if the signal is simply copied at high speed by an analog circuit or the like, spoofing attack can be detected when the same signal is received twice or more. On the other hand, if two or more signals are simply copied, all the signals from users close to the spoofing attacker are copied. Accordingly, it is determined that two or more persons occupy one location. As a result, spoofing attack can be detected.

The number of bits of an ID can be 40, for example. 40 bits can provide IDs to roughly one trillion persons. For this reason, 40 bits are enough to provide unique IDs to people. In addition, ID can be assigned to any layer of OSI reference model. The number of bits of a time can be 48, for example. 48 bits can represent roughly 4000 years in microseconds.

Before encryption, a time can be transformed into a form which is hardly guessed as time. Alternatively, padding or the like can be applied to a time. Also, common-key cryptography such as 3DES and AES can be used for the encryption. Alternatively, public-key cryptography such as elliptic-curve cryptography can be used. Also, a time is converted into an expression in the unit of microseconds by measuring a time in the unit of microseconds since 00:00:00 UTC on 1 Jan. 1970 or by separately measuring times in the unit of seconds and in the unit of microseconds and then adding the time in the unit of microseconds to the time in the unit of seconds.

Also, a time used in this embodiment does not necessarily agree with a time in the unit of microseconds since 00:00:00 UTC on 1 Jan. 1970, and a certain error is tolerated. However, if a too large error is tolerated, security problems arise. Here, it is assumed that, in the case in which Alice one-directionally communicates with Bob by using a method according to this embodiment, Alice transmits signals at random intervals, and Eve is an attacker. In this case, if Eve records an information set of a transmitted signal from Alice and its transmission timing and transmits the signal at the recorded timing, Bob cannot distinguish whether the signal from Eve is transmitted from Alice or other person. To address this, a time used in this embodiment necessarily falls within a tolerance of ten seconds, for example, during which Alice can be considered to continuously transmit signals. For this reason, terminals are preferably synchronized with a time server or the like at suitable intervals.

Also, a system which authenticates users through their smartphone terminal, etc. at a certain interval (e.g., every day) can be provided. In addition, after the certain interval elapses (e.g., one day), a message or the like may be popped up to urge users to be subjected to authentication. Alternatively, their authentication is kept valid for another certain period (e.g., another one day).

Fourth Embodiment

Figure 31:
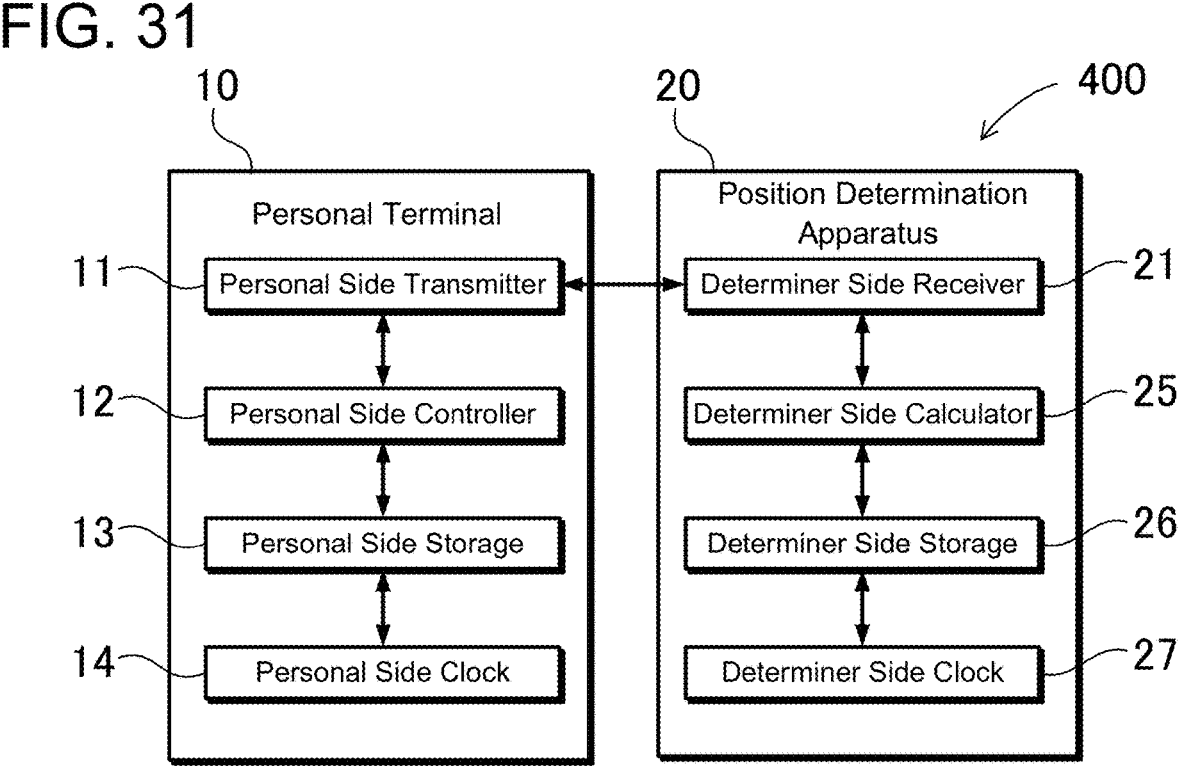
FIG. 31 is a functional block diagram showing an authentication system according to a fourth embodiment.

In addition, the authentication method in one-directional communication according to the foregoing embodiment can be used for general one-directional signals which are not intended to determine positions. That is, this securely encrypted authentic method can be used for BLE beacons which are one type of one-direction communications, intra-company wireless communications, and the like. FIG. 31 is a functional block diagram of an authentication system according to a fourth embodiment in which position determination is not required. This illustrated authentication system 400 includes a personal portable terminal 10 that is to be carried by a person whose position is determined, and a position determination apparatus 20 that determines the position of the personal portable terminal 10. The personal portable terminal 10 includes a personal terminal side transmitter 11, a personal terminal side controller 12, a personal terminal side storage device 13, and a personal terminal side clock 14. The personal terminal side transmitter 11 bidirectionally communicates with the position determination apparatus 20. Also, the personal terminal side controller 12 controls the personal terminal side transmitter 11. The personal terminal side storage device 13 stores unique identification information which is provided to the personal portable terminal 10, a common key that is uniquely provided to the identification information which is previously exchanged between the personal portable terminal 10 and the position determination apparatus 20, and a predetermined function that is used to issue the one-time password. The personal terminal side clock 14 issues information relating to a time of day.

Also, the position determination apparatus 20 includes a position determination side receiver 21, a position determination side calculator 25, a position determination side storage device 26, and a position determination side clock 27. The position determination side receiver 21 bidirectionally communicates with the personal terminal side transmitter 11. The position determination side calculator 25 performs authentication of the personal portable terminal 10 based on communication of the position determination side receiver 21 with the personal terminal side transmitter 11. The position determination side storage device 26 stores the identification information which is provided to the personal portable terminal 10 and a unique common key which is provided to the identification information so that the associated identification information and unique common key are associated with each other. The position determination side clock 27 issues information relating to a time of day.

The personal terminal side controller 12 can provide the unique identification information which is stored in the personal terminal side storage device 13 and a one-time password that is uniquely provided to the unique identification information and can be used only once when communicating with the position determination side receiver 21 through the personal terminal side transmitter 11. The position determination side calculator 25 performs authentication of the personal portable terminal based on the identification information and the one-time password which are transmitted from the personal terminal side transmitter 11 and received by the position determination side receiver 21.

In the transmission of the identification information and the one-time password by the personal portable terminal 10 to the position determination apparatus 20, the personal terminal side controller 12 obtains information relating to an issue time from the personal terminal side clock 14 when the one-time password is issued, applies the information to the predetermined function which is stored in the personal terminal side storage device 13, and further encrypts the information which is obtained by the predetermined function with the common key which is stored in the personal terminal side storage device 13 whereby issuing the one-time password.

When the position determination side receiver 21 receives the identification information and the one-time password from the personal terminal side transmitter 11, the position determination side calculator 25 obtains a reception time from the position determination side clock 27. Subsequently, the position determination side receiver to retrieves the common key corresponding to the identification information from the position determination side storage device 26 based on the received identification information, decrypts the one-time password by using the obtained common key, and obtains function-applied information relating to the issue time. A difference between the information relating to the issue time that is obtained at one reception time and information relating to the one reception time is calculated. That is, information relating to time of communication is calculated by subtracting the issue time from the reception time. Subsequently, similar procedure is executed at another timing to calculate time of communication. If the time of communication at the another timing agrees with the previous timing, it is determined that the communication is properly executed so that the personal portable terminal is authenticated. Contrary to this, if the time of communication at the another timing substantially disagrees with the previous timing, malicious access is detected so that authentication is not executed. As a result, the user who carries the personal portable terminal 10 can be authenticated, and the position of the user can be detected.

In the case in which communication environments are expected fixed (unchanged), times of communications will be the same for every communication procedure. Although time information is corrected in each of devices/apparatuses such as personal portable terminal, position determination apparatus, and server based on a world clock or time server, the devices/apparatuses may have a certain error. For this reason, generally, times in portable terminals and position determination apparatuses do not completely agree with each other. Here, it is assumed that the devices/apparatuses have an error of approximately 100 microseconds. In the case of such a time error, spoofing attack from a remote place may be possible. A communication even from a remote place often takes tens microseconds. In a case in which a spoofing attacker maliciously steals transmission information of a personal portable terminal of a user A and similarly transmits the stolen transmission information in another place, the spoofing attack may be succeed. To prevent such attacks, it can be considered that a time difference in several microseconds is not tolerated.

For this reason, in this embodiment, a time of communication is stored as authentication reference information as discussed above so that authentication is executed in each communication based on comparison with the value of the authentication reference information. Times of communications from a remote place will vary due to net congestions. Contrary to this, because speeds in communications to the position determination apparatus from the personal portable terminal of the user A at the location close to the position determination apparatus are almost speed of light, variation between times of communication is hardly produced. As a result, spoofing attacks can be effectively prevented. However, if a spoofing attacker records and stores transmission timing and data, and transmits the data at proper timing, there is a possibility that the spoofing attack is succeed. For this reason, it is preferable to define an absolute restriction time difference. For example, a reference time difference (e.g., not greater than 1 second or 100 microseconds) is defined as the absolute restriction time difference. In the case of an automatic ticket gate, a time difference between a time when the automatic ticket gate receives data and a time when the data is decrypted (i.e., transmission time on the personal portable terminal side) can be obtained as discussed later. If this time difference is greater than the reference time difference which is previously defined, the data is dismissed. Therefore, spoofing attacks can be prevented.

According to the authentication method according to this embodiment which uses one-directional communication, authentication at speed higher than typical bidirectional communication which uses public-key cryptography or the like can be realized. Generally, encryption in one-directional communication which is widely used in intra-company wireless communication in which a number of users communicate with each other uses a common key which is previously defined. In this case, the common key is installed in communication devices. For this reason, if the common key is leaked from one communication device, security problems are likely to arise in its entire communication system. Contrary to this, because communication devices can be provided with different common keys in this embodiment, such security problems are unlikely to arise. That is, even in methods which do not require accurate positional information, such as in the cases in which a doorknob is touched, a QR code is read by IC card, smartphone terminal or the like, and BLE beacons and the like are used, the authentication method according to this embodiment which uses one-directional communication can be used to authenticate users when the users unlocked a door or pay at an electronic cash register. Accordingly, moving users who carry their smartphone terminal, etc. can be securely acquired and identified one by one within a short time with high accuracy in a non-contact manner without inconvenience. Therefore, actions of a user required for authentication can be replaced by the automatic touchless operations.

It is noted that the calculators is unnecessary for the BLE transmitters if security is not required. On the other hand, signals which are transmitted for position determination or authentication as in this embodiment may cause a shortage of communication bands. For this reason, it is very preferable for industrial development to transmit such signals in limited areas, times, and the like which are required to receive the signals. The following description will describe examples of this embodiment.

Example 1

(Deferred Payment System)

Figure 32:
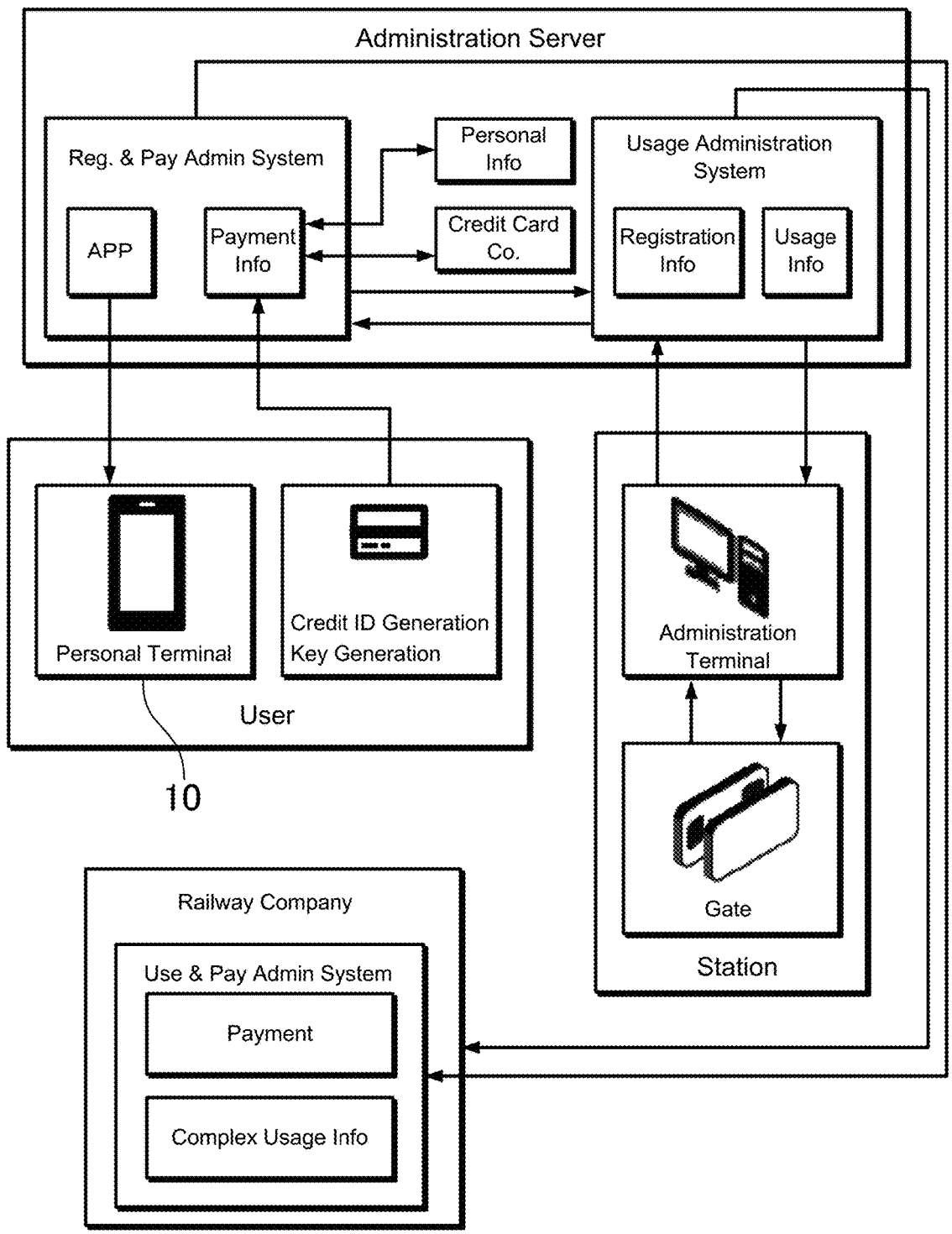
FIG. 32 is a schematic diagram showing a deferred payment system according to Example 1.
Figure 33:
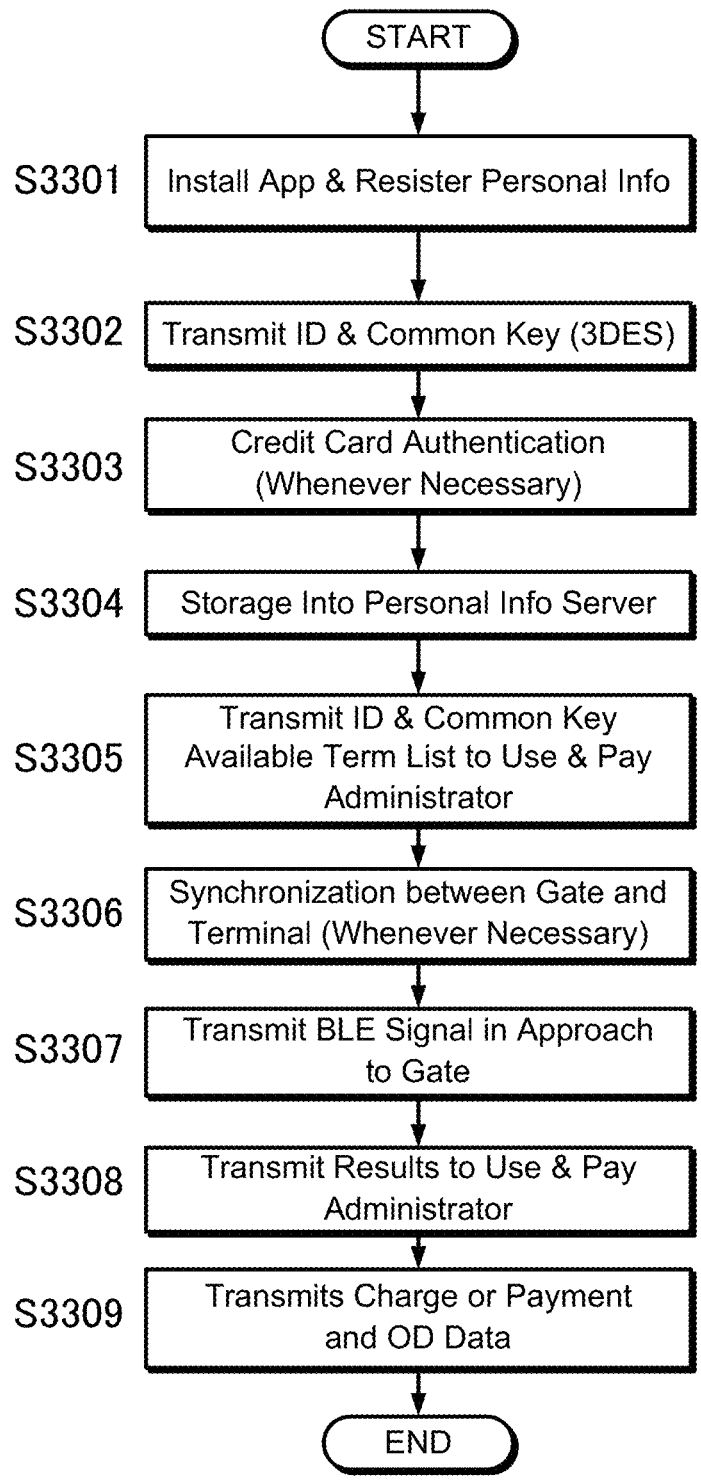
FIG. 33 is a flowchart illustrating the procedure of deferred payment by the deferred payment system shown FIG. 32.

A system according to Example 1 which allows users to pay at a station ticket gate without picking up their personal portable terminal 10 is illustratively described. It is noted that similar deferred payment systems can be applied to public transportation such as bus services. FIG. 32 is a schematic diagram showing the deferred payment system according to Example 1. FIG. 33 is a flowchart in the system. The deferred payment system shown in FIG. 32 includes an administration server which includes a registration and payment administration system and a usage history administration system, a station in which a ticket gate is installed, a personal portable terminal 10 which is carried by a user, and a railway company. It is noted that, although deferred payment in which the user pays after using the railway or the like is illustratively described, the present invention is not limited to deferred payment but can be applied to advance payment and simultaneous payment.

The procedure of deferred payment in the deferred payment system is now described with reference to the flowchart of FIG. 33. First, in Step S3301, application software dedicated to deferred payment of ticket at ticket gate is previously installed in the user's personal portable terminal 10. In addition, personal information such as name, credit card number for payments is registered in the dedicated application software in advance.

Subsequently, in Step S3302, the personal portable terminal 10 transmits an ID common key (e.g., 3DES) to the registration and the payment administration system in the registration server by using the dedicated application software. Subsequently, in Step S3303, the registration payment administration system authenticates credit card information through a credit card company at required timing. Subsequently, in Step S3304, the transmitted personal information is stored in a personal information server. Subsequently, in Step S3305, the registration and payment administration system transmits an ID common key available term list is to the usage history administration system.

Subsequently, in Step S3306, when the user uses the railway company, synchronization between the ticket gate and the terminal is executed. Subsequently, in Step S3307, when approaching the ticket gate, the personal portable terminal 10 transmits a BLE signal to the automatic ticket gate which is the position determination apparatus 20.

Subsequently, in Step S3307, the position determination system is activated to determine the position of the personal portable terminal 10. Subsequently, in Step S3308, the position determination system transmits the determined position to the usage history administration system.

Finally, in Step S3309, the administration server transmits charge or payment and OD data, and the like to the personal portable terminal 10.

Figure 34:
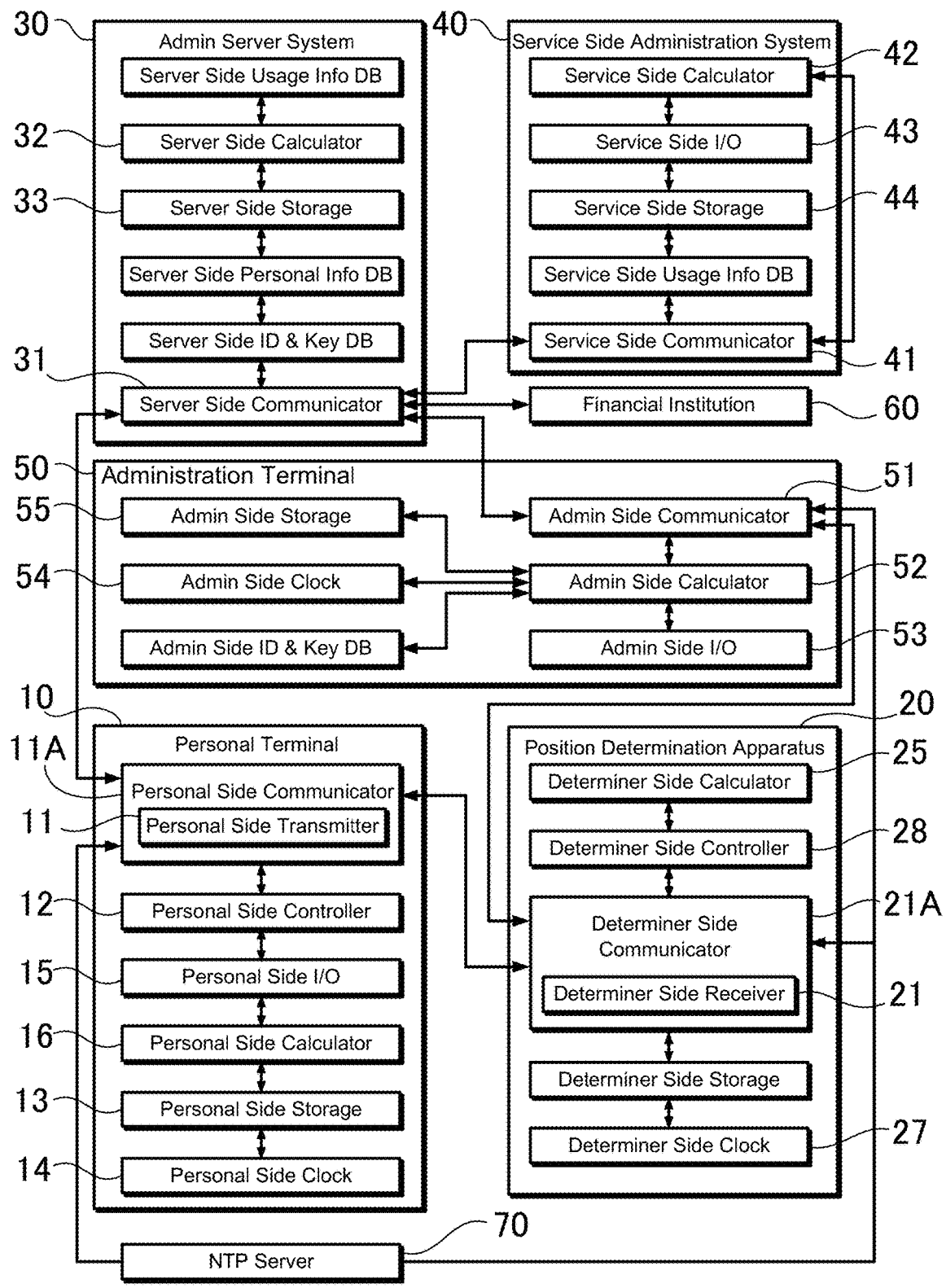
FIG. 34 is a detailed block diagram of the deferred payment system.

FIG. 34 is a detailed block diagram of the deferred payment system. This illustrated deferred payment system includes an administration server system 30, a business-service side administration system 40, an administration terminal 50, the position determination apparatus 20, the personal portable terminal 10, a financial institution 60, and a network time protocol server (time distribution server) 70. They have communication function, and are connected to each other through a communication network. For example, they communicate with each other through networks such as WAN, LAN, cellular communication network, Wi-Fi, Bluetooth, and Internet. In the case of bidirectional communication, encryption, digital certificate, and electronic signature can be realized by using public-key cryptography or common-key cryptography. To this end, required keys are generated by their calculator and saved in their storage device together with an ID and encryption key database if necessary. In addition, certificates of certification authorities can be used for authentication if necessary. It is noted that general calculators, sensors or other processor can be realized by software or hardware. For example, they can be realized by software executed in a CPU or the like, or by hardware such as LSI, ASIC, and FPGA. Also, a storage device such as general memory is included in each of them. For example, the storage device can be constructed of nonvolatile storage medium such as ROM, flash memory, HDD and SD card, or volatile storage medium such as RAM and register. As discussed above, an X calculator referred in this specification can be realized by hardware such as computer and server, or by software. In addition, in the case in which the calculator is realized by hardware, arithmetic processing devices such as CPU, LSI, and ASIC, can be used. Similarly, X storage device referred in this specification can be constructed of a hard disk drive, nonvolatile semiconductor memory, or the like.

In this example, the business service side administration system 40 can be installed in an IT administration section in the railway company, or the like. Also, the administration terminal 50 can be installed in the station or the like. A plurality of automatic ticket gates can be installed as the position determination apparatus 20. Here, the business service side administration system 40 and the administration terminal 50 can have simple construction constructed of a fewer components. Also, the personal portable terminal 10 can have a plurality of sensors. On the other hand, in the case in which the deferred payment system is used for bus services, the administration terminal 50 can be installed in a business office, and the position determination apparatus 20 can be installed in busses. Alternatively, required data can be exchanged by using SD cards (trade name) or the like instead of communication though Internet.

(Administration Server System 30)

The administration server system 30 is a server group which includes a server side communicator 31, a server side calculator 32, a server side storage device 33, a server side information database, a server side personal information database, and a server side ID and encryption key database. The administration server system 30 is constructed of one or a plurality of servers. The administration server system 30 is connected to the entire deferred payment system to manage the entire deferred payment system according to this example. The administration server system 30 registers personal data, and intermediates services between a user and the business entity which uses the position determination apparatuses 20. In addition, in the case in which the personal data includes payment information, the administration server system receives a payment of a fee from a user who uses a service of the business entity based on a charge table of services of the business entity which is provided by the business entity. Also, the administration server system communicates with the financial institution 60 to conduct credit examinations and to perform validation and authentication of users in registration or whenever necessary. The administration server system can notify the personal portable terminal 10, the administration terminal 50, a positional information authentication apparatus, and the like about the results. Server side databases can be distributed to a plurality of different data storage places. Although communication with the personal portable terminal 10 is necessarily constantly kept as much as possible, the personal portable terminal 10 does not necessarily constantly connected to the business service side system or other system. The communication is preferably shared by at least two types of servers from the viewpoint of stability. The server side usage information database, the server side personal information database, and server side ID and encryption key database can be separately provided, or integrally provided. Alternatively, they may be incorporated in the server side storage device 33.

The server side ID and encryption key database saves the encryption key which is paired with the unique ID of the personal portable terminal 10, the usage place, available term, and the like which are transmitted from the administration server system 30, and distributes them to the administration terminals 50 or the position determination apparatuses 20. The distributed information can include a record of comings and goings. Common-key cryptography such as 3DES and AES cryptography can be used for the encryption key. Alternatively, public-key cryptography such as RSA, DSA, and elliptic-curve cryptography can be used for the encryption key. It is preferable for BLE beacons that the number of bits is small such as in the case of 3DES and that the calculation cost is low such as in the case of common key cryptography. However, it is preferable that the cryptography which has higher security but relatively low calculation cost is used as the number of available bits increases.

(Business Service Side Administration System 40)

The business service side administration system 40 includes a business service side communicator 41, a business service side calculator 42, a business service side input/output (I/O) device 43, a business service side usage information database, and a business service side storage device 44. The business service side administration system 40 receives use application from users who are registered in the administration server system 30, and obtains incomes corresponding to services and the like which are provided by the business entity and used by users and the usage information. In addition, the business entity can limit available places, available term, and the like of position determination apparatuses 20 which can be used by each user depending on the services which are provided by the business entity. Also, in the case in which the business entity receives fees from users in accordance with services which are provided by the business entity, the business entity provides a charge table of services to the administration server system 30 through the business service side administration system 40. In addition, the business service side administration system may acquire a certain part of user information which is excluded from the service range of the business entity as long as the user accepts the acquisition. Similarly, the business service side administration system may acquire a certain part of analyzed user information which is analyzed by the administration server system 30 as long as the user accepts the acquisition. It is noted that the business service side administration system may not include the business service side I/O device 43, or may be connected to other systems in when used.

(Administration Terminal 50)

The administration terminal 50 includes an administration terminal side usage information database, an administration terminal side clock 54, an administration terminal side ID and encryption key database, an administration terminal side communicator 51, an administration terminal side calculator 52, an administration terminal side I/O device 53, and an administration terminal side storage device 55. The administration terminal 50 mainly serves to administer the position determination apparatus 20, and to intermediate between the administration server system 30 and the position determination apparatus 20. The administration terminal 50 temporarily holds a time from the administration terminal side clock 54, and an ID and an encryption key from the administration terminal side ID and encryption key database which are required by the position determination apparatus 20, and distributes them to the position determination apparatus 20. In addition, the administration terminal records usage information which is provided by the position determination apparatus 20 in the administration terminal side usage information database, and can transmit it to the administration server system 30. Also, in the case in which payment information is included in the database of personal information, the administration terminal receives the results of credit examination and authentication, and can record them in the administration terminal side ID and the encryption key database or notify them to the positional information authentication apparatus, or the like. Accordingly, even if the administration server system 30 is down, the administration terminal 50 and other systems can independently operate. The administration terminal 50 mainly serves to administer a plurality of position determination apparatuses 20. The functions of the administration terminal 50 may be assigned to one, or two or more position determination apparatuses 20.

The administration terminal 50 has another two roles. One role is to summarize passage data in the position determination apparatus 20. For example, the number of passengers from each station is analyzed so that a train timetable in future will be drawn up based on the analysis. The passage data can be accumulated in the usage information database and summarized every five minutes, etc. so that summarized passage data is transmitted to the administration server system 30. The administration server system 30 and the administration terminal 50 can calculate station congestion information and concentration ratio by using the data to investigate passenger flows.

Another role is to provide passenger services to users. Specifically, the passenger services include confirmation of a record of comings and goings of users, correction of its consistency, and the like. In this case, a service center staff can communicate with a passenger through I/O devices (e.g., camera and microphone) to provide passenger services, and additionally to serve a passenger when trouble occurs or to introduce and sell a new campaign, or the like.

Also, the administration terminal side clock 54 is only required to count time with high accuracy in the order of microseconds or less, for example. A time of day in the administration terminal side clock is not necessarily accurate but its error necessarily falls within approximately one minute, for example. For this reason, a time of day in the administration terminal side clock is preferably corrected by accessing a general time distribution server 70 as often as possible. If its time error is large, the terminal or its administrator can be informed to correct the error.

Also, a communication device can confirm the status of the personal portable terminal 10 or inform the personal portable terminal 10 that its user approaches the station by using Bluetooth communication function.

In addition, for the measures against the cheating on the fare, etc., to prevent cheat on the ticket fare, or the like, a record of comings and goings which is transmitted from the position determination apparatus 20 can be held in the administration terminal side storage device 55 or administration terminal side ID and encryption key database or can be transmitted to the administration server system 30. Alternatively, when the position determination apparatus 20 makes an inquiry, the administration server system 30 can send a response.

In addition, the administration terminal side I/O device 53 can include an imaging device. When identifying a user and determines his or her position by using a BLE beacon, the position determination apparatus 20 then determines the position of the user based on an image captured by the imaging device instead of the BLE beacon, for example. The positional information can be transmitted from the imaging device to the position determination apparatus 20. At this time, the BLE beacon in the personal portable terminal 10 may stop transmitting signals, for example.

(Position Determination Apparatus 20)

The position determination apparatus 20 includes a position determination side communicator 21A, a position determination side controller 28, a position determination side calculator 25, a position determination side ID and encryption key database, and a position determination side clock 27. The position determination apparatus 20 determines the position of the personal portable terminal 10 within a short time with high accuracy and authenticates the personal portable terminal 10 so that its user can pass through a ticket gate without the trouble to pick up the personal portable terminal 10. In addition, when a payment is required for services, the payment will be automatically made later through communication with the financial institution 60. Also, the position determination apparatus can receive results of credit examination or authentication, and record them in the position determination side ID and encryption key database.

The position determination side communicator 21A serves as the position determination side receiver 21. The position determination side controller 28 controls operations for restricting movement of a person who carries the personal portable terminal 10 in accordance with the position of the personal portable terminal 10 that is measured by the position determination side calculator 25. Accordingly, a person who carries the personal portable terminal 10 can be recognized while movement of the person can be restricted in accordance with the position of the person. For example, the position determination apparatus 20 according to this example can be a gate type automatic barrier including a door 29 which opens/closes to control access of the person who carries the personal portable terminal 10. In this case, the position determination side controller 28 controls opening and closing of the door 29. As a result, it can be determined based on the recognition of the person who carries the personal portable terminal 10 and the detected position whether the door 29 of the automatic ticket gate which can restrict passage of the person is opened or closed.

The position determination side storage device 26 stores software for operating the position determination apparatus, identification information of the station in which the position determination apparatus is installed, identification information of the position determination apparatus, and display information to be displayed on a display of the position determination apparatus. In addition, the position determination side storage device can store a table of fare between stations (or fares for distances), distances between stations, and the like.

Figure 35A:
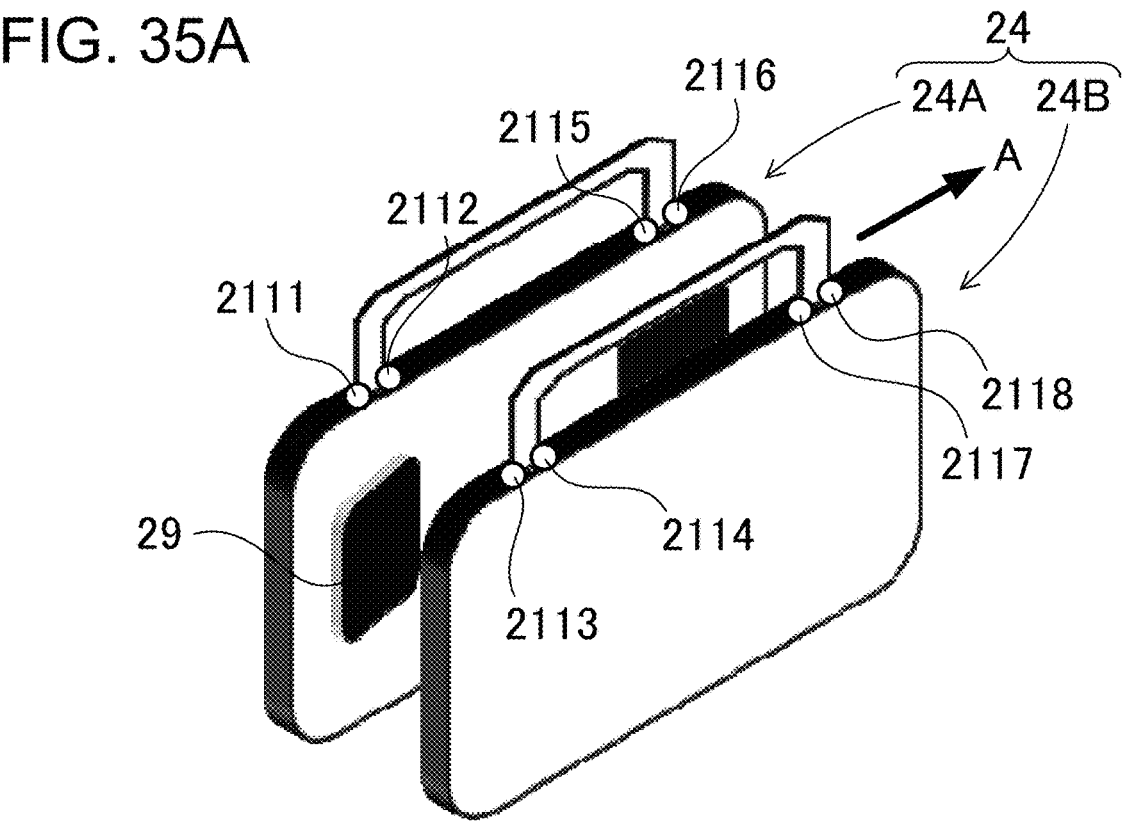
FIG. 35A is a perspective view showing an exemplary external appearance of a position determination apparatus.
Figure 36A:
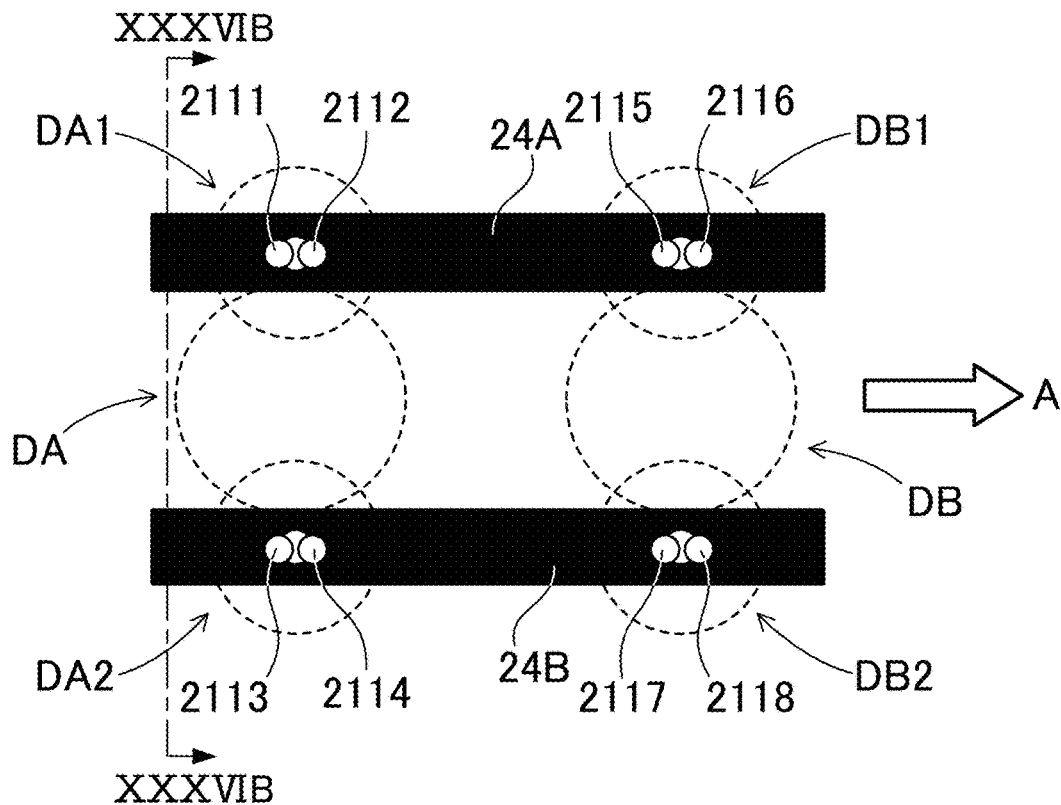
FIG. 36A is a plan view of the position determination apparatus.
Figure 36B:
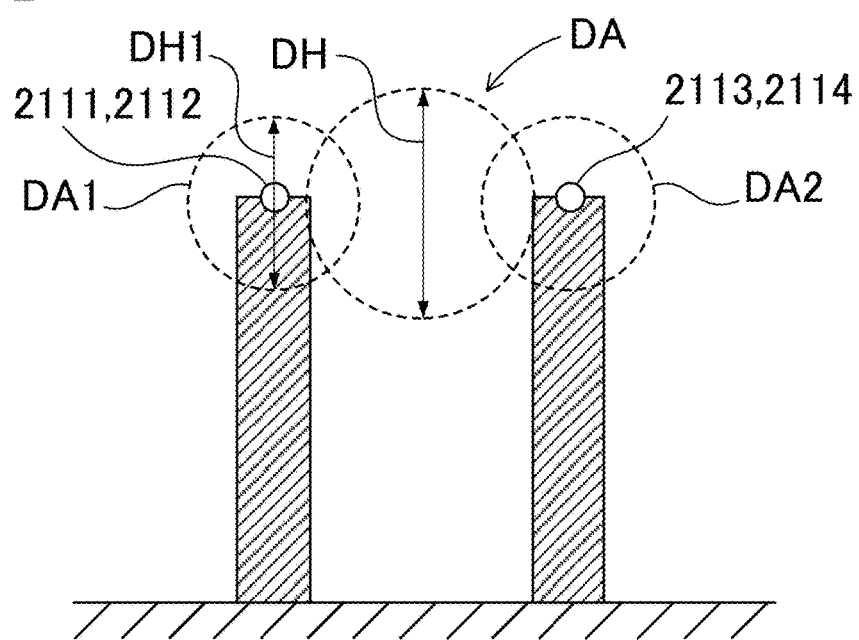
FIG. 36B is a cross-sectional view showing the position determination apparatus taken along the line XXXVIB-XXXVIB shown in FIG. 36A.

FIG. 35A shows an exemplary external appearance of the position determination apparatus 20. FIG. 36A is a plan view of the position determination apparatus 20. FIG. 36B is a cross-sectional view showing the position determination apparatus 20 taken along the line XXXVIB-XXXVIB shown in FIG. 36A. The illustrated position determination apparatus 20 is an automatic ticket gate. The automatic ticket gate includes a pair of partitioning plates 24 which are arranged substantially parallel to and spaced away from each other. The partitioning plates 24A and 24B in the pair of partitioning plates 24 are formed of a rigid material which is transparent to radio waves (e.g., resin). They may be partially formed of metal which is not transparent to radio waves if necessary. The position determination apparatus 20 which has been produced as a trial model has a height of 90 cm, a width of 75 cm, and a depth of 180 cm.

As shown in FIG. 36A, the position determination apparatus 20 defines passage detection areas DA and DB along passage line of users between the pair of partitioning plates 24A and 24B. In this example, the entrance of the automatic ticket gate is positioned on the left side in FIG. 36A so that the passage detection areas DA and DB are arranged on the entrance and exit sides of the automatic ticket gate, respectively. It is noted that the passage detection areas DA and DB may be arranged on the exit and entrance sides of the automatic ticket gate, respectively. Also, the automatic ticket gate may allow users to move in both the directions.

The position determination side receivers 21 are arranged in proximity to the passage detection area DA so that position determination side receivers 21 determine whether a user is in the passage detection area DA or not. Specifically, BLE beacon receivers 2111, 2112, 2113 and 2114 are arranged in proximity to the passage detection area DA as first and second position determination side receivers 22 and 23 corresponding to the position determination side receivers 21. In this example, the BLE beacon receivers 2111 and 2112 are arranged as the first position determination side receivers 22A and 22B on the partitioning plate 24A. Also, the BLE beacon receivers 2113 and 2114 are arranged as the second position determination side receivers 23A and 23B on the partitioning plate 24B.

Similarly, BLE beacon receivers 2115, 2116, 2117 and 2118 are arranged as the position determination side receivers 21 in proximity to the passage detection area DB. In this example, the BLE beacon receivers 2115 and 2116 are arranged as the first position determination side receivers 22A and 22B on the partitioning plate 24A. Also, the BLE beacon receivers 2117 and 2118 are arranged as the second position determination side receivers 23A and 23B on the partitioning plate 24B.

As shown in the plan view of FIG. 36A, a passage detection area DA1 is defined as a passage detection area having a circular shape centering the midpoint between the pair of BLE beacon receivers 2111 and 2112. Also, a passage detection area DA2 is defined as a passage detection area having a circular shape centering the midpoint between the pair of BLE beacon receivers 2113 and 2114. In addition, the passage detection area DA is defined as a passage detection area having a circular shape centering the midpoint of a line segment which is obtained by connecting the midpoint between the pair of BLE beacon receivers 2111 and 2112 to the midpoint between the pair of BLE beacon receivers 2113 and 2114. Similarly, a passage detection area DB1 is defined as a passage detection area having a circular shape centering the midpoint between the pair of BLE beacon receivers 2115 and 2116. Also, a passage detection area DB2 is defined as a passage detection area having a circular shape centering the midpoint between the pair of BLE beacon receivers 2117 and 2118. In addition, the passage detection area DB is defined as a passage detection area having a circular shape centering the midpoint of a line segment which is obtained by connecting the midpoint between the pair of BLE beacon receivers 2115 and 2116 to the midpoint between the pair of BLE beacon receivers 2117 and 2118. As a result, the passage detection area DA has a larger area which includes a part of the passage detection areas DA1 and DA2, and the passage detection area DB has a larger area which includes a part of the passage detection areas DB1 and DB2.

As discussed above, a plurality of BLE beacon receivers define the passage detection areas, and receive BLE signals from the personal portable terminal 10 to determine the position of the personal portable terminal 10. The position of the personal portable terminal 10 which enters the automatic ticket gate can be determined by using the passage detection areas DA, DA1 and DA2. In addition, after the personal portable terminal 10 leaves the passage detection areas DA, DA1 and DA2, the position determination of the personal portable terminal 10 is determined by using the passage detection areas DB, DB1 and DB2.

(Passage Detection Areas DA, DB)

The position of the personal portable terminal 10 in the passage detection areas DA and DB is determined by evaluating a conditional expression in which whether a difference between an averaged received signal intensity of the BLE beacon receivers 2111 to 2114 and an averaged received signal intensity of the BLE beacon receivers 2115 to 2118 is greater than a predetermined threshold. For example, in the case in which the distance between the midpoint between the pair of the BLE beacon receivers 2111 and 2112 and the midpoint between the pair of the BLE beacon receivers 2115 and 2116 is 2000 mm, and the distance the midpoint between the pair of the BLE beacon receivers 2111 and 2112 and the midpoint between the pair of the BLE beacon receivers 2113 and 2114 is 600 mm, when the personal portable terminal 10 is in the passage detection area DA, the averaged received signal intensity of the BLE beacon receivers 2111 to 2114 is 10 dB greater than the averaged received signal intensity of the BLE beacon receivers 2115 to 2118. Contrary to this, when the personal portable terminal 10 is in the passage detection area DB, the averaged received signal intensity of the BLE beacon receivers 2111 to 2114 is 10 dB smaller than the averaged received signal intensity of the BLE beacon receivers 2115 to 2118.

(Passage Detection Areas DA1, DA2, DB1, DB2)

Also, the position of the personal portable terminal 10 in the passage detection area DA1 is determined by evaluating a conditional expression in which whether a difference between an averaged received signal intensity of the pair of the BLE beacon receivers 2111 and 2112 and an averaged received signal intensity of the BLE beacon receivers 2115 to 2118 is greater than a predetermined threshold. For example, when the personal portable terminal 10 is in the passage detection area DA1, the averaged received signal intensity of the BLE beacon receivers 2111 and 2112 is 10 dB greater than the averaged received signal intensity of the BLE beacon receivers 2115 to 2118. Also, when the personal portable terminal 10 is in the passage detection area DA2, the averaged received signal intensity of the BLE beacon receivers 2113 and 2114 is 10 dB greater than the averaged received signal intensity of the BLE beacon receivers 2115 to 2118. Similarly, the position of the personal portable terminal 10 in the passage detection area DB1 is determined by evaluating a conditional expression in which whether a difference between an averaged received signal intensity of the pair of the BLE beacon receivers 2115 and 2116 and an averaged received signal intensity of the BLE beacon receivers 2111 to 2114 is greater than a predetermined threshold. For example, when the personal portable terminal 10 is in the passage detection area DB1, the averaged received signal intensity of the BLE beacon receivers 2115 and 2116 is 10 dB greater than the averaged received signal intensity of the BLE beacon receivers 2111 to 2114. Also, when the personal portable terminal 10 is in the passage detection area DB2, the averaged received signal intensity of the BLE beacon receivers 2117 and 2118 is 10 dB greater than the averaged received signal intensity of the BLE beacon receivers 2111 to 2114.

As discussed above, in addition to the passage detection area DA, the passage detection areas DA1 and DA2 are defined as shown in the plan view of FIG. 36A and the vertical cross-sectional view of FIG. 36B to determine the position of the personal portable terminal 10. Similarly, in addition to the passage detection area DB, the passage detection areas DB1 and DB2 are defined. The sizes and positions of the passage detection areas can be adjusted by adjusting the positions of the BLE beacon receivers and differences between averaged radio wave intensities which are detected by the BLE beacon receivers. It is determined whether the personal portable terminal 10 is in a target passage detection area based on whether a difference between averaged radio wave intensities which are obtained by averaging corresponding radio wave intensities is large or not as discussed above.

In addition, for example, in the case of the position determination in the passage detection area DA, if variation in intensity of the BLE beacon receivers 2111 to 2114 is large, when a difference between an averaged radio wave intensity of the BLE beacon receivers 2111 and 2112 and an averaged radio wave intensity of the BLE beacon receivers 2113 and 2114 is greater than a predetermined value, it is determined that the intensities have a bias so that a higher pair of intensities which are expected to represent BLE transmitter presence are used. For example, it is determined whether the personal portable terminal 10 is in the passage detection area DA1 or not based on whether a difference between an averaged radio wave intensity of the BLE beacon receivers 2111 and 2112 and an averaged radio wave intensity of the BLE beacon receivers 2115 to 2118 is greater than a predetermined value or not.

In the case of the position determination in the passage detection area DA, as shown in the vertical cross-sectional view of FIG. 36B, the passage detection area DA is defined by a spherical shape. Accordingly, the passage detection area DA has the maximum height DH at the center of the gate so that passage detection area DA can be large in a part close to the center. On the other hand, the smaller the height of the passage detection area DA, the smaller the distance to the partitioning plates 24A and 24B, and the outside edge of the passage detection area DA will contact the partitioning plate 24A or 24B almost at one point, that is, the passage detection area DA has a very small height in the part close to the partitioning plates 24A and 24B. As a result, the accuracy of the detecting position will be low in this part. For this reason, when a position of a user who walk not along the centerline of the automatic ticket gate but close to the wall surface (i.e., partitioning plate 24A or 24B) or a user who holds the personal portable terminal 10 on the wall side with his or her hand is determined, not the passage detection area DA but the passage detection area DA1 or DA2 is preferably used. For example, contrary to the passage detection area DA, the smaller the distance to the partitioning plate 24A, the higher the height DH of the passage detection area DA1 so that the passage detection area DA1 has the maximum height at the partitioning plate 24A. For this reason, the passage detection area DA1 can be suitably used to detect the position close to the partitioning plate 24A. In this case, for example, in the case of the position determination in the passage detection area DA1, if the averaged intensity of the BLE beacon receivers 2111 and 2112 is 10 dB greater than the averages intensity of the BLE beacon receivers 2113 and 2114, the position is determined by using not the BLE beacon receivers 2111 to 2114 but the BLE beacon receivers 2111 and 2112. Also, if the distance between the BLE beacon receiver 2111 and the BLE beacon receiver 2115 is sufficiently large, because a difference between the distance between the BLE beacon receiver 2111 and the BLE beacon receiver 2115 and the distance of the BLE beacon receiver 2111 and the BLE beacon receiver 2117 is small, a difference between the intensities of the BLE beacon receivers 2115 to 2118 will be also small. For this reason, the position in the passage detection area DA1 can be determined based on a difference between an averaged radio wave intensity of the BLE beacon receivers 2111 and 2112 and an averaged radio wave intensity of the BLE beacon receivers 2115 to 2118. Although the position determination in the passage detection area DA1 has been illustratively described, the same goes for the passage detection areas DA2, DB1, DB2, etc.

In the case in which the exterior side of the ticket gate is covered by metal, generally, radio waves cannot propagate beyond the metal. For this reason, in this case, radio waves cannot be detected in areas outside the passage detection area DA1. Accordingly, the outside edge of the passage detection area can be limited by using metal. For example, in the case in which a plurality of ticket gates are installed side by side, radio waves into one gate from another can be cutout by using metal to prevent unintentional detection of a position of a personal portable terminal of a user who walks through the another gate (non-target gate).

The position of the personal portable terminal 10 can be detected by defining different detection areas as the passage detection areas DA and DB between the pair of (the two) partitioning plates 24A and 24B as discussed above. In particular, because the passage detection areas DA and DB are spaced away from each other on the entrance and exit sides the automatic ticket barrier (gate), respectively, it can be detected both that a user who carries the personal portable terminal 10 enters the gate and that the user leaves the gate so that it can be determined whether the user passes through the gate or not. The same goes for the case in which the automatic ticket gate allows users to move in both the directions. In addition, because the detecting position side receivers 21 are arranged on both the right and left partitioning plates 24 to define the detection areas between the partitioning plates 24. As a result, it can be reliably determined whether the user passes through the areas between the partitioning plates 24. In particular, in the case of automatic ticket gates, because a plurality of gates are generally arranged side by side, if the detection area is deviated in the top and bottom direction in FIG. 36A, misrecognition may occur so that it is determined that a user who passes through one gate passes through another gate. If such misrecognition occurs, administration cannot be properly conducted. To address this, the detection area is defined between the first and second position determination side receivers 22 and 23 to determine that a user passes through the defined area between the partitioning plates 24 whereby reducing such misrecognition that a user who passes through one gate is determined passes through another gate.

Because a number of users pass through the automatic ticket gate one after another, it is necessary to accurately identify the personal portable terminals 10 that are aligned on the passage line. To address this, not only one detection area is defined in one area in the automatic ticket gate but separated detection areas are defined on the entrance and exit sides to trace the movement of a particular user who moves in the automatic ticket gate. Therefore, the misrecognition can be reduced. Also, misrecognition that one user who moves in one gate is identified as another user who moves in the one gate can be reduced by sequentially detecting the positions of the users in a short cycle. Although it has been illustratively described that the passage detection areas DA and DB are arranged on the entrance and exit sides, respectively, in the example of FIG. 36A, the number of passage detection areas which are defined in one automatic ticket gate is not limited to two but can be three or more. For example, an intermediate passage detection area can be defined between the passage detection areas DA and DB. According to this arrangement, the accuracy of user detection can be further improved.

Also, misrecognition that one user who moves in one gate is identified as another user who moves in the one gate can be reduced by sequentially detecting the positions of the users in a short cycle. In other words, in the case in which users who carry their personal portable terminals 10 enter the automatic ticket gate one immediately after another, if authentication is executed in a long cycle, misrecognition that one user who moves in one gate is identified as another user who moves in the one gate may occur. To address this, the cycle of the authentication is defined in consideration of users' walking speed.

A sensor which detects movement of users may be installed separately from the detector for the authentication of the personal portable terminals 10. For example, an optoelectronic detector or infrared sensor may be arranged on the partitioning plate 24 to monitor users' movement on the passage line of users who passes through an area between the partitioning plates 24. Because, generally, position determination apparatuses such as automatic ticket gates include a sensor which monitors users' passage, such a sensor can be used. For example, when a person without his or her personal portable terminal (e.g., smartphone terminal) enters the automatic ticket gate, the sensor can physically detect the entering so that the door 29 is closed.

It is noted that the distance between the first position determination side receiver 22A and the first position determination side receiver 22B is shorter than the distance of between each first position determination side receiver 22 and each second position determination side receiver 23. It is preferable that the first position determination side receivers 22A and 22B are arranged adjacent to each other. The distance between the BLE beacon receivers 2111 and 2112 adjacent to each other is dimensioned 5 to 50 mm, for example.

(Position Determination Side Controller 28)

Figure 37:
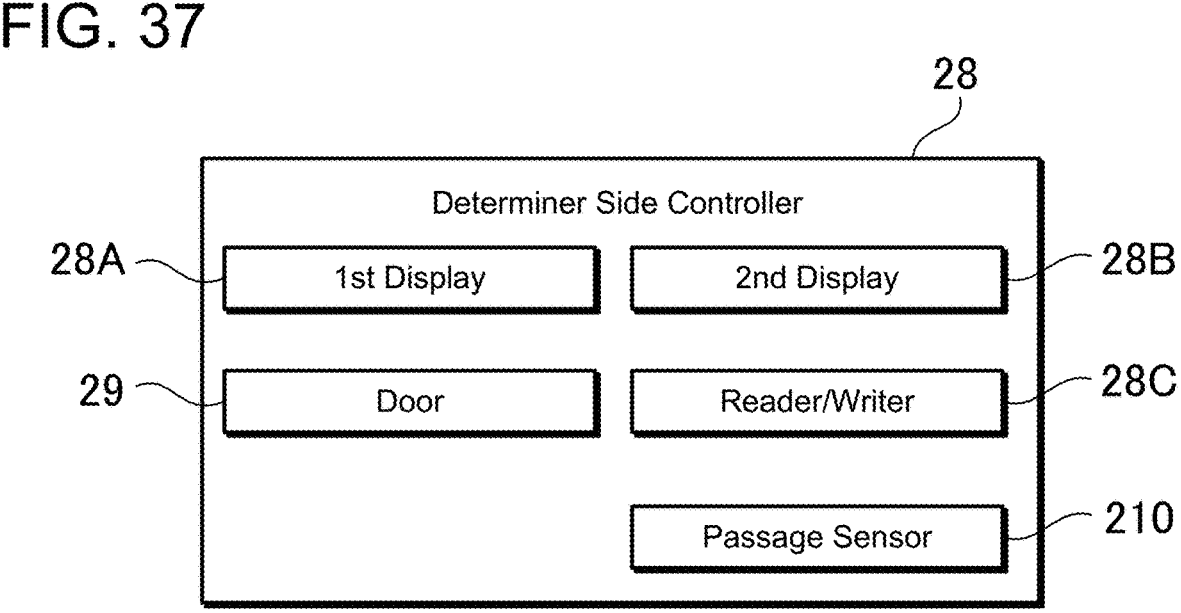
FIG. 37 is a block diagram showing a position determination side controller of a position determination apparatus.

FIG. 37 is a block diagram showing functions of the position determination side controller 28 of the position determination apparatus 20. The illustrated position determination side controller 28 includes first and second displays 28A and 28B, the door 29, and a passage sensor 210. In addition, the position determination side controller 28 may include a reader/writer 28C which reads conventional tickets and IC cards and writes data in them. The position determination apparatus 20 controls passage of users moving in a direction of A in FIG. 35A, for example. The first display 28A corresponds to indicators which are arranged on a conspicuous part or the like of existing automatic ticket gates, and indicate passage success or error of a user, child-fare ticket and the like. The second display 28B is a liquid crystal display, an organic electroluminescence display, or the like which is arranged on a part which the tickets are inserted into or the IC cards are held over and show a payment, the balance and the like of the IC card. Opening/closing of the door 29 is controlled based on the processed results of the personal portable terminal 10 of the user.

In addition, a plurality of passing sensors 210 are arranged on the interior side surfaces of the position determination apparatus 20, for example. In an automatic ticket gate 20B according to a modified embodiment shown in FIG. 35B, five pairs of passing sensors 2101 to 2105 are installed as the passing sensors 210 on the partitioning plates 24A and 24B, for example. The passage sensors 2101 to 2105 detect users in the path which is defined by the automatic ticket gate 20B. The passage sensors 2101 to 2105 are realized by infrared sensors, optical sensors, ultrasonic sensor, or the like, for example. The passage sensors 2101 to 2105 can be a transmission type sensor which cooperates with a passage sensor arranged on its auxiliary part opposed to the sensors to detect users in the path. Alternatively, the passage sensors 2101 to 2105 can be a reflection type sensor which cooperates with passage sensor arranged on the sensor itself to detect users in the path. The sensor can detect change in intensity of phase of waves emitted by the sensor. In this case, the sensor can measure users' height to allow a user who has a height smaller than a certain height or user's bag to pass through the gate. When a person is detected if the personal portable terminal 10 is authenticated, it may be determined that the person is a malicious passenger based on his or her height and the like.

Figure 35B:
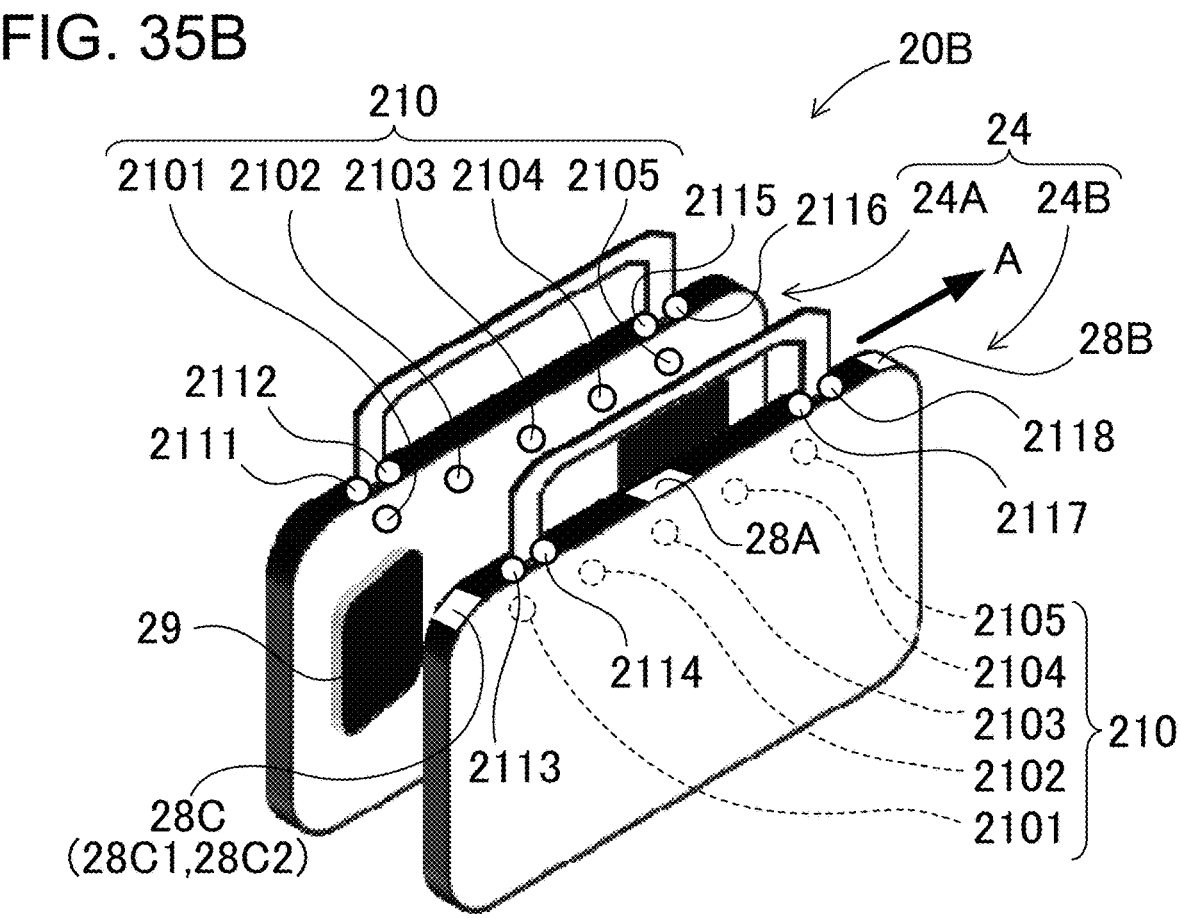
FIG. 35B is a perspective view showing an exemplary external appearance of a position determination apparatus according to a modified embodiment.

The automatic ticket gate 20B shown in FIG. 35B includes the first and second displays 28A and 28B, the door 29, the reader/writer 28C, the passage sensors 2101 to 2105, for example. The automatic ticket gate 20B controls passage of user moving the direction of A in FIG. 35B. The first and second display 28A and 28B show various kinds of information. Opening/closing of the door 29 is controlled based on the processed authentication results of the personal portable terminal 10.

The reader/writer 28C reads existing tickets or IC cards, and includes an antenna 28C1 and a communicator 28C2, for example. The communicator 28C2 includes a controller, a modulator, a demodulator, and the like. The modulator and demodulator are controlled by a controller. The modulator superimposes commands on radio waves having a predetermined frequency band so that the radio waves are transmitted through the antenna 28C1. The demodulator demodulates information included in the radio waves received through the antenna 28C1, and provides the information (commands) to the controller device.

The position determination side calculator 25 determines the position of the personal portable terminal 10 by using the BLE beacon receivers, and executes user authentication and credit authentication based on the information from the position determination side clock 27 and the ID and encryption key database for position determination and authentication. Passage of a user is allowed or blocked based on the results provided by the position determination side calculator 25. When passage of a user is allowed, the position determination side controller 28 opens the door 29, or shows a message of passage allowance on the first display 28A. When passage of a user is blocked, the position determination side controller 28 closes the door 29, or shows a message of passage blockage on the first display 28A. Also, if the position determination side calculator 25 handles an error, the position determination side controller 28 closes the door 29 or shows a message of error handling on the first display 28A. The message of error handling relates to cases in which the position cannot be determined, user cannot be authenticated, and credit authentication cannot be obtained, for example. In addition, the message of error handling may relate to a case in which a record of comings and goings cannot be confirmed. In addition, the position determination apparatus 20 can additionally include an audio I/O device which produces predetermined sound or voice in accordance with the results provided by the position determination side calculator 25, or receives voice input and responds to the input to solve the error and the like. For the measures against the cheating on the fare, etc., the position determination apparatus 20 can transmit records of comings and goings to the administration terminal 50 or the administration server system 30.

If positional information of a user can be traced based on images by the administration terminal 50, his or her personal portable terminal 10 can be authenticated so that passage of the user is allowed based on the cooperation with the images, or the position determination apparatus 20 can stop detecting his or her positional information. Also, the first or second display 28A or 28B may be omitted.

(Personal Portable Terminal 10)

The personal portable terminal 10 is a communication terminal which is carried by a user whose position is to be determined and who is to be authenticated. The personal portable terminal 10 includes a personal terminal side communicator 11A, the personal terminal side controller 12, the personal terminal side clock 14, the personal terminal side storage device 13, a personal terminal side I/O device 15, a the personal terminal side calculator 16, as shown in FIG. 34.

The personal terminal side clock 14 issues information relating to a time of day. In this example, the personal terminal side clock is a clock in the personal portable terminal 10. The personal terminal side clock 14 may be integrally constructed with other device such as personal terminal side calculator 16, or be embedded in the personal terminal side calculator 16 or the like.

The personal terminal side storage device 13 stores various kinds of information. A nonvolatile semiconductor memory, hard disk drive, or the like can be used as the personal terminal side storage device 13. In this example, the personal terminal side storage device 13 stores unique identification information and a unique common key, a function to be used to issue a one-time password, and the like.

The personal terminal side I/O device 15 receives input into and provides output from the personal portable terminal 10. Examples of the personal terminal side I/O device 15 can be provided by input devices such as keyboard, mouse, console, and microphone, output devices such as display and speaker, and human machine interfaces such as touch panel which can be serve as both input device and output device.

The personal terminal side calculator 16 executes various kinds of calculation and processing. An SoC in a smartphone terminal, a CPU in a personal computer, an ASIC, and the like can be used as the personal terminal side calculator 16.

The personal terminal side controller 12 may be integrally constructed with the personal terminal side calculator 16.

The personal portable terminal 10 can be registered with the administration server system 30, and can apply provision of the business services which are used by the position determination apparatus 20 through the administration server system 30. For required payment, for example, information relating to credit card, debit card, prepaid card, ATM card, or the like is registered with the administration server system 30. The personal portable terminal 10 can generate or issue its unique ID and an encryption key which is paired with the ID. The ID and the encryption key are required when the personal portable terminal uses the position determination apparatus 20. In addition, the I/O device can show available places, available term, and the like of position determination apparatuses 20 which are specified by the business entity depending on the services which are provided by the business entity. It is noted that the personal portable terminal 10 is not limited to the smartphone terminal etc. After registration of personal information and the like, and setting of the administration server system 30, a small terminal which transmits BLE beacon signals may be used as the personal portable terminal 10. Such a terminal may transmit BLE beacon signals only when it is around the position determination apparatus 20.

The personal terminal side communicator 11A communicates with external devices. The personal portable terminal 10 can communicate with external devices by using the personal terminal side communicator 11A based on general communication standards (e.g., LTE, 3G/4G/5G, CDMA, WIMAX, WiFi (trade names)) or original communication standards. In addition, the personal terminal side communicator 11A serves as the personal terminal side transmitter 11. The personal terminal side communicator 11A includes a BLE beacon signal transmitter. In addition, the personal terminal side communicator may include a GPS device or a BLE beacon signal receiver. The position determination apparatus 20 allows passage of the personal portable terminal 10 based on the BLE beacon signals transmitted by the personal portable terminal 10. The personal portable terminal 10 can transmit BLE beacon signals when detecting that the personal portable terminal 10 is around the administration terminal 50 or the position determination apparatus 20 by using a GPS device or BLE beacon reception function, and can stop transmitting BLE beacon signals when leaving the administration terminal 50 or the position determination apparatus 20.

In addition, the personal terminal side communicator 11A has wireless communication functions such as wireless LAN and mobile communications. The personal portable terminal can be connected to networks such as Internet by using the wireless communication functions. The personal portable terminal can include a personal terminal side display and a personal terminal side input device. In addition, the personal portable terminal can include an acceleration sensor etc., a magnetic field sensor, and an image capture device. After passing through the position determination apparatus 20, the position of the personal portable terminal 10 can be determined by using PDR which predicts the movement directions and speeds of the personal portable terminal using sensors such as accelerometer, gyroscope and geomagnetic sensor, and so-called fingerprinting algorithm which previously creates a database of physical information uniquely identified by the environment and uses matching to measure the position, and the like together with each other. In this case, the accuracy can be further improved. The personal portable terminal may be provided with map application software or indoor map data to guide its user in buildings or to show the map on its personal terminal side I/O device. Also, in the case in which the personal portable terminal is used for passage through ticket gates an in this example, the personal portable terminal can inform boarding locations and time, to guide its user in the station, and to show fares and the like by cooperating with transit guidance application software. In addition, the personal portable terminal can transmit the moving route information to the administration server system 30 so that the administration server system holds the information.

(Financial Institution 60)

The financial institution 60 is a credit card company, bank, or the like which has credit examination, credit card number issue and payment functions, and the like. The financial institution 60 conducts credit examinations for payment registration of users registered with the administration server system 30. The financial institution shares these kinds of information with the administration server system 30 so that the administration server system 30 resisters users, updates the ID and encryption key database, and makes payments from users to the business entity.

(Registration for Deferred Payment System Using Business-Service Side Administration Terminal 50)

Figure 38:
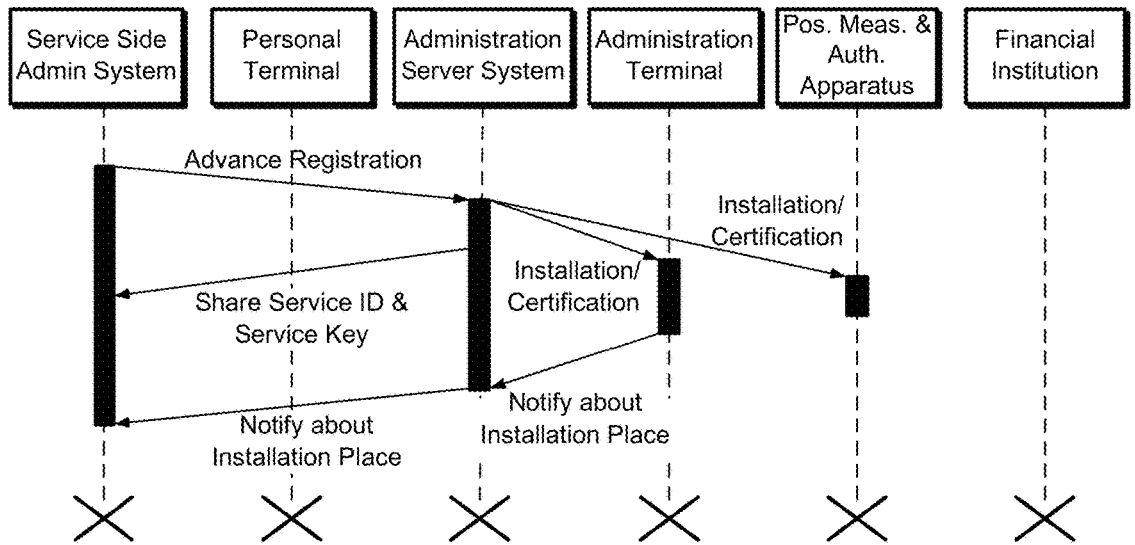
FIG. 38 is a flow diagram illustrating a flow of procedure of registration with a deferred payment system by using a business-service side administration terminal.

FIG. 38 is a flow diagram illustrating a flow of procedure of registration with a deferred payment system by using the business-service side administration terminal 50 according to this example. This flow charts shows procedure in the case in which the business-service side administration terminal 50 includes the administration terminal side I/O device 53 and the administration terminal side communicator 51 which can be connected to Internet, and they are required. If the administration terminal side I/O device and the administration terminal side communicator are not required or the administration terminal side communicator cannot be connected to Internet, another terminal which has a similar function of connection to the business-service side administration terminal 50 is previously prepared so that this procedure is executed. A registration application software for registration with this system can be installed on the business service side administration terminal 50 through Internet. Alternatively, registration may be executed through Internet. Alternatively, a dedicated terminal on which the registration application software is installed may be used. It is preferable that the business service side administration terminal 50 constantly checks digital certificates of a certification authority of the administration server system 30 to confirm safety in connection. Payment information such as bank account is registered with the administration server system 30 from the business service side administration terminal 50 for example. Also, the business service side administration terminal 50 sends a charge table of services to the administration server system 30 to receive fees from users in accordance with services which are provided by the business entity. Also, such a charge table of services in which users and their fees are shown may be sent after the services are provided. The administration server system 30 issues a unique ID to the business service side administration system 40 so that the unique ID is assigned to the business service side administration system 40. The business service side administration system 40 issues an encryption key which is paired with the ID, and transmits the encryption key to the administration server system 30 in a safe form. The administration server system 30 and the business service side administration system 40 save the ID and the encryption key in their storage device. The administration terminal 50 can be first installed and the position determination apparatus 20 then can be installed, and vice versa. Alternatively, they can be installed at the same time. After connected to the administration terminal 50 and the position determination apparatus 20, the administration server system 30 resisters their installation places. Also, the business service side administration system 40 is notified about the information relating to the installation places. The administration server system 30 saves the information in its storage device. In addition, after authenticated by the administration server system 30, accounts may be moved to another business service side administration system 40.

Figure 39:
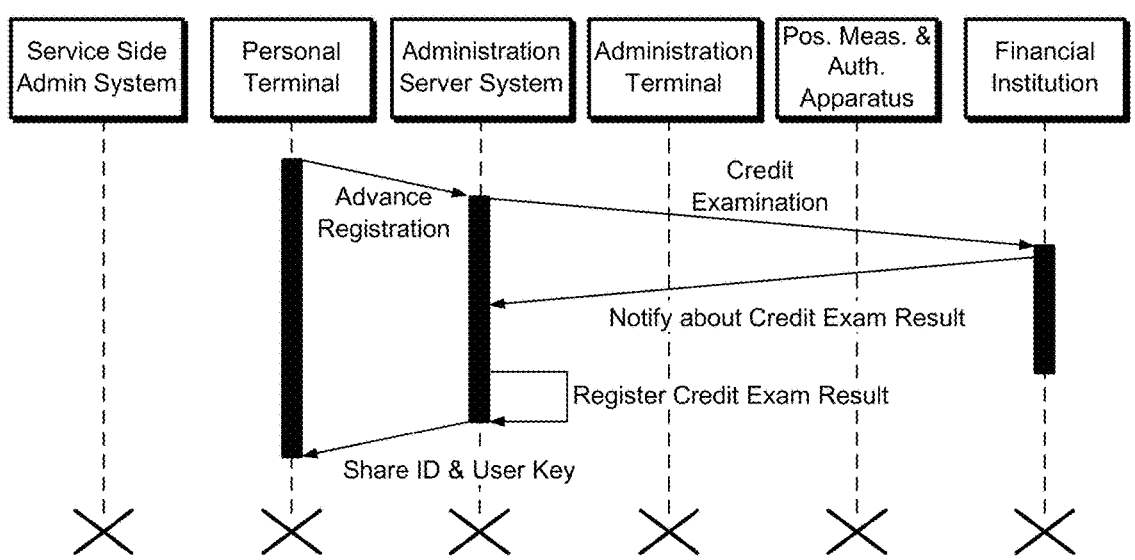
FIG. 39 is a flow diagram illustrating a flow of procedure in the deferred payment system of registration with the deferred payment system by using a personal portable terminal.

FIG. 39 is a flow diagram illustrating a flow of procedure in the deferred payment system according to this example of registration with the deferred payment system by using the personal portable terminal 10. This flow charts shows procedure in the case in which the personal portable terminal 10 is a smartphone terminal, etc. including the I/O devices and a communication device capable of being connected to Internet, and the I/O devices and the communication device are required. If the I/O devices and the communication device are not required or the communication device cannot be connected to Internet, another terminal which has a similar function of connection to the personal portable terminal 10 is previously prepared so that this procedure is executed. A registration application software for registration with this system can be installed on the personal portable terminal 10 through Internet. Alternatively, registration may be executed through Internet. Alternatively, a dedicated terminal on which the registration application software is installed may be used. It is preferable that the personal portable terminal 10 constantly checks digital certificates of a certification authority of the administration server system 30 to confirm safety in connection. Payment information such as credit card information is registered with the administration server system 30 from the personal portable terminal 10 for example. At this time, information such as user's name and address required for credit examination of credit card is also registered. The registered information is saved in a safe form in the personal information database of the administration server system 30. A credit examination is conducted based on the information. When the results of the credit examination are notified, the results of the credit examination are saved in the personal information database. When a user passes the credit examination, the administration server system 30 issues a unique ID to the personal portable terminal 10 so that the unique ID is assigned to the personal portable terminal 10. The personal portable terminal 10 issues an encryption key which is paired with the ID, and transmits the encryption key to the administration server system 30 in a safe form. The personal portable terminal 10 saves the ID and the encryption key in its storage device. The administration server system 30 saves the information in the personal information database and the ID and encryption key database. In a case in which a user loses his or her credit card or the like, for example, the user's information can be temporarily invalid.

If the user fails the credit examination, registration cannot be conducted. Such a user may have another credit examination by using another credit card or the like. In addition, after authenticated by the administration server system 30, accounts may be moved to another personal portable terminal 10.

Figure 40:
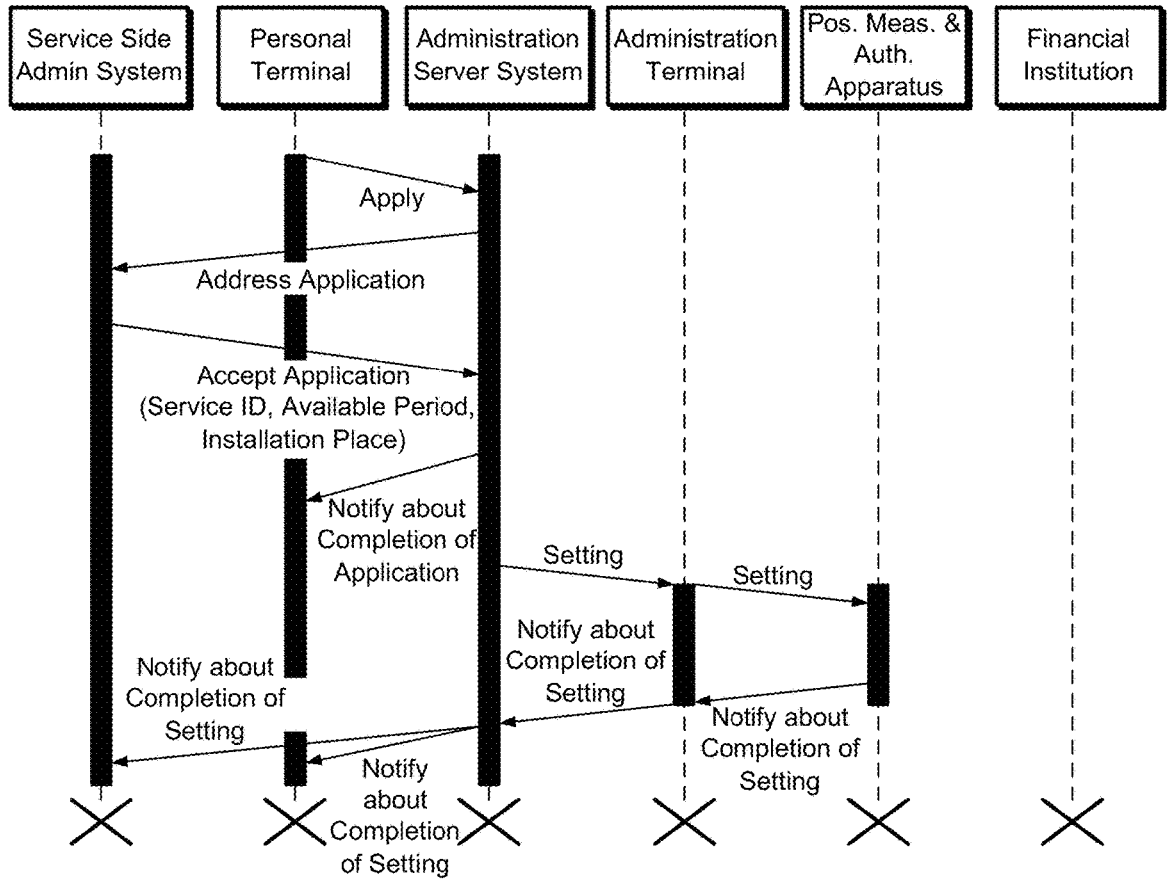
FIG. 40 is a flow diagram illustrating a flow of application procedure for the business services from a personal portable terminal in the deferred payment system.

FIG. 40 is a flow diagram illustrating a flow of application procedure for the business service from the personal portable terminal 10 in the deferred payment system according to this example. The personal portable terminal 10 can be registered with business services which its user wants to use. For example, users can sign a contract with some business entities. Also, users can sign a contract with some business entities in advance to automatically or arbitrarily use their services. Alternatively, application for some services may be omitted. When a user requires a business service, the user applies for the service to the administration server system 30 by using the personal portable terminal 10. The administration server system 30 notifies the business service side administration system 40 about the information and applies for the service to inquire whether the user can use the service or not. If the business entity rejects the application, the administration server system 30 is notified about the rejection. The administration server system 30 informs the personal portable terminal 10 that the application is rejected so that the personal portable terminal 10 cannot go to the subsequent steps. The business service side administration system 40 may automatically determine whether the user can use the service or not.

If the business entity accepts the application, the business service side administration, system 40 notifies the administration server system 30 about the business entity ID, available period during which the position determination apparatus 20 allows passage of the user, installation places through which the user can pass, and the like. The business service side administration system 40 can basically select some of the installation places which are administrated by the business service side administration system 40 and can specify the available period. The administration server system 30 may notify the personal portable terminal 10 about the acceptance of the application. The administration server system 30 directs the position determination apparatuses 20 installed in the places about which the business service side administration system 40 notifies to hold the ID and the encryption key of the user who applies for the service and the available period (settings). The settings can be made through the administration terminal 50. After the settings are completed, the position determination apparatus 20 and/or the administration terminal 50 send notification of the setting completion to the administration server system 30. When receiving the notification of the setting completion, the administration server system 30 may notifies the personal portable terminal 10 and the business service side administration system 40 about the completion of setting.

Figure 41:
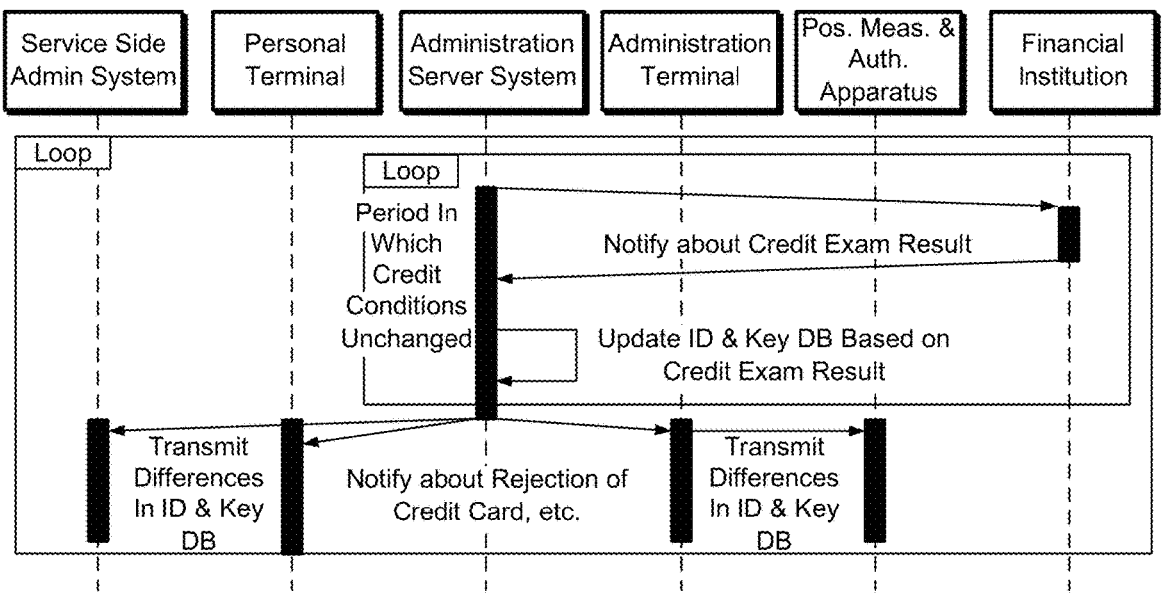
FIG. 41 is a flow diagram illustrating a flow of processing for updating credit conditions and maintaining them by using an administration server system in the deferred payment system.

FIG. 41 is a flow diagram illustrating a flow of procedure for updating credit conditions and maintaining them by using the administration server system 30 in the deferred payment system according to this example. The administration server system 30 periodically requests the financial institution 60, to confirm credit conditions to monitor changes in credit condition as long as the credit information does not change. When receiving the results of credit examinations from the financial institution 60, the administration server system 30 updates the ID and encryption key database. if any change in credit condition is found, the administration server system notifies the business service side administration system 40, the administration terminal 50, and the position determination apparatus 20 about the change if necessary. In this case, a different part or the entire data in the ID and encryption key database can be transmitted. As a result, a user having ID whose credit card or the like is rejected cannot pass through the position determination and authentication apparatus which requires deferred payments. The administration server system 30 may notify the personal portable terminal 10 about the rejection of the credit card or the like. In addition, the administration server system 30 may urge the user to register a new credit card or the like.

Figure 42:
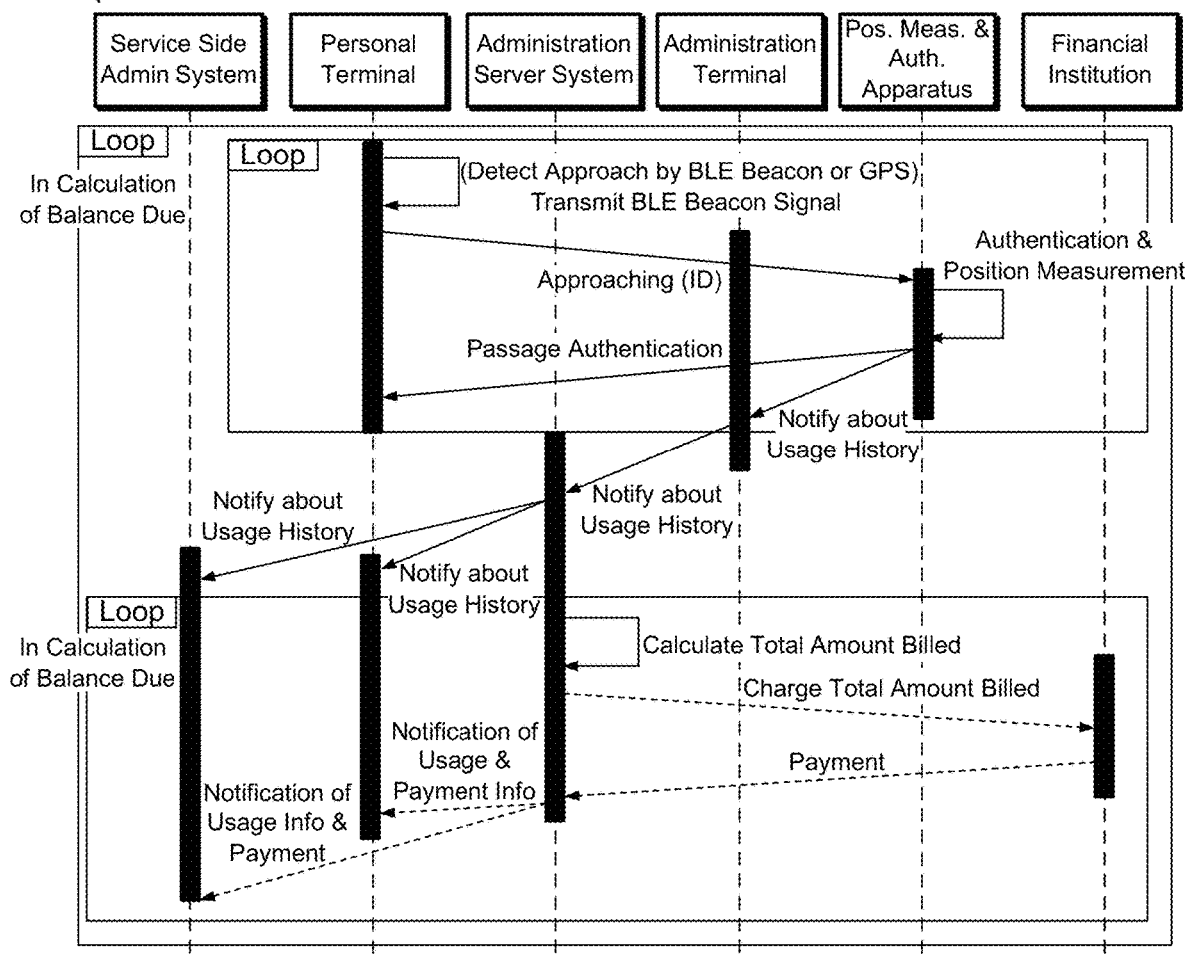
FIG. 42 is a flow diagram illustrating a flow of processing when a user uses a position determination apparatus in the deferred payment system.

FIG. 42 is a flow diagram illustrating a flow of processing when a user uses the position determination apparatus 20 in the deferred payment system. When the personal portable terminal 10 receives a signal of a BLE transmitter that is installed as the administration terminal 50 in proximity to the position determination apparatus 20 or a signal of a communication device of the position determination apparatus 20, or detects that the personal portable terminal 10 approaches an area in proximity to the installation place of the position determination apparatus 20 that is previously specified, the personal portable terminal 10 transmits BLE beacon signals. Alternatively, the personal portable terminal may frequently transmit BLE beacon signals so that the frequency is increases when the personal portable terminal approaches the position determination apparatus to keep its power consumption low. The BLE beacon signals which are transmitted by the personal portable terminal include at least its ID. The position determination apparatus 20 determines the position of the personal portable terminal as the transmission source of the BLE beacon signals, and authenticates personal portable terminal to which the ID is assigned. The BLE beacon signals can be encrypted, and the administration terminal 50 and the position determination apparatus 20 can decrypt the encrypted BLE beacon signals. When the personal portable terminal 10 passes through a gate after the position determination, the personal portable terminal 10 can be notified about the passage authentication. Also, the business service side administration system 40 can be notified about the passage authentication. In addition, the administration terminal 50 can receive its usage history. Flows of the position determination, and encryption and decryption will be described later.

The position determination apparatus 20 periodically transmits the usage history to the administration server system 30. The usage history can be transmitted through the administration terminal 50 or by the administration terminal 50 instead of the position determination apparatus 20. The usage history in a predetermined period is transmitted to the business service side administration system 40 and the personal portable terminal 10 before calculation of balance due. If deferred payments are included, the balance due is calculated. At the calculation of the balance due, the administration server system 30 calculates the total amount billed and charges the total amount billed to the financial institution 60. The financial institution 60 pays an amount for the total amount billed except its commission into the account of the business entity, for example. The usage history and payment result are transmitted through the business service side administration system 40. The transmission of the usage history and payment result through the business service side administration system 40 may be omitted. The user is notified about the usage and payment information through the personal portable terminal 10. Alternatively, the user is notified about the usage and payment information through website or SNS, other Internet media or paper media, or other company such as credit card company. The transmission of the usage history and payment result directly from the administration server system 30 can be omitted.

(Procedure of Position Determination)

Figure 43:
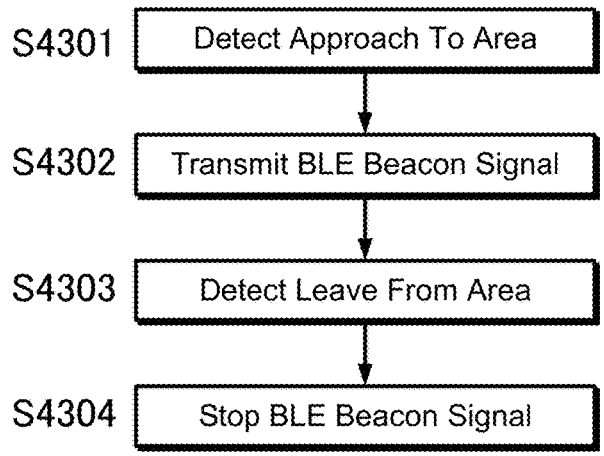
FIG. 43 is a flowchart showing the procedure of position determination.

The procedure of the position determination is now described with reference to a flow chart of FIG. 43. FIG. 43 shows a flow of processing of the personal portable terminal 10 in the position determination of the personal portable terminal 10 by the position determination apparatus 20. When the personal portable terminal 10 receives a signal of a BLE transmitter that is installed as the administration terminal 50 in proximity to the position determination apparatus 20 or a signal of a communication device of the position determination apparatus 20, or detects that the personal portable terminal 10 approaches an area in proximity to the installation area of the position determination apparatus 20 by receiving GPS radio waves to determine its position, the personal portable terminal 10 transmits BLE beacon signals. Alternatively, the personal portable terminal may frequently transmit BLE beacon signals so that the frequency is increased when the personal portable terminal approaches the position determination apparatus to keep its power consumption low. The area can be defined by a circle having a radius of 10 meters or 100 meters, for example. The personal portable terminal may stop transmitting BLE beacon signals when detecting that the personal portable terminal leaves the area.

Figure 44:
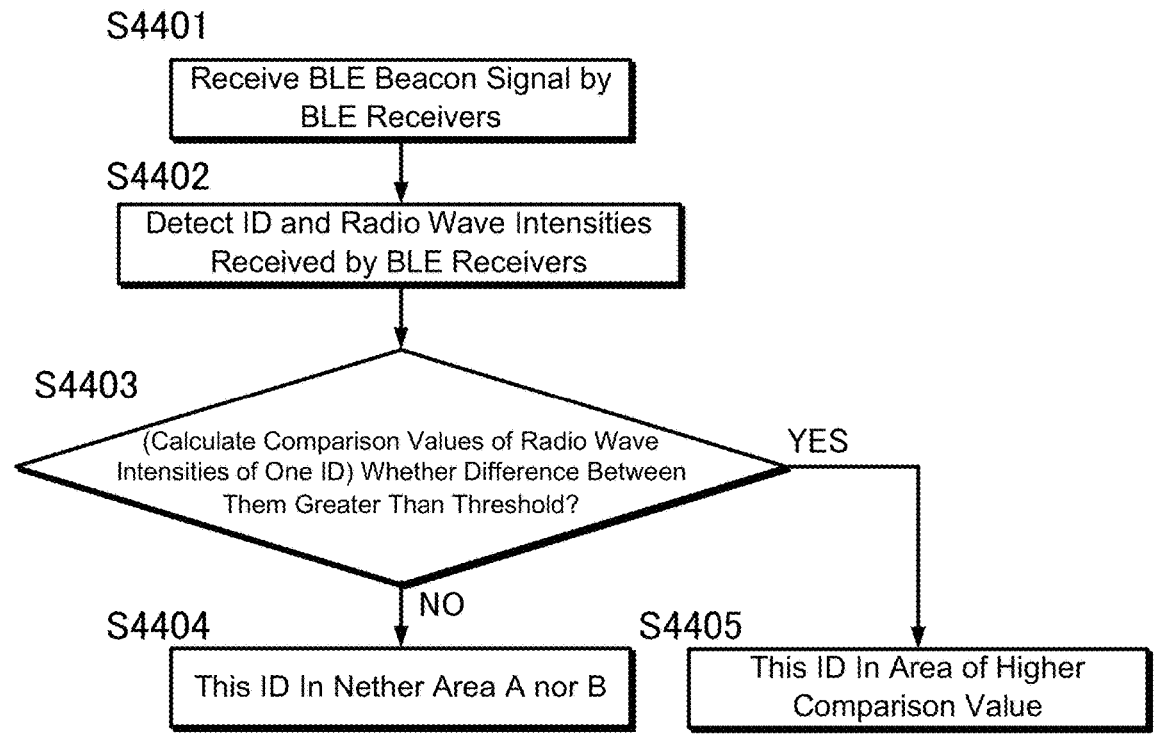
FIG. 44 is a flowchart showing a flow of processing of a position determination apparatus in position determination of a personal portable terminal by the position determination apparatus.

FIG. 44 is a flowchart showing a flow of processing of the position determination apparatus 20 in the position determination of the personal portable terminal 10 by the position determination apparatus 20. For example, the position determination apparatus 20 receives BLE beacon radio waves by using eight BLE beacon receivers which are included in the position determination side receiver 21 as shown in FIG. 35A. The BLE beacon receivers obtain an ID and the like included in the BLE beacon radio waves, and radio wave intensities. Later-discussed comparison values of the radio wave intensities of one ID are calculated so that it is determined whether a difference between them is greater than a threshold. If the difference is greater than the threshold, it is determined that the personal portable terminal 10 that has the ID is in an area corresponding to a higher comparison value. If the difference is not greater than the threshold, it is determined that the personal portable terminal 10 that has the ID is in neither areas. The calculation method of radio wave intensities will be discussed later.

Figure 45:
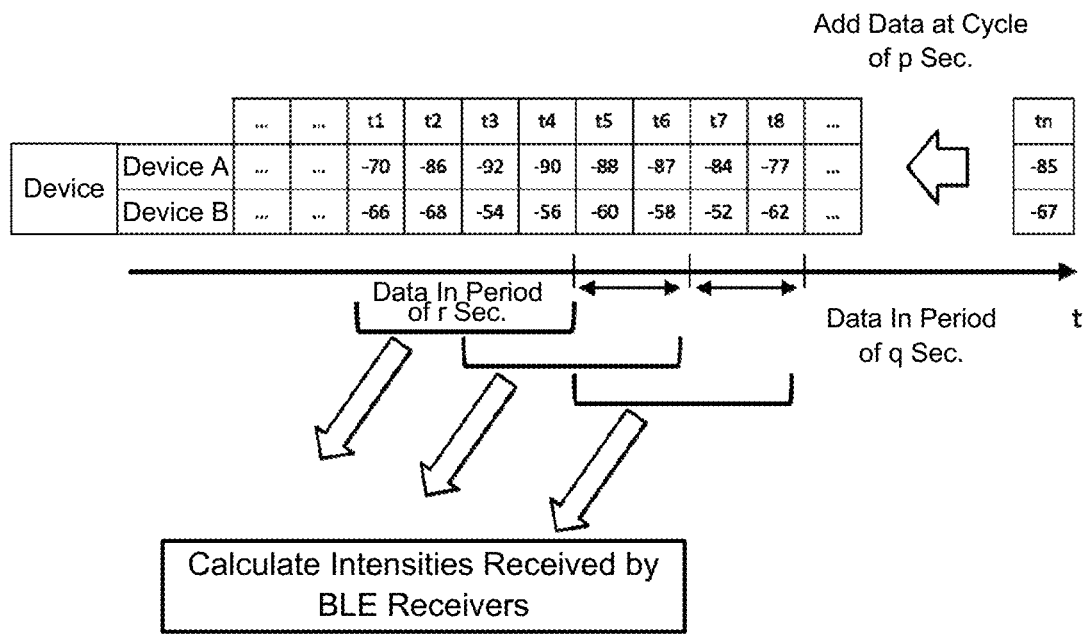
FIG. 45 is a flowchart showing a flow of processing of radio wave intensity calculation in position determination of a personal portable terminal by the position determination apparatus.

FIG. 45 is a flowchart showing a flow of processing of the radio field intensity calculation in the position determination of the personal portable terminal 10 by the position determination apparatus 20. The radio wave intensities of BLE beacon signals can be calculated based on the hysteresis information of radio wave intensities of intensities of received BLE beacon signals in this example. For example, the devices A and B of the BLE beacon receiver which are shown upper and lower rows in FIG. 45, in processing of radio wave intensities that are obtained at a cycle of p seconds, not only values at one reception are used but data that includes information on radio wave intensities within a predetermined time period (q seconds in the example of FIG. 45) or a predetermined period which includes one reception or a plurality of receptions (r seconds in the example of FIG. 45 where p<=(less than or equal to) q<=r) is used to calculate averaged values as the radio wave intensities of the BLE beacon receivers.

Figure 46:
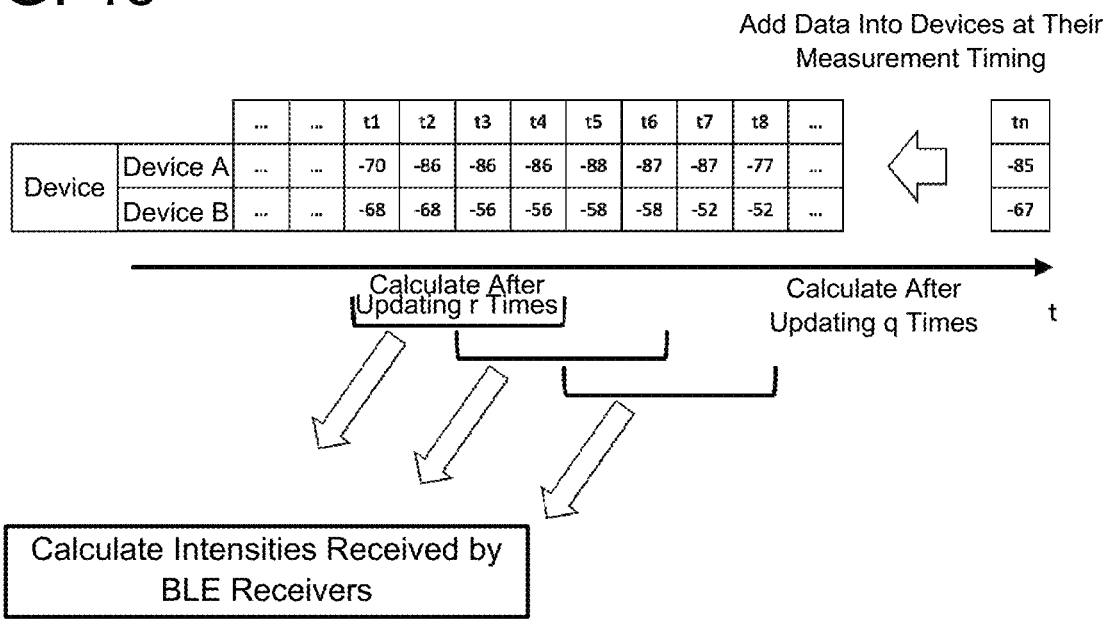
FIG. 46 is a flowchart showing a flow of processing of radio wave intensity calculation in position determination of a personal portable terminal by the position determination apparatus.

FIG. 46 is a flowchart showing a flow of processing of the radio field intensity calculation in the position determination of the personal portable terminal 10 by the position determination apparatus 20. The radio wave intensities of BLE beacon signals can be calculated based on the hysteresis information of radio wave intensities of intensities of received BLE beacon signals. For example, the devices A and B of the BLE beacon receiver which are shown upper and lower rows in FIG. 46, although radio wave intensities that are obtained at a cycle of p seconds are processed into averaged values, radio wave intensities of both the devices are not always simultaneously updated at data addition timing. For this reason, similar processing is applied to both the devices. That is, data that includes information on radio wave intensities within a predetermined time period (q times in the example of FIG. 45) or a predetermined period which includes one data update or a plurality of data updates (r times in the example of FIG. 45 where p<=q<=r) is used to calculate averaged values as the radio wave intensities of the BLE beacon receivers. If the personal portable terminal 10 that has an ID does not transmit any signal within a certain period, the held data corresponding to the ID can be deleted.
(Procedure of Calculating Comparison Value from Radio Wave Intensities of BLE Receiver)

Figure 47:
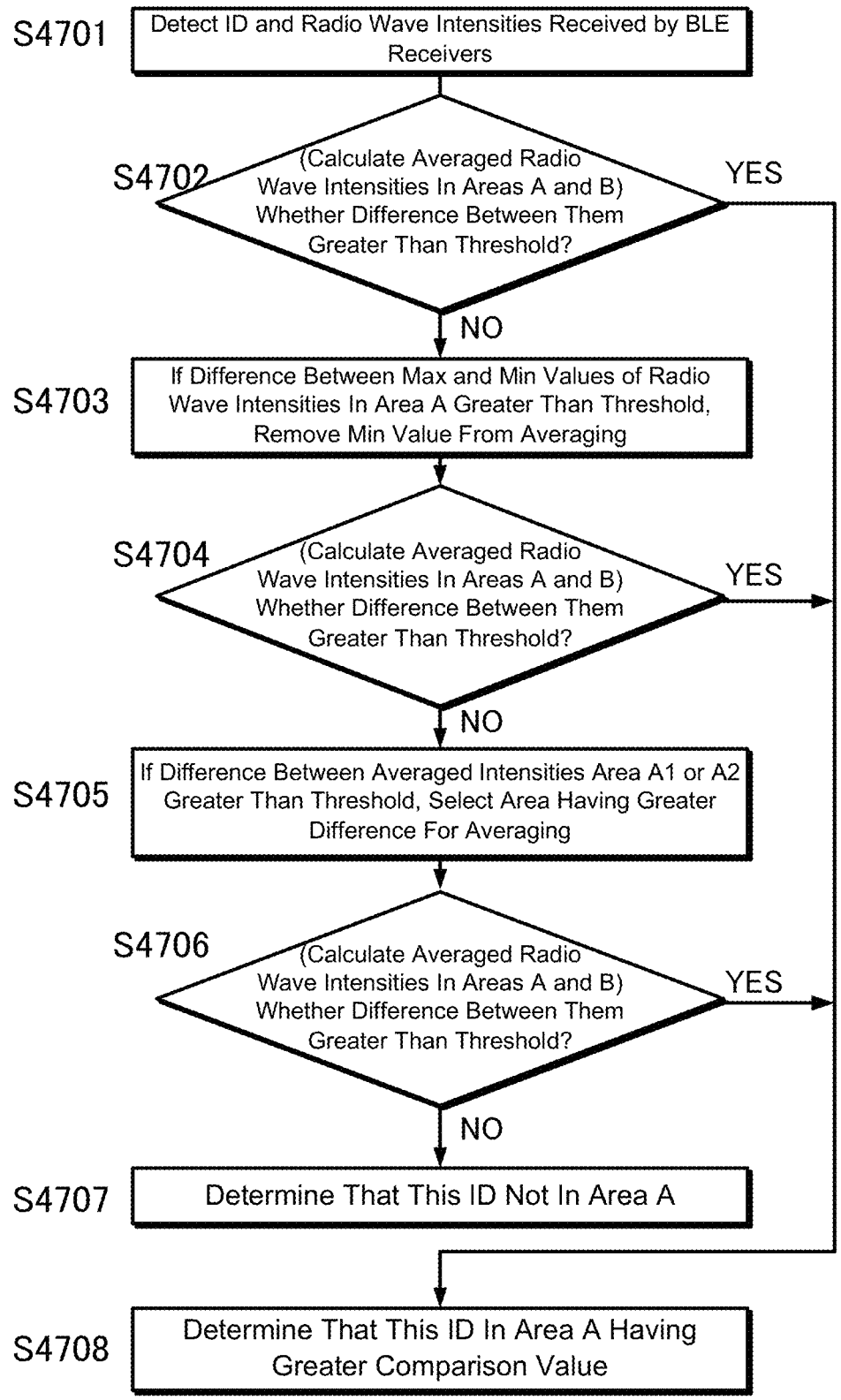
FIG. 47 is a flowchart showing a flow of processing which calculates a comparison value from radio wave intensities of a BLE receiver.

The procedure of calculating the comparison value from radio wave intensities of the BLE receiver is now described with reference to FIG. 47. FIG. 47 is a flowchart showing a flow of processing which calculates a comparison value from radio field intensities of the BLE receiver. Intensities of radio waves of one ID are measured by the of BLE receiver using the measurement method of radio wave intensity as discussed above. Although it will be described that determination method which uses a plurality sets of conditions together with each other, any sets of combinations can be combined with each other for the determination. Various types of arrangements for position determination can be considered as discussed in the basic concept of the embodiments. The arrangement according to this example will be illustratively described. The calculation is described in the arrangement in which the passage detection areas DA, DA1, DA2, DB, DB1, and DB2 are defined in the position determination apparatus 20 shown in FIGS. 36A and 36B.

In this example, the personal portable terminal 10 serves as the BLE transmitter, and the position determination apparatus 20 serves as the BLE receiver. The personal portable terminal 10 transmits BLE signals to the position determination apparatus 20. The position of the personal portable terminal 10 is determined by determining whether the personal portable terminal 10 in one of the plurality of predetermined passage detection areas or not one after another. The passage detection area DA, DA1, DA2, DB, DB1, DB2, etc. shown in FIG. 36A can be used as the plurality of passage detection areas, for example. The determination order in the plurality of passage detection areas can be suitably selected in accordance with processing speed and accuracy. For example, it is first determined whether the personal portable terminal 10 is in the passage detection area DA or not, and if it is determined that the personal portable terminal 10 is in the passage detection area DA the procedure ends. On the other hand, if it is not determined that the personal portable terminal 10 is in the passage detection area DA, it is then determined whether the personal portable terminal 10 is in the passage detection area DB or not. Alternatively, in the case in which the determination in the passage detection area DA has a large error rate, the procedure can go to determination whether the personal portable terminal 10 is in the passage detection area DA1 or not, or whether the personal portable terminal 10 is in the passage detection area DA2 or not.

As exemplary procedure of determining whether the personal portable terminal 10 is inside or outside a particular passage detection area, the procedure of determining whether the personal portable terminal 10 is in the passage detection area DA or not is described based with reference to the flowchart of FIG. 47. First in Step S4701, the personal portable terminal 10 transmits BLE radio waves to the BLE beacon receivers 2111 to 2118 as BLE receivers so that the BLE receivers detect ID and measure radio wave intensities.

Subsequently, in Step S4702, in the measured radio wave intensities, an averaged intensity of the BLE beacon receivers 2111 to 2114 corresponding to a verification area A and an averaged intensity of the BLE beacon receivers 2115 to 2118 corresponding to a verification area B are calculated, and it is determined whether a difference between the averaged intensities is greater than a predetermined threshold or not. The predetermined threshold is suitably specified depending on operating environments such as noise conditions, intensities of radio waves to be use, and the like. In this example, the threshold is 10 dB. Subsequently, if the difference between the averaged intensities is greater than the predetermined threshold, the procedure goes to Step S4708 in which it is determined that the personal portable terminal 10 corresponding to the ID is in the verification area A the averaged intensity of which is greater (i.e., passage detection area DA). After that, the procedure ends.

On the other hand, if the difference between the averaged intensities is not greater than the threshold in Step S4702, the procedure goes to Step S4703 in which if a difference between the maximum and minimum values of the radio wave intensities in the verification area A (BLE beacon receivers 2111 to 2114 in this case) is greater than a predetermined threshold (e.g., 10 dB) the minimum value is removed from value to be used to calculate the averaged intensity. In this step, if variation between radio wave intensities of the BLE beacon receivers is too large (in particular, the BLE beacon sometimes emits a very small intensity of radio waves such as −30 dBm), this removal provides an advantage in which such an abnormal value can be removed.

Subsequently, the procedure goes to Step S4702, in which an averaged intensity of the BLE beacon receivers 2111 to 2114 and an averaged intensity of the BLE beacon receivers 2115 to 2118 are calculated, and it is determined whether a difference between the averaged intensities is greater than the predetermined threshold or not similarly to Step S4702. Subsequently, if the difference between the averaged intensities is greater than the predetermined threshold, the procedure goes to Step S4708 in which it is determined that the personal portable terminal 10 corresponding to the ID is in the passage detection area DA. After that, the procedure ends.

If the difference between the averaged intensities is not greater than the threshold also in Step S4704, the procedure goes to Step S4705 in which if a difference between the averaged intensities in any of a verification area A1 (BLE beacon receivers 2111 and 2112 corresponding to the passage detection area DA1) and a verification area A2 (BLE beacon receivers 2113 and 2114 corresponding to the passage detection area DA2) is greater than a predetermined threshold (e.g., 10 dB), one of the verification areas A1 and A2 which has a greater difference (a set of BLE beacon receivers 2111 and 2112, or a set of BLE beacon receivers 2113 and 2114) than another is selected. The reason is that the averaged intensity in one of the verification areas which is closer to the personal portable terminal 10 is greater than another. For this reason, the position determination is executed based on the greater averaged intensity.

Subsequently, the procedure goes to Step S4706, in which an averaged intensity of the set of BLE beacon receivers 2111 and 2112 or the set of BLE beacon receivers 2113 and 2114 and an averaged intensity of the BLE beacon receivers 2115 to 2118 are calculated, and it is determined whether a difference between the averaged intensities is greater than the predetermined threshold (e.g., 10 dB) or not. Subsequently, if the difference between the averaged intensities is greater than the predetermined threshold, the procedure similarly goes to Step S4708 in which it is determined that the personal portable terminal 10 corresponding to the ID is in the passage detection area DA1 or DA2. After that, the procedure ends. Accordingly, even when the personal portable terminal 10 is not in a central area of the gate but in an area close to the partitioning plate 24A or 24B, the position of the personal portable terminal 10 can be determined.

On the other hand, if the difference between the averaged intensities is not greater than the predetermined threshold in Step S4706, the procedure similarly goes to Step S4707 in which it is determined that the personal portable terminal 10 corresponding to the ID is out of the passage detection area DA (and out of both DA1 and DA2).

Similar procedure is applied to the passage detection area DB (and DB1 and DB2) for the position determination. A flow of more accurate position determination is now is described.

Figure 48:
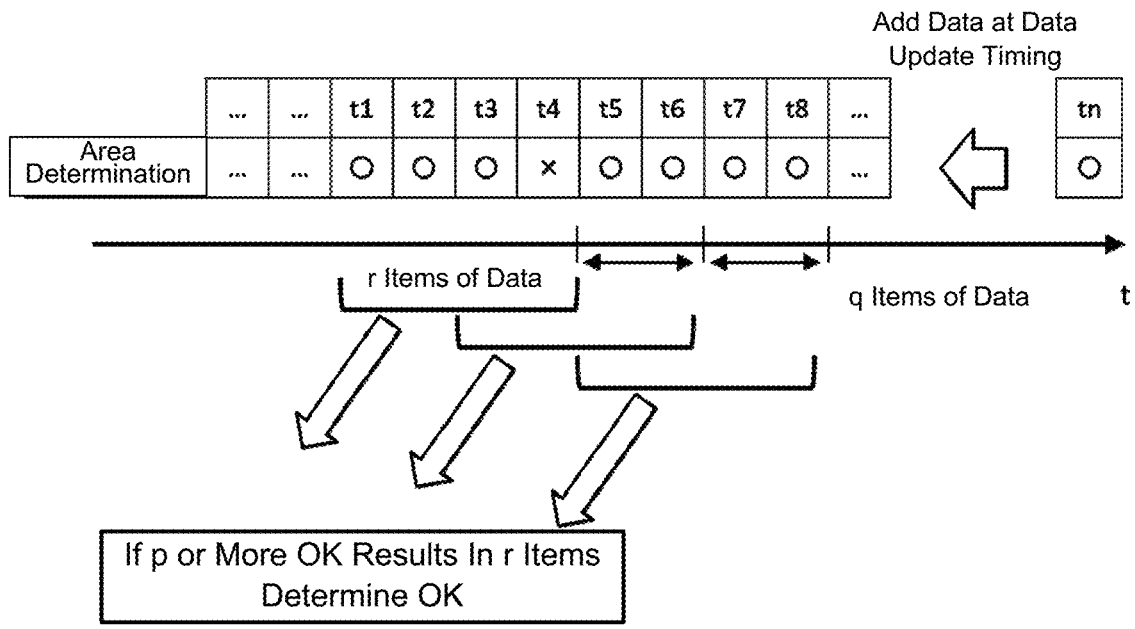
FIG. 48 is a flow diagram illustrating a flow of processing of position determination of a personal portable terminal by the position determination apparatus.

FIG. 20 is a flow diagram illustrating a flow of processing of position determination of the personal portable terminal 10 by the position determination apparatus 20. Here, the determination result of whether the personal portable terminal is in the area as discussed above is referred to as area determination. In this procedure, as shown in FIG. 48, data is added at data update timing. Based on data that includes information on radio wave intensities within a predetermined time period (q times in the example of FIG. 48) or a predetermined period which includes one data update or a plurality of data updates (r times in the example of FIG. 45 where p<=q<=r in the example of FIG. 48), if the number of determination results that the difference between the averaged intensities is greater than the predetermined threshold is p or more in r results (p times of higher comparison results are included in r times of comparison results), the higher comparison result (shown by a circle mark (OK mark)) is held after the data update. This procedure can be applied to even this system which has a low error determination rate. In this case, the system will have an almost error determination rate of 0.0%. This can be obtained by sufficiently reliable determination. If the personal portable terminal 10 that has an ID does not transmit any signal within a certain period, the held data corresponding to the ID can be deleted.

These settings allow the system to recognize the presence of the personal portable terminal in the areas shown in FIG. 36A. For example, the system can recognize the presence of the personal portable terminal in the areas defined by a spherical shape having a diameter of approximately 40 to 60 cm. As a result, the recognizable area includes a height range from a height level of pockets and handheld bags of general adults to a height level of smartphones held in hands by walking users (not recommended) in which users generally carry the personal portable terminal 10. It is noted that, although it has been described that eight BLE receivers are arranged at the same height, eight BLE receivers can be arranged at different heights in order to determine a position of a child user.

(Procedure of Encryption and Decryption)

Figure 49:
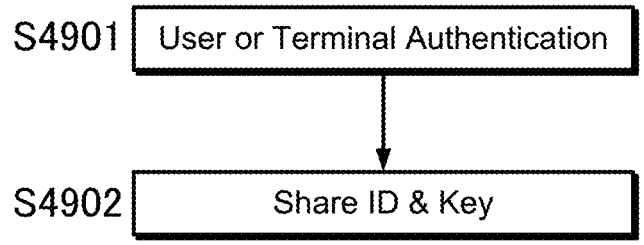
FIG. 49 is a flowchart showing a flow of processing of a personal portable terminal in encryption and decryption.

A flow of the encryption and decryption is now described with reference to FIG. 49. FIG. 49 is a flowchart showing a flow of processing of the personal portable terminal 10 in encryption and decryption. User authentication (e.g., personal information and credit card authentication) and device (terminal) authentication of the portable terminal 10 are conducted in advance by using the personal portable terminal 10. Available device authentication can be limited to only one terminal by license setting by using software, or its activation can be limited, for example. After that, a unique ID is assigned to the personal portable terminal 10. The personal portable terminal 10 and a terminal for its setting can make setting of an encryption key which is paired with the unique ID. Common-key cryptography such as 3DES and AES can be used for the encryption key. Alternatively, public-key cryptography such as elliptic-curve cryptography can be used for the encryption key. The encryption key is securely saved together with the ID in the ID and encryption key database of the administration server system 30.

Figure 50:
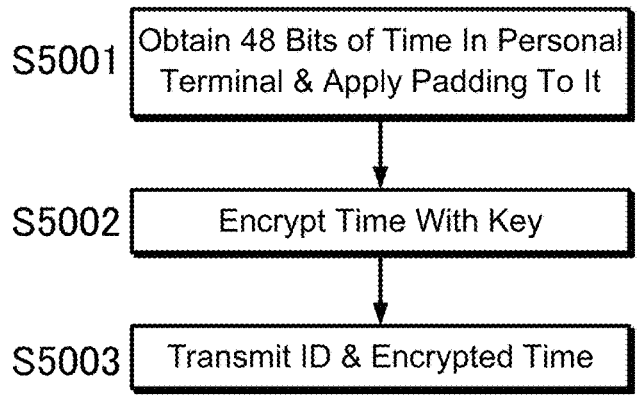
FIG. 50 is a flowchart showing a flow of processing of a personal portable terminal in encryption and decryption.

FIG. 50 is a flowchart showing an exemplary flow of processing of the personal portable terminal 10 in encryption and decryption. First, in Step S5001, the personal portable terminal 10 obtains 48 bits of a time in the personal portable terminal 10 at the operation in the order of microseconds, etc., and padding or the like can be applied to the time. Such padding is used for so-called one-time password used in bank remittance and the like in which an equation obtained from a time is used. For this reason, the padding is required that attackers hardly estimate its processing from the time and its data subjected to the padding processing.

Subsequently, in Step S5002, the time subjected to the padding is encrypted by using the encryption key which is prepared in advance to be paired with the ID. Subsequently, in Step S5003, the ID and the encrypted time are transmitted. As discussed above, the personal portable terminal as authenticated device encrypts the transmission time, and transmits the encrypted time together with the ID to the authentication apparatus which performs authentication of the personal portable terminal.

(Agreement Between Time Differences Between Transmission and Reception)

Figure 51:
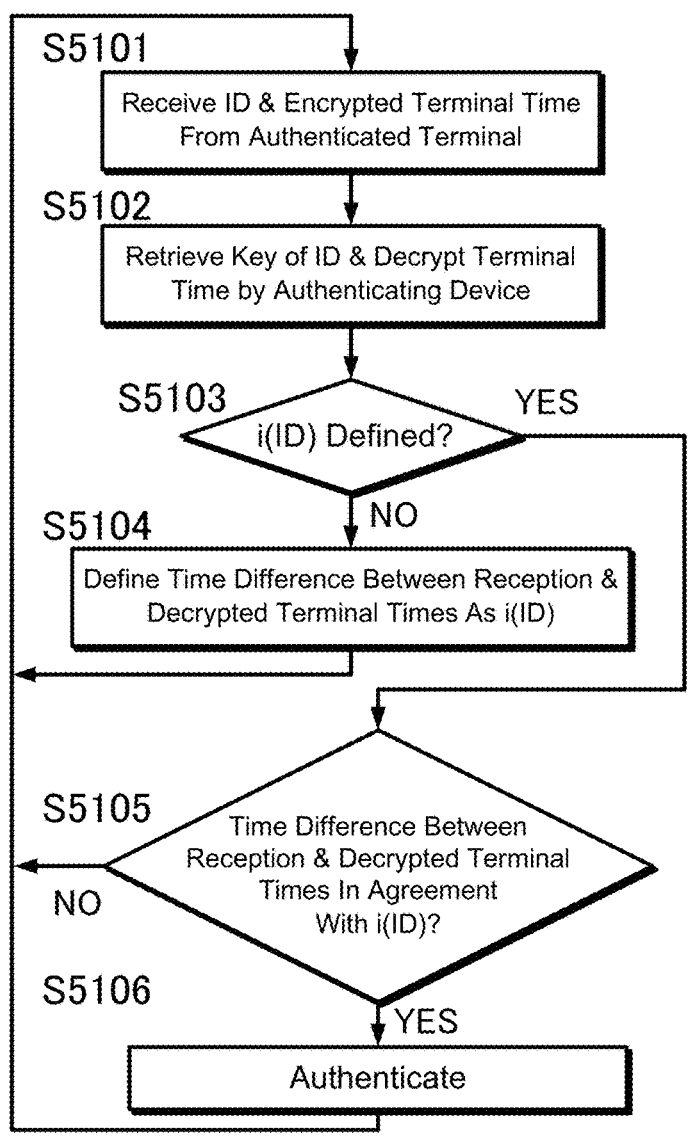
FIG. 51 is a flowchart showing a flow of authentication processing of a position determination apparatus in encryption and decryption.

FIG. 51 is a flowchart showing an exemplary flow of authentication processing of the position determination apparatus 20 in encryption and decryption. In order that the position determination apparatus 20 can authenticate the personal portable terminal, in Step S5101, the position determination apparatus 20 first receives the ID (identification information) and the encrypted time which are transmitted from the authenticated device such as the personal portable terminal etc. Subsequently, in Step S5102, the position determination apparatus 20 which performs authentication of the personal portable terminal retrieves the encryption key corresponding to the ID of the authenticated device, and decrypts the encrypted time which is transmitted together with the ID. Subsequently, in Step S5103, it is determined whether time information i(ID) corresponding to the ID has been defined or not. If not, the procedure goes to Step S5104 in which i(ID) is defined. A number of definition manners which define i(ID) can be considered. In this example, a time difference between a time at which the signal is received (reception time) and a decrypted time (i.e., transmission time on the authenticated device side), for example. If i(ID) is defined, the procedure returns to Step S5101 and the processes are repeated. That is, a new signal which includes the ID and another encrypted time is received. On the other hand, if i(ID) has been defined, the procedure goes to Step S5105, in which it is determined whether a time difference between the reception time and the decrypted transmission time is in agreement with i(ID). If in agreement, the procedure goes to Step S5106 in which the personal portable terminal is authenticated. If not in agreement, the personal portable terminal is not authenticated, and the procedure returns to Step S5101 so that the processes are repeated. The personal portable terminal can be repeatedly authenticated by repeating the authentication process. Such repetition can stop when the repetition number reaches a required number of authentication processes. Alternatively, if continuous authentication is required for real time position determination or the like, the authentication process can be repeated.

(Predetermined within-Range of Time Differences Between Transmission and Reception)

It has been described that the personal portable terminal is authenticated if two time differences each of which is a difference between transmission time and the reception time are in agreement with each other in the aforementioned procedure. However, the time differences i(ID) may not be in agreement with each other in the order of microseconds. For example, time in the authenticated device which defines a reception time may deviate from time in the authentication device defines a transmission time. To address this, an authentication method which can tolerate a certain amount of time deviation is described with reference to a flowchart of FIG. 52 below.

Figure 52:
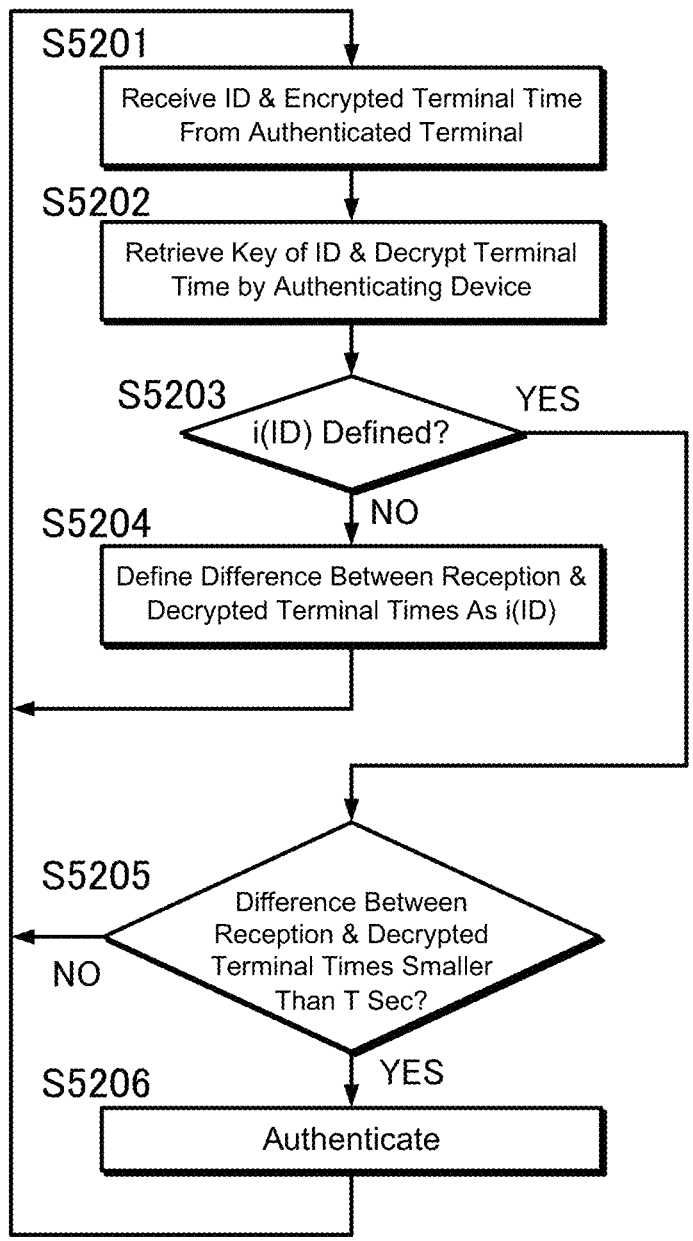
FIG. 52 is a flowchart showing a flow of authentication processing of a position determination apparatus in encryption and decryption.

FIG. 52 is a flowchart showing another exemplary flow of authentication processing of the position determination apparatus 20 in encryption and decryption. In Step S5201, the position determination apparatus 20 which performs authentication of the personal portable terminal first receives the ID and an encryption time which are transmitted from the authenticated device. Subsequently, in Step S5202, the position determination apparatus 20 retrieves the encryption key corresponding to the received ID, and decrypts the encrypted time which is transmitted together with the ID. Subsequently, in Step S5203, it is determined whether time information i(ID) corresponding to the ID has been defined or not. If not, the procedure goes to Step S5204 in which time information i(ID) is defined. A number of definition manners which define the time information can be considered. In this example, a time difference between a time at which the signal is received (reception time) and a decrypted transmission time, for example. If the time information i(ID) is defined, the procedure returns to Step S5201 and the processes are repeated. That is, a new signal which includes the ID and another encrypted time is received.

On the other hand, if i(ID) has been defined in Step S5203, the procedure goes to Step S5205, in which it is determined whether a time difference between the reception time and the decrypted transmission time which are newly received and i(ID) falls within a predetermined range (e.g., T seconds) or not. If the difference falls within a predetermined range, the personal portable terminal is authenticated in Step S5206. The personal portable terminal can be repeatedly authenticated by repeating the authentication process. Such repetition can stop when the repetition number reaches a required number of authentication processes. Alternatively, if continuous authentication is required for real time position determination or the like, the authentication process can be repeated.

(Transmission Time and Reception Time)

Although it has been described that the personal portable terminal is authenticated based on the time information i(ID) in the aforementioned procedure, a plurality of sets of information can be used for criteria of the authentication. For example, time information i(ID) which represents reception time, and time information j(ID) which represents decrypted time (i.e., transmission time) can be used for the authentication. The following description will describe such an exemplary authentication method according to a modified example with reference to FIG. 53.

Figure 53:
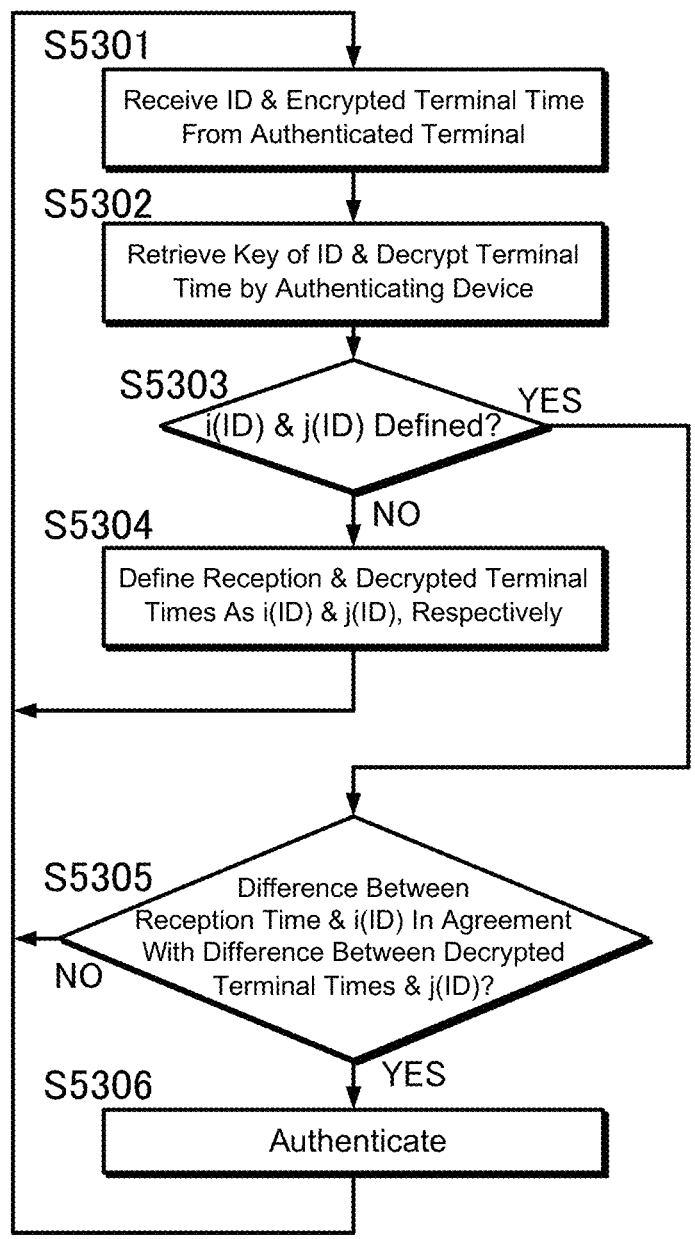
FIG. 53 is a flowchart showing a flow of authentication processing of a position determination apparatus in encryption and decryption.

FIG. 53 is a flowchart showing a flow of authentication processing of the position determination apparatus 20 in encryption and decryption. In Step S5301, to authenticate the personal portable terminal, the position determination apparatus 20 first receives the ID and an encryption time which are transmitted from the authenticated device. Subsequently, in Step S5302, the position determination apparatus 20 retrieves the encryption key corresponding to the received ID, and decrypts the encrypted time which is transmitted together with the ID. Subsequently, in Step S5303, it is determined whether time information i(ID) and time information j(ID) corresponding to the ID have been defined or not. If not, the procedure goes to Step S5304 in which the time information i(ID) and time information j(ID) are defined. For example, a time at which the signal is received (reception time) is defined as i(ID), and a decrypted transmission time is defined as j(ID). After that the procedure returns to Step S5301 and the processes are repeated. That is, a new signal which includes the ID and another encrypted time is received.

On the other hand, if i(ID) and j(ID) have been defined in Step S5303, the procedure goes to Step S5305, in which a difference between a new reception time and i(ID), and a difference between a new decrypted transmission time and j(ID) are obtained, and it is determined whether the two differences are in agreement with each other. If in agreement, the personal portable terminal is authenticated in Step S5306. If not, the personal portable terminal is not authenticated, and the procedure returns to step S5301 and repeats the authentication process. The personal portable terminal can be repeatedly authenticated by repeating the authentication process. Such repetition can stop when the repetition number reaches a required number of authentication processes. Alternatively, if continuous authentication is required for real time position determination or the like, the authentication process can be repeated.

It has been described that the personal portable terminal is authenticated if two differences corresponding to i(ID) and j(ID) are in agreement with each other in the aforementioned procedure. However, the two differences are not necessarily in complete agreement with each other as discussed above. The personal portable terminal may be authenticated if a difference between the two differences falls within a certain range to tolerate a certain amount of time deviation. The following description will describe such an exemplary authentication method according to another modified example with reference to FIG. 54.

Figure 54:
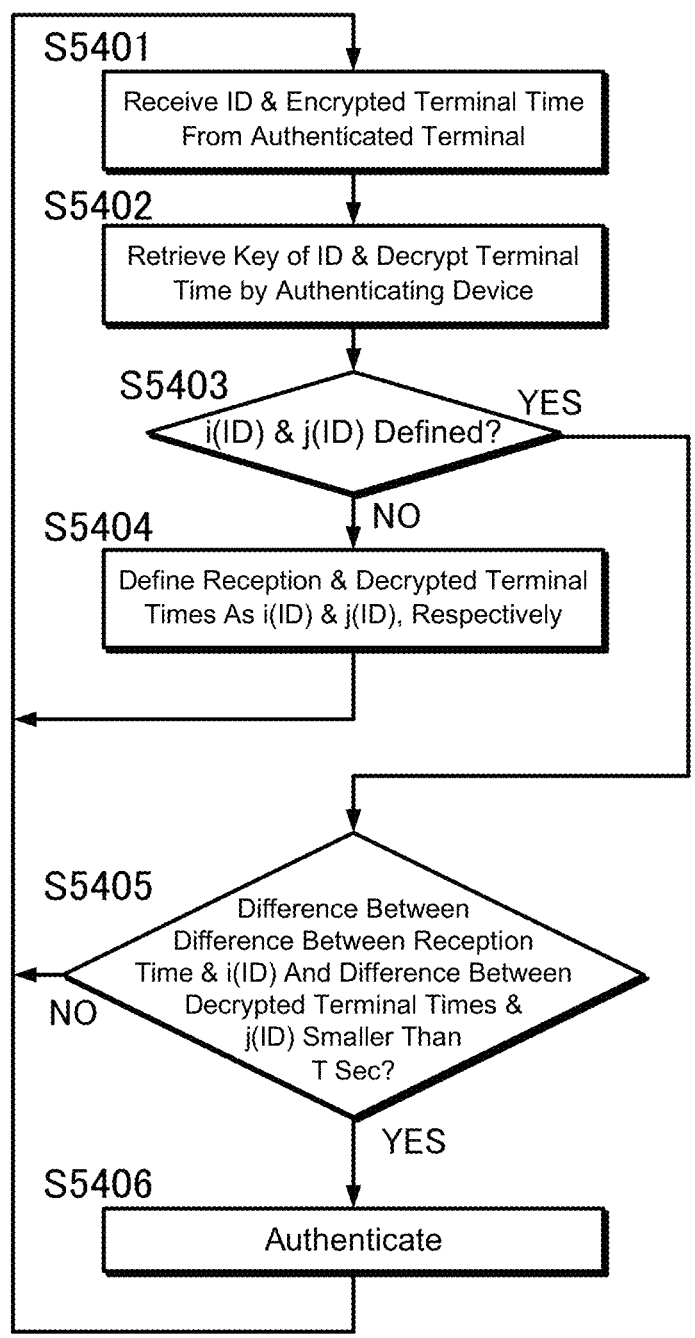
FIG. 54 is a flowchart showing a flow of authentication processing of a position determination apparatus in encryption and decryption.

FIG. 54 is a flowchart showing a flow of authentication processing of the position determination apparatus 20 in encryption and decryption according to the modified example. In this example, the personal portable terminal is authenticated based on a time difference between reception times, and a time difference between decrypted transmission times. That is, a time at which the signal including the ID is received is obtained as i(ID), and a decrypted transmission time is obtained as j(ID). After i(ID) and j(ID) corresponding to the ID have been defined, the personal portable terminal is authenticated if a difference between a difference between a reception time and i(ID) and a difference between a decrypted transmission time and j(ID) falls within a certain range in the order of microseconds. Specifically, the procedure of the position determination apparatus 20 which performs authentication of the personal portable terminal is described with reference to FIG. 54.

In Step S5401, the position determination apparatus 20 first receives the ID and a time at which a time is encrypted from the authenticated device such as personal portable terminal, etc. Subsequently, in Step S5402, the position determination apparatus 20 retrieves the encryption key corresponding to the ID transmitted from the authenticated device, and decrypts the encrypted time which is transmitted together with the ID. Subsequently, in Step S5403, it is determined whether i(ID) and j(ID) have been defined or not. If it is determined that i(ID) and j(ID) have not been defined, the time at which the signal is received (reception time) is defined as i(ID), and a decrypted transmission time is defined as j(ID). After that the procedure returns to Step S5401 and the processes are repeated. That is, the ID and a new time are received.

On the other hand, if i(ID) and j(ID) have been defined in Step S5403, the procedure goes to Step S5405, in which a difference between a new reception time and i(ID), and a difference between the new decrypted transmission time and j(ID) are obtained, and it is determined whether a difference between a difference between the reception time and i(ID) and a difference between the new decrypted transmission time and j(ID) falls within a certain range of T seconds. If the difference falls within the range, the procedure goes to Step S5406 in which the personal portable terminal is authenticated. If the difference does not fall within the range, the position determination apparatus does not authenticate the personal portable terminal and waits for signals. That is, the procedure returns to step S5401 and repeats this procedure. Accordingly, the authentication can be executed. Such repetition can stop when the repetition number reaches a required number of authentication processes. Alternatively, if continuous authentication is required for real time position determination or the like, the authentication process can be infinitely repeated. Also, i(ID) and j(ID) can be clear after a predetermined time period elapses. In this case, because i(ID) and j(ID) as reference time for authentication are updated at a certain cycle, even if spoofing attack is succeeded once, the spoofing attack can be continuously succeeded. Therefore, the security can be further improved.

(Spoofing Detection Method)

A spoofing detection method is now described. Basically, even if a signal is received and copied by a spoofing attacker, when it takes more than several microseconds from the reception to transmission of the signal, such spoofing attack cannot be authenticated in the aforementioned authentication method. For this reason, problems will not arise. However, it may be considered that time from the reception to the transmission is smaller than several microseconds. Here, measures against such spoofing attack are now described.

Figure 55:
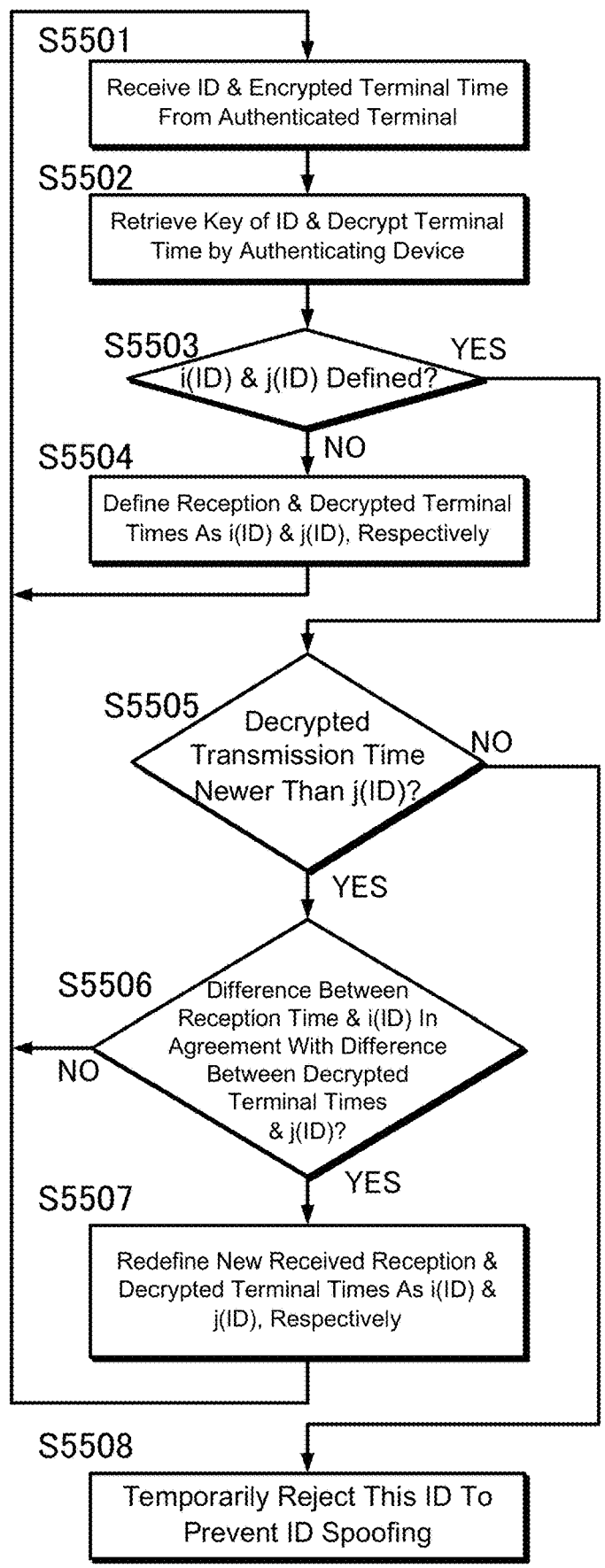
FIG. 55 is a flowchart showing a flow of processing of authentication spoofing prevention by a position determination apparatus in encryption and decryption.

FIG. 55 is a flowchart showing a flow of processing of authentication spoofing prevention by the position determination apparatus 20 in encryption and decryption. In the case in which the personal portable terminal is authenticated by the method which has been discussed with reference to FIG. 53 or 54, if a decrypted transmission time is newer than j(ID), similar processes can be also applied to in the spoofing detection method. Although the spoofing detection method corresponding to FIG. 53 is described with reference to FIG. 55, the method can be applied to FIG. 54. On the other hand, if a decrypted transmission time is not newer than j(ID), that is, if the received signal is a copy of any old signal, spoofing attack can be prevented by temporarily rejecting the ID because spoofing attackers cannot create any signal newer than j(ID) (the ID is spoofed).

Figure 56:
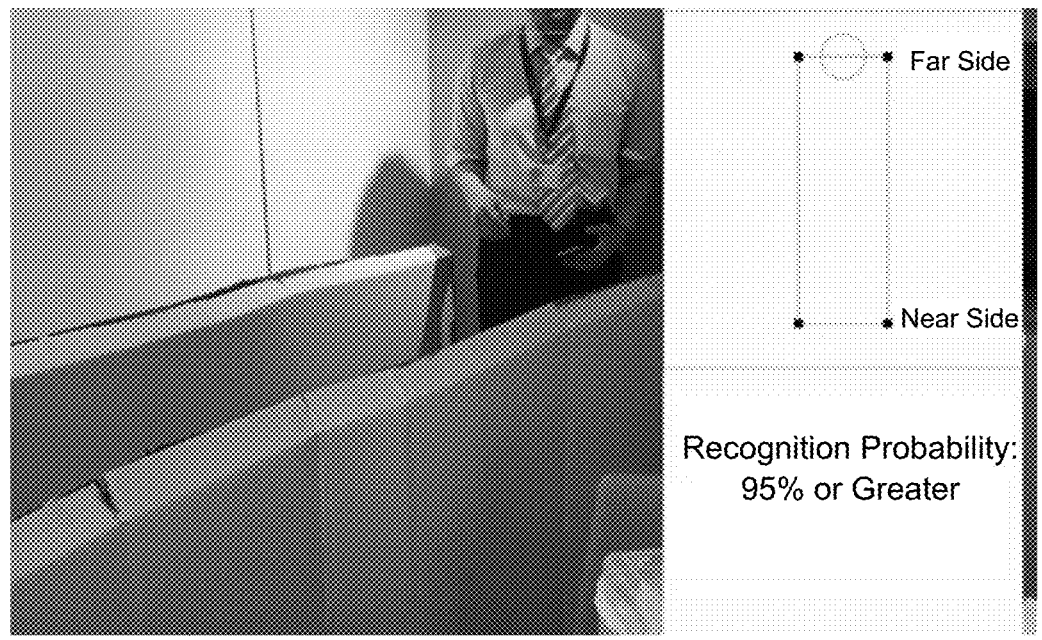
FIG. 56 shows an image and a diagram of experiment in which the position determination apparatus is considered as a ticket gate.
Figure 57:
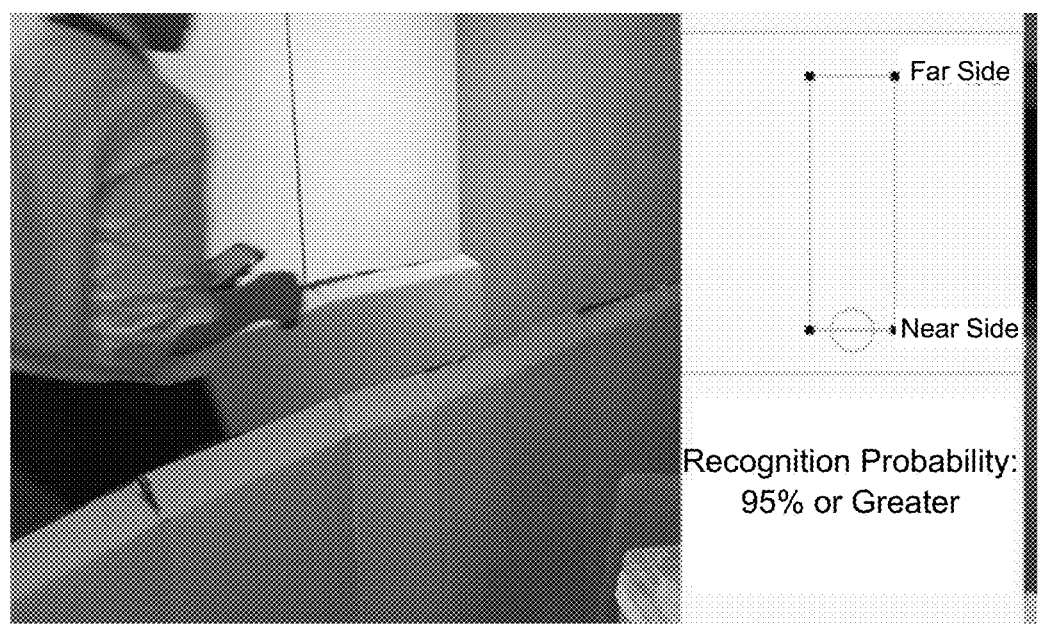
FIG. 57 shows an image and a diagram of experiment in which the position determination apparatus is considered as a ticket gate.

FIGS. 56 and 57 show an image and a diagram of experiment in which the position determination apparatus is considered as a ticket barrier. The image on the left side is an image under experiment, and the diagram on the upper right side shows the results of the authentication in FIGS. 56 and 57. A user is on the far side in the image on the left side, and a circle mark (OK mark) is indicated corresponding to every several microseconds in the diagram on the upper right side in FIG. 56 which means that successful position determination and authentication can be confirmed. The mark shows a probability of not lower than 95% in each position determination/authentication process. It is con-formed that the probability of position determination and authentication when the aforementioned processing is applied is approximately $1 \cdot 10^{-17}$ during a period in which the user moves approximately 10 cm. In addition, the probability of misrecognition is hundredths percentage or less (0.0%) in each position determination/authentication process. Similarly, FIG. 57 shows that successful position determination and authentication on the near side can be confirmed. Passage of the user in the opposite direction can be detected by control of opposite arrangement processing.

A device which reads conventional tickets and IC cards and performs processing on them may be included in the ticket gate according to this example. Network connection for such a device can be provided. Alternatively, the system according to this example can cooperate with such a device. Another independent payment system may be used for such a device.

Because the smartphone terminal, etc. which has a plurality of combined functions is used in this example, improper rides such as a case in which passengers exchange their IC cards can be prevented. License authentication of application software is required for each terminal to use the application software, for example. In this case, when the user changes his or her terminal etc., procedure is required to removes the license from one (old) terminal to allow the user to use the application software on another (new) terminal. For example, the procedure is conducted in a registration site or the like. Alternatively, the procedure is conducted by automatic logging out from the application software of the old terminal when the user logs in the application software by entering his or her ID, password, and the like into the new terminal. In addition, in the case in which an administration apparatus or the like determines whether the personal portable terminal 10 comes into the station yard or not, improper rides can be prevented even if one payment and another payment are combined with each other.

Signals in the transmission/reception are not limited to BLE beacon signals (packets). For example, BLE communication, that is, BLE signals (packets) can be used in the transmission/reception. In this case, the procedure in BLE communication is partially different from BLE beacon communication. The BLE communication has an advantage of wider communication band than BLE beacon communication. The signals are not limited to BLE. Other known standard wireless communications such as Wi-Fi, RFID, IMES, and ZigBee can be suitably used for the signals. Also, the signals are not limited to radio wave signals. Ultrasonic waves, light (electromagnetic waves other than radio frequency waves), or the like which propagates a medium can be used for the signals.

Example 2

(Entire Deferred Payment System)

A system according to Example 2 which allows users to pay in stores such as convenience store and supermarket without picking up their personal portable terminal 10 is illustratively now described. Here, description of members same as or similar to those according to Example 1 is omitted, and only members different from Example 1 are described.

Conventionally, systems in which items attached with a RFID tag or the like are placed or items are monitored by cameras or the like in stores such as convenience store and wear store to let users know the total amount of items before they pay are known. However, even in these systems, users necessarily use electronic cash register, two-dimensional bar codes, or the like for their payment. Such usage of electronic cash register, two-dimensional bar codes, or the like is inconvenient for users. To address this, a position determination and authentication technology according to this example is used to improve users' convenience.

For example, the administration terminal 50 is installed in a convenience store, and the position determination apparatus 20 is installed at the exits by a the business entity. The position determination apparatus 20 includes a reader which can read RFID tags. Items are attached with the RFID tag. The RFID tag records information of price of an item and information assigned to the item. Users can sign a contract with the business entity through the administration server system 30. Accordingly, available position determination apparatuses 20 which can be used by a user and an available term in which the user can use the available position determination apparatuses 20 are registered. The user who holds his or her personal portable terminal 10 brings a bag in which items to be purchased is held, and passes through the position determination apparatus 20 on the exit of a store. The position determination apparatus 20 determines the position of the personal portable terminal 10 of the user and authenticates the personal portable terminal 10. In addition, the position determination apparatus 20 reads the RFID tag to calculate the total amount of the items, and charges the total amount to the user in deferred payment.

Accordingly, the user can directly take the items home in the bag without waiting for the payment at an electronic cash register. Also, the business entity can greatly reduce actions to serve users in payments.

Also, instead of RFID tags, cameras can trace users and recognize items which are put into a basket or bag so that the total amount of the items can be calculated for their payments. Also, users can first pass through the position determination apparatus 20 so that the total amount can be then charged in deferred payment.

Also, only a Bluetooth device may be arranged at an electronic cash registers or the like instead of the position measuring device 20. In this case, because a position of a user can be determined not with high accuracy but a degree of conventional accuracy, the user can be authenticated by using the authentication technology according to this example. For example, a pay/accept button or the like can be shown on a screen or the like of an electronic cash register so that the user can press the button to complete the payment. Also, the user can enter 4 digit numbers to complete the payment. In this case, the electronic cash register device can be constructed of a device such as tablet and application software. In the recognition of items, the items are not necessarily recognized by RFID tags, camera, and the like. The items may be recognized by scanning conventional bar codes or the like. In this case, from the viewpoint of the business entity side, although a salesclerk necessarily serves a customer at electronic cash register, cash balance management is not required. On the other hand, from the viewpoint of users, they can easily pay without inconvenience at the electronic cash register. This arrangement can also provide advantages.

In the case in which BLE receivers are arranged in a store, a position of a user can be determined with a degree of conventional accuracy or with high accuracy obtained by this position determination technology so that flow lines of customers can be analyzed by using BLE radio waves transmitted by customers' smartphones.

Example 3

(Entire Deferred Payment System) (Wireless Charge)

A system according to Example 3 which allows users to pay in wireless charge without picking up their personal portable terminal 10 is illustratively described. Here, description of members same as or similar to those according to Examples 1 or 2 is omitted, and only members different from Example 1 or 2 are described.

Methods which charge a smartphone terminal, etc. in a wireless manner have been studied and developed. A smartphone terminal, etc. can be actually charged in a wireless manner. For example, in Cota which is a wireless charging system, a smartphone terminal, etc. can be charged at 1 W to the maximum distance 10 meters. If a plurality of such systems are installed, their corresponding smartphones can be charged when their users walk in areas close to the systems. However, the charging fee cannot be charged if a person whose smartphone is charge is not identified. To address this, users who walk in areas close to such systems can be identified and authenticated by the position determination and authentication technology according to this example so that the users can pay the charge fee in deferred payment.

For example, the business entity provides the position determination apparatuses 20 around a wireless charging system. In addition, a position determination and authentication application software which is installed in a personal portable terminal 10 of a user has a function which measures a charged amount which is supplied to the personal portable terminal 10. The user signs a contract with the business entity through the administration server system 30 in advance. The user carries the personal portable terminal 10 to be charged with electric power, and moves in areas close to the wireless charging systems. The position determination apparatus 20 determines the position of the personal portable terminal 10 of the user and authenticates the personal portable terminal 10 to confirm his or her solvency. After that, the wireless charging system can emit radio waves toward the personal portable terminal 10 to charge the personal portable terminal 10. The personal portable terminal 10 can measure the charged amount through the position determination and authentication application software, and can calculate the charged amount. The personal portable terminal 10 can then notify the administration server system 30 about the charged amount. The administration server system 30 can charge a fee for the wireless charging system to the user. This system can provide improved convenience to both users and the business entity.

Example 4

(Entire Deferred Payment System) (Drive-Through)

A system according to Example 4 which allows users to pay in a drive-through without picking up any of cash, credit cards, and personal portable terminal 10 is illustratively described. Here, description of members same as or similar to those according to Examples 1 to 3 is omitted, and only members different from Example 1 to 3 are described.

Conventionally, in a drive-through, when receiving items, users necessarily pay by cash, credit card, personal portable terminal 10, and the like. Such payments are inconvenient for users. To address this, even if a user stays in a car, the user can be identified and authenticated by the business entity by using the position determination and authentication technology according to this example so that the user can pay the fee in deferred payment.

For example, the position determination apparatus 20 is installed in the drive-through. The user signs a contract with the business entity through the administration server system 30 in advance. The business entity determines the position of the personal portable terminal 10 of the user and authenticates the personal portable terminal 10 by using the position determination apparatus 20, and charges the total amount to the user. Accordingly, time and action for payment can be reduced. As a result, this system can provide improved convenience to users. In addition, time and action required to receive payments can be reduced. As a result, this system can provide improved convenience to the business entity.

Also in Example 4, only a Bluetooth device may be arranged instead of the position measuring device 20. In this case, the arrangement similar to Example 2 can be used, and its description is omitted.

Example 5

(Deferred-Payment System+Authentication) (Cooperation Between Car Recognition and Shopping)

An exemplary system according to Example 5 is now described. In the case in which a user parks a car in a parking lot combined with a store for shopping, the system allows the user to pay for shopping without picking up any of cash, credit cards, and personal portable terminal 10, and then to leave the parking lot without receiving any parking card which is issued when arriving, without handing over any parking card to a salesclerk at an electronic cash register, or without inserting any parking card into a machine or the like at an exit gate for card reading when leaving. Here, description of members same as or similar to those according to Examples 1 to 4 is omitted, and only members different from Example 1 to 4 are described.

A system which discounts a parking fee of a user in accordance with the total amount of user's shopping by handing over a parking card to a salesclerk at an electronic cash register is known. When the car enters a parking lot, its car registration plate is captured. After that, when the user leaving the parking lot, the gate of the parking lot can be automatically opened so that the user can leave the parking lot without inserting the parking card into the gate. However, in this system, the user is required to receive the parking card when entering the parking lot, and to show the parking card to salesclerks at electronic cash registers in shopping. Such actions are inconvenient for users.

On the other hand, the position determination and authentication technology according to this example does not require users to receive a parking card when entering parking lots, to take inconvenient actions in payment at electronic cash registers in shopping, and to show the parking card in the payment. That is, users can use a parking lot from entering to leaving, and can pay in shopping without conscious of parking cards. Also, actions required of the business entity to receive payments as electronic cash registers and to check parking cards can be eliminated.

For example, the position measuring apparatuses 20 are arranged at parking entrance/exit gates and electronic cash registers in stores. The user signs a contract with the business entity through the administration server system 30 in advance. The business entity determines the position of the personal portable terminal 10 of the user and authenticates the personal portable terminal 10 when the user enters/leaves a parking lot and pays at electronic cash registers by using the position measuring apparatuses 20, and charges the total amount to the user without reception and return of a parking card from and to the user when the user enters/leaves the parking lot. As a result, exchange of cash and parking card between users and the business entity and actions at electronic cash registers can be reduced. Therefore, the system according to this example can provide improved convenience to both users and the business entity.

Also in Example 5, only a Bluetooth device may be arranged at electronic cash registers instead of the position measuring device 20. In this case, the arrangement similar to Example 2, etc. can be used, and its description is omitted.

Example 6

(Entire Deferred Payment System) (Payment for Bus and Taxi)

A system according to Example 6 which allows users to pay for bus or taxi fare without picking up any of cash, credit cards, and personal portable terminal 10 is illustratively described. Here, description of members same as or similar to those according to Examples 1 to 5 is omitted, and only members different from Example 1 to 5 are described.

Conventionally, when leaving bus or taxi, users necessarily pay by cash, credit card, IC card, personal portable terminal 10, and the like. Such payments are inconvenient for users. To address this, a position determination and authentication technology according to this example is used to improve users' convenience.

For example, the administration terminals 50 are installed in main business offices of the business entity, and the position determination apparatuses 20 are installed at the entrance and exit of buses. A user passes through the position determination apparatus 20 when boarding a bus, and the position determination apparatus 20 records the boarding place of the user who uses the bus. When the user passes through the gate in the bus to step off the bus, the position determination apparatus 20 determines the position of the personal portable terminal 10 of the user and authenticates the personal portable terminal 10 to allow the user pass through the gate. In addition, the position determination apparatus 20 records the arrival place. The business entity notifies the administration server system 30 about the data through the administration terminal 50 in the office. The administration server system 30 can charge bus fares to users based on bus usage records of the users and the fare table in deferred payment. In addition, the personal portable terminal can cooperate with application software which informs its user about boarding and arrival of a bus based on GPS information and the like to inform the user about boarding/arrival timing.

Also, in the case of a taxi, the administration terminal 50 is installed on the driver's seat side in the taxi, and the position determination apparatus 20 is installed by the business entity to determine a position of a user on the seat in the taxi. A user passes through the position determination apparatus 20 when taking a taxi, and the position determination apparatus 20 records the boarding place of the user who uses the taxi, and time. When a user gets off the taxi, the driver charges the taxi fare to the user in the taxi. If two or more users are in the taxi, one user selected from them can pay for the taxi fare. The driver confirms the position determination and authentication results by using the administration terminal 50, and charges the taxi fare to the personal portable terminal 10 that is positioned at the seat of the selected user.

Also, a smartphone, etc. may be arranged instead of the position measuring device 20. In this case, because a position of a user can be determined not with high accuracy but a degree of conventional accuracy, the user can be authenticated by using the technology according to this invention. For example, a pay/accept button or the like can be shown on a screen or the like of the smartphone so that the user can press the button to complete the payment. Also, the user can enter 4 digit numbers to complete the payment.

Taxi fare table is previously prepared to automatically calculate taxi fares in accordance with travel distance or time. In addition, extra charge and the like may be added to the taxi fares when the fare is charged to the user.

Example 7

(Entire Deferred Payment System) (Payment for Gate Lock in Parking Lot by Smartphone)

A system according to Example 7 which allows users to pay in a parking lot without inconvenience is illustratively described. Here, description of members same as or similar to those according to Examples 1 to 6 is omitted, and only members different from Example 1 to 6 are described.

Conventionally, in parking lots, and the like, users are required to unlock a lock in front of his or her car in advance, or to pay the parking fee when leaving the parking lot. Such actions are inconvenient for users. To address this, a position determination and authentication technology according to this example is used to improve users' convenience.

For example, the position determination apparatuses 20 are arranged in their corresponding space in a parking lot. A user requests to unlock a lock in front of his or her car through application software or the like by using the personal portable terminal 10. The position determination apparatus 20 determines the position of the personal portable terminal 10 of the user and authenticates the personal portable terminal 10 to unlock the lock at the position of the car.

Alternatively, the position determination apparatus 20 is arranged at the exit of the parking lot. When the user in the car leaves the parking lot, the position determination apparatus 20 determines the position of the personal portable terminal 10 of the user and authenticates the personal portable terminal 10 to open a barrier bar at the exit so that the user in the car is allowed to leave the parking lot.

The business entity can charge the parking fee to user's credit card in deferred payment.

Example 8

(Entire Prepaid System) (Prepaid/Deferred Payment System of Event, Movie Theater, Etc., and Prepaid/Deferred Payment System of Boarding of Ski Lift and Vessel)

A system according to Example 8 which automatically checks tickets which are paid in advance is described. Here, description of members same as or similar to those according to Examples 1 to 7 is omitted, and only members different from Example 1 to 7 are described.

Conventionally, in the case in which people buy a printed ticket for movie theater, outdoor music festival, or the like, their tickets are checked at a gate by staffs or by machines when they enter and leaves there. Such check is troublesome. As a result, long queues are formed so that it takes long time for the people to pass through the gate. To address this, a position determination and authentication technology according to this example is used to improve users' convenience.

Figure 58:
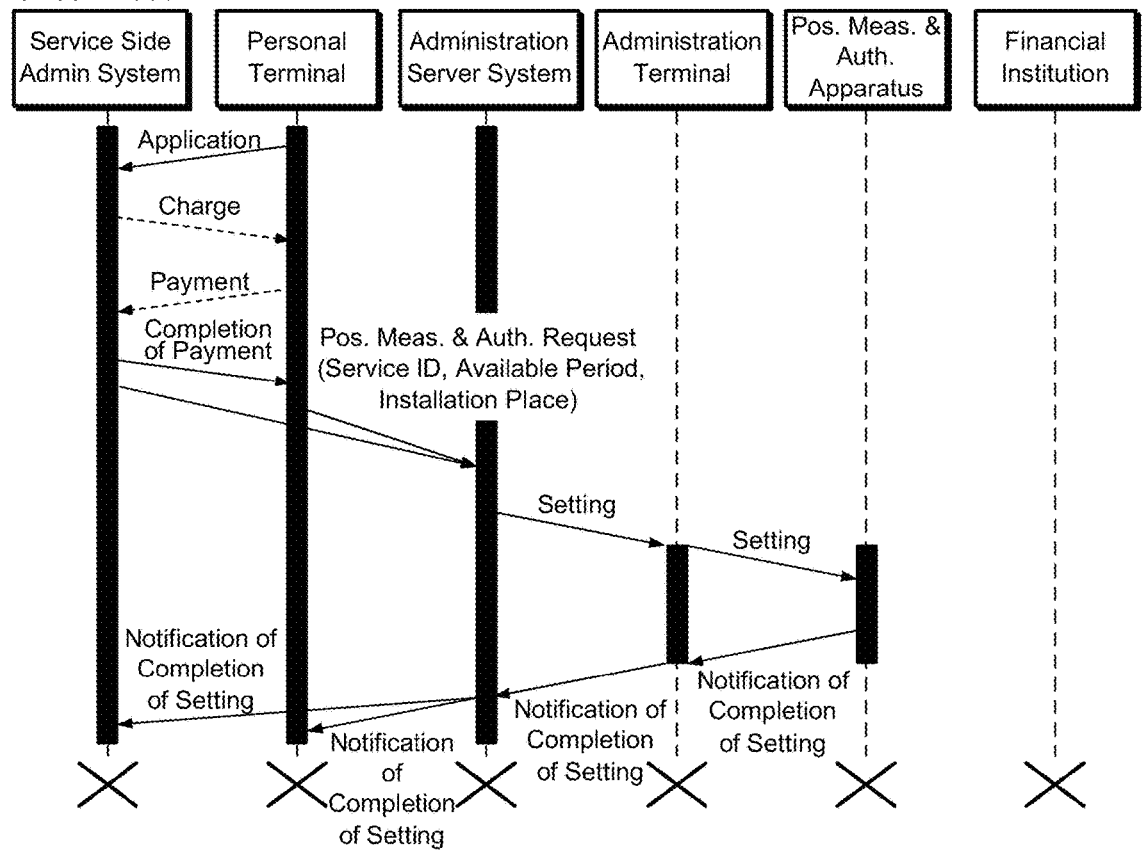
FIG. 58 is a schematic diagram showing a position determination and authentication system.
Figure 59:
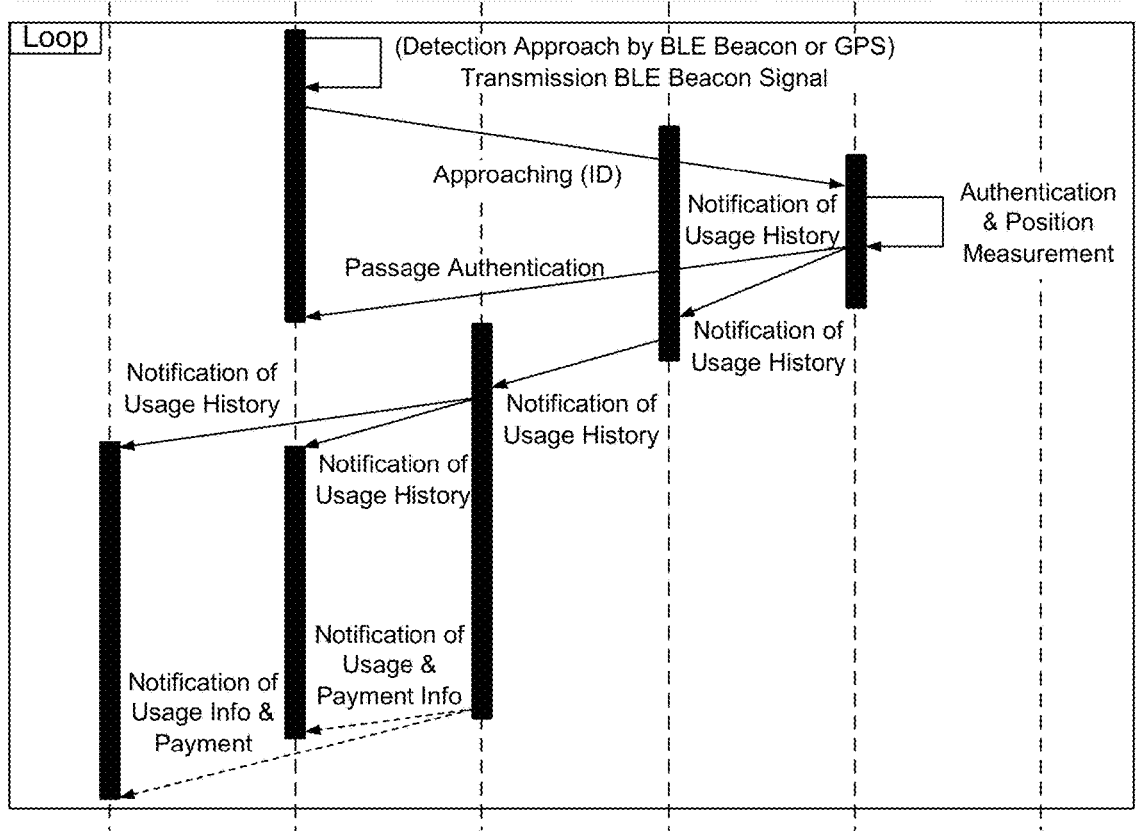
FIG. 59 is a schematic diagram showing a position determination and authentication system.

For example, the position determination apparatus 20 is installed in a movie theater, amusement park, event hall, entrance gate of the ski lift, boarding/exit gate of vessel, and the like. As shown in FIG. 58, a user reserves a seat in a theater, a ticket of amusement park, event, skiing company, and shipping company, and the like through a website of the theater, amusement park, event, skiing company, shipping company, their agent, and the like in advance. Subsequently, the user obtains the reservation information into the position determination and authentication application software which is previously installed in his or her smartphone by scanning a two-dimensional bar code or automatically obtains the reservation information into the position determination and authentication application software through reservation application software of the business entity after the reservation. The position determination apparatus 20 determines the position of the personal portable terminal 10 of the user and authenticates the personal portable terminal 10 so that the user can pass through the gate and pay for the fee as shown in FIG. 59. Also, the user can pay for the fee which is specified in advance in deferred payment.

After paying by an existing method such as payment through Internet or at a store or the like in advance, the user obtains the payment information by scanning a two-dimensional bar code or by automatically activating the positional information authentication application software of the personal portable terminal 10. The personal portable terminal 10 which receives the information transmits the information to the administration server system 30. The administration server system 30 sends an inquiry about the information to the business corporation. The business service side administration system 40 confirms the information in response to the inquiry. After that, the business service side administration system 40 generates information of a place or the position determination apparatus 20 that can be used by the user, the available term and the like, and transmits the information to the administration server system 30.

Example 9

(Entire Prepaid System) (Hotel)

A system according to Example 9 which automatically unlocks a lock of a room which is reserved by a user in advance is described. Here, description of members same as or similar to those according to Examples 1 to 8 is omitted, and only members different from Example 1 to 8 are described.

Conventionally, even when a user reserves a room of a hotel, the user is required to check in the hotel. Even if the hotel is automated, the check-in cannot be omitted because the personal information of the user is necessarily entered and the user necessarily pays for the accommodation fee to authenticate the user. To address this, a position determination and authentication technology according to this example is used to improve users' convenience.

For example, the position determination apparatuses 20 are arranged at doors of rooms of the hotel as the business entity to cooperate a locking system. A user reserves a room of the hotel through a website of the hotel, its agent, and the like. Subsequently, the user obtains the reservation information into the position determination and authentication application software which is previously installed in his or her smartphone by scanning a two-dimensional bar code or automatically obtains the reservation information into the position determination and authentication application software through reservation application software of the hotel after the reservation. When the user approaches the position determination apparatus 20 arranged at the door of the room of the hotel that is reserved by the user, the user can pass through the position determination apparatus 20 based on the position determination and authentication of the user, and if the place of the position determination apparatus 20 and the time are in agreement with the information obtained in the position determination and authentication application software, the door can be unlocked by the position determination apparatus 20. The user can pay for the accommodation fee when reserving the room in advance or in deferred payment after stayed, for example. This system can be used for the payment. Alternatively, other payment system can be used for the payment.

In addition, the positional information authentication terminal and the administration terminal 50 transmit information about unlocking to the administration server system 30. The administration server system 30 notifies the business company about the information through the business service side administration system 40.

As a result, inconvenient actions which are required conventionally for users to leave keys at the front desk can be eliminated.

Example 10

(System Including Payment) (Authentication System and Position Determination Apparatus 20 in Apartment House, Office, Conference Room, Etc. Requiring Access Control, and Car Doors)

A system according to Example 10 which automatically takes actions relating to authentication of the personal portable terminal 10 is described. Here, description of members same as or similar to those according to Examples 1 to 9 is omitted, and only members different from Example 1 to 9 are described.

Conventionally, in access control, users are required to touch a reader with their IC card or finger (fingerprint authentication) to authenticate the users. Such actions are inconvenient for users. To address this, a position determination and authentication technology according to this example is used to improve users' convenience. To address this, a position determination and authentication technology according to this example is used to improve users' convenience.

For example, the position determination apparatus 20 is installed by the business entity in an apartment house, office, conference room, etc. requiring access control, and car doors. In addition, the business entity can define available places and terms of the position determination apparatuses 20 corresponding to users. The position determination apparatus 20 determines the position of the personal portable terminal 10 of the user and authenticates the personal portable terminal 10 so that the user can enter/leave the available place in the available terms.

The position determination apparatus 20 and the administration terminal 50 notify the business service side administration system 40 about information on the access through the administration server system 30. In this case, an automatic lock of an apartment house or the like can be quickly unlocked, and inconvenient actions for users can be reduced, for example. Also, an attendance record of employees can be obtained. Also, this system can be used to reserve conference rooms or the like. Also, a security zone can be defined. In addition, the security zones can be changed in accordance with time.

Also, doors of user's car can be unlocked when the user approaches the car without touching the door and without remote unlocking action. In this case, angles of mirrors and driver's seat can be changed in accordance with the user who operates the car. In addition, comments to be shown the user can be changed for each user. Such changes improve hospitality. Inconvenience of authentication can be substantially reduced particularly in car sharing or the like.

In the aforementioned system, the authentication and the position determination may be separated. That is, a system which only determine positions of users but does not authenticate users may be provided. Contrary to this, a system which only authenticate users but does not determine their positions may be provided.

Example 11

(Authentication System Including Payment) (Authentication System, PC, ATM)

A system according to Example 11 which simplifies user authentication by using authentication of the personal portable terminal 10 is described. Here, description of members same as or similar to those according to Examples 1 to 10 is omitted, and only members different from Example 1 to 10 are described.

Conventionally, in ATMs, users are required to enter their PIN number, or to put their finger or palm on a vein scanner to authenticate the users. Such actions are inconvenient for users. To address this, a position determination and authentication technology according to this example is used to improve users' convenience.

For example, the position determination apparatus 20 is installed in equipment which requires user authentication such as PC and ATM. In addition, the business entity can define available places and terms of the position determination apparatuses 20 corresponding to users after users authenticate themselves or the business entity authenticate users. The position determination apparatus 20 determines the position of the personal portable terminal 10 of the user and authenticates the personal portable terminal 10 so that the user can be authenticated, for example, the user can log in to the PC only by approaching it or can operate the ATM only by approaching it. In the case of PC, users can purchase items on Internet without entering credit-card information which is conventionally required for the purchase on Internet. In the case of ATM, users can withdraw cash without entering their PIN number, and the like. In addition, comments to be shown the user can be changed for each user in ATMs.

On the other hand, because there are problem such as misrecognition in the conventional face authentication or the like, face authentication cannot be solely used for a large number of users. For this reason, face authentication is required to be used together with other inconvenient operation such as entry of telephone number, recognition of IC card, and the like. Contrary to this, in this example, face authentication can be conveniently completed together with the personal portable terminal 10. As a result, face authentication can be conveniently used in immigration examination, at hospital reception desk, and the like. Consequently, two or more security methods such as face authentication and fingerprint authentication can be used by one terminal.

Example 12

(Position Determination Only) (Autonomous Robot (Drone, Etc.), Indoor Mapping, Seat Specification, (Triangulation))

A system according to Example 12 which automatically takes actions relating to authentication of the personal portable terminal 10 is described. Here, description of members same as or similar to those according to Examples 1 to 11 is omitted, and only members different from Example 1 to 11 are described.

Conventionally, autonomous robots such as drone determine their own position by using GPS or estimation of PDR.

However, the accuracy of the position determination is not high. Some autonomous robots estimate their own position based on triangulation measurement by obtaining peripheral images. However, the robots necessarily include two or more cameras. Such construction is not simple. To address this, a position determination technology according to this example is used to improve their convenience. To address this, a position determination technology according to this example is used to improve their convenience.

FIG. 25 shows an exemplary arrangement in which a smartphone terminal or the like serves as a BLE receiver, and three sets of BLE transmitters are arranged at three locations so that a plurality of transmitters are arranged at each location. The number of locations where a set of the BLE transmitters are arranged is not limited to three. Two or more sets of BLE transmitters are arranged at each location as shown in FIG. 25 in the space in which the position of the smartphone terminal or the like is determined. According to this arrangement, the BLE receiver can receive radio waves emitted by a plurality of the BLE transmitters for each location. Intensity of the radio waves from each location can be temporally stably measured by averaging intensities of the radio waves from each location. Three-dimensional information of the sets of BLE transmitters at two or more locations is known in advance. Accordingly, the position of the BLE receiver on a plane or in space can be determined based on triangulation.

FIG. 24 shows an exemplary arrangement in which a smartphone terminal or the like serves as a BLE receiver, and two sets of BLE transmitters are arranged at two locations so that a plurality of transmitters are arranged at each location. The number of locations where a set of the BLE transmitters are arranged is not limited to two (FIG. 24). If two sets of BLE transmitters at two locations are selected as shown in FIG. 27, when an intensity difference between the two locations is obtained, the position of the BLE receiver can be determined within a sufficiently small area (e.g., within a circular area of 10 cm). In this case, a position of a robot can be easily determined only by attaching the BLE receiver to the robot.

As discussed above, according to the embodiments of the present invention, users can pay at an electronic cash register or ticket gate without picking up their smartphone terminal, etc. In particular, moving users who carry their smartphone terminal, etc. can be securely acquired and identified one by one within a short time with high accuracy in a non-contact manner without inconvenience. Therefore, actions of a user required for authentication can be replaced by the automatic touchless operations. A common form and particular form of the present invention can be realized by using a system, a method and a computer program, and a combination of a system, a method and a computer program.

Example 13

(User Authentication and Position Determination) (Event Entrance)

A system according to Example 13 which automates reception of an event by using authentication of the personal portable terminal 10 is described. Here, description of members same as or similar to those according to Examples 1 to 12 is omitted, and only members different from Example 1 to 12 are described.

In business events such as seminar, show and fair, cultural events such as movie, drama and music festival, large commercial parks such as amusement park and ball park, and the like, it takes long time for the people to pass through the gate. The reason is that it takes long time for staffs to retrieve a participant name from a paper of entry list for reception, for participants to show their QR Code, for staffs to tear off tickets, and for participants to hold their QR Code over a scanner at the entrance gate or to insert their ticket into the gate. Such actions are inconvenient for participants or the companies. As a result, time and manpower are required. To address this, a user authentication and position determination technology according to this example is used to improve their convenience.

For example, a tablet which includes the BLE receiver or the like is arranged in a reception desk of the business seminar or cultural event. Event entry application software and event reception application software are installed in users' smartphones and the tablet, respectively, in advance. In the case in which the BLE receiver is arranged, a position of a participant can be determined with a degree of conventional accuracy. A participant who will attend a free or chargeable event installs its entry application software, and completes the event entry registration in advance. Accordingly, the tablet or the like can show names one after another when the participants approach the event place on the date of the event. In this case, when the participant tells his or her name, a reception staff will easily find the name from some event participant names that are listed up on the tablet so that reception of the participant can be completed. Also, in the case in which reception of a participant is completed by tapping the participant name, only names of participants whose reception has not been completed can be shown on the tablet. In this case, because reception can be more quickly completed than conventional systems, the number of reception staffs can be reduced. Alternatively, in the case in which payment or authentication function is not required such as in the case of free event or the like, names or the like can be removed from the list shown on the reception tablet when the participant taps their name so that his or her reception is completed. In this case, when a participant needs help, the participant can summon a reception staff. As a result, the number of reception staffs can be further reduced.

On the other hand, in a chargeable event, participants can pay before the date of the event, pay by credit card or the like which is registered in advance on the date of the event when their reception is completed, or pay in deferred payment after the date of the event.

Also, the position-measuring device 20 can be arranged in shows, large cultural events, large commercial parks, and the like. Because participants can be automatically authenticated and their positions can be determined in both free and chargeable shows, large cultural events, large commercial parks, and the like as discussed above, reception can be completed without humans in attendance.

A position determination system, a position determination device, a position determination method, position determination program, and computer-readable storage medium and storage device according to the embodiments and examples of the present invention can be stably applied to a system which allows users to pay at an electronic cash register or ticket gate without picking up their smartphone terminal, etc.

The invention claimed is:
1. A position determination system comprising:
   a personal portable terminal that is to be carried by a person whose position is determined; and
   a position determination apparatus that determines the position of the personal portable terminal,
   wherein the personal portable terminal includes a personal terminal side transmitter that transmits a position determination signal to be used for position determination to the position determination apparatus, and a personal terminal side controller that controls the personal terminal side transmitter, wherein the position determination apparatus includes a plurality of first and second position determination side receivers that are arranged at different first and second positions which are spaced at first and second distances away from the personal portable terminal, respectively, to receive the position determination signal which is transmitted by the personal terminal side transmitter, the second distance being greater than the first distance, and a position determination side calculator that determines the position of the personal portable terminal based on a difference between an intensity of the position determination signal that is received by the first position determination side receivers and an intensity of the position determination signal that is received by the second position determination side receivers, and wherein the position determination side calculator evaluates a conditional expression in which whether a difference between the average of radio wave intensities of the position determination signal that are received by the first position determination side receivers and the average of radio wave intensities of the position determination signal that are received by the second position determination side receivers is greater than a predetermined threshold is decided to determine the position of the personal portable terminal.

2. The position determination system according to claim 1, wherein the position determination side calculator evaluates a conditional expression in which whether a difference between a radio wave intensity of the position determination signal that is received by the first position determination side receivers and a radio wave intensity of the position determination signal that is received by the second position determination side receivers is greater than a predetermined threshold is decided to determine the position of the personal portable terminal.

3. The position determination system according to claim 1, wherein the personal terminal side controller directs the personal terminal side transmitter to transmit the position determination signal to the position determination apparatus when detecting that the personal portable terminal comes into an area within a predetermined distance from the position determination apparatus.

4. The position determination system according to claim 3 further comprising an activation signal transmitter that is arranged at a position spaced at a predetermined distance away from the position determination apparatus and transmits an activation signal to the personal portable terminal, the activation signal activating the transmission operation in which the personal terminal side transmitter transmits the position determination signal to the position determination apparatus.

5. The position determination system according to claim 1, wherein the personal terminal side transmitter and the position determination side receiver can bidirectionally communicate with each other, and wherein the position determination side calculator performs authentication of the personal portable terminal based on the communication of the position determination side receiver with the personal terminal side transmitter.

6. The position determination system according to claim 5, wherein the personal portable terminal further includes a personal terminal side storage device that stores previously-assigned unique identification information, wherein the personal terminal side controller can provide the unique identification information which is stored in the personal terminal side storage device and a one-time password that is assigned to the unique identification information and can be used only once when communicating with the position determination side receiver through the personal terminal side transmitter, and wherein the position determination side calculator authenticates the identification information and the one-time password which are received from the personal terminal side transmitter through the position determination side receiver.

7. A position determination system comprising:

a personal portable terminal that is to be carried by a person whose position is determined; and a position determination apparatus that determines the position of the personal portable terminal, wherein the personal portable terminal includes a personal terminal side transmitter that transmits a position determination signal to be used for position determination to the position determination apparatus, and a personal terminal side controller that controls the personal terminal side transmitter, wherein the position determination apparatus includes a plurality of first and second position determination side receivers that are arranged at different first and second positions which are spaced at first and second distances away from the personal portable terminal, respectively, to receive the position determination signal which is transmitted by the personal terminal side transmitter, the second distance being greater than the first distance, and a position determination side calculator that determines the position of the personal portable terminal based on a difference between an intensity of the position determination signal that is received by the first position determination side receivers and an intensity of the position determination signal that is received by the second position determination side receivers, wherein the personal terminal side transmitter and the position determination side receiver can bidirectionally communicate with each other, wherein the position determination side calculator performs authentication of the personal portable terminal based on the communication of the position determination side receiver with the personal terminal side transmitter, wherein the personal portable terminal further includes a personal terminal side storage device that stores previously-assigned unique identification information, wherein the personal terminal side controller can provide the unique identification information which is stored in the personal terminal side storage device and a one-time password that is assigned to the unique identification information and can be used only once when communicating with the position determination side receiver through the personal terminal side transmitter, wherein the position determination side calculator authenticates the identification information and the one-time password which are received from the personal terminal side transmitter through the position determination side receiver, wherein the personal portable terminal further includes a personal terminal side clock that issues information relating to a time, wherein the personal terminal side storage device stores a unique common key that is assigned to the identification information which is provided to the personal portable terminal, and is previously exchanged between the personal portable terminal and the position determination apparatus, and a predetermined function that is used to issue the one-time password, wherein the position determination apparatus further includes a position determination side storage device that stores the identification information which is provided to the personal portable terminal and the unique common key which is provided to the identification information so that the associated identification information and unique common key are associates with each other, and a position determination side clock that issues information relating to a time, wherein in the transmission of the identification information and the one-time password by the personal portable terminal to the position determination apparatus, the personal terminal side controller obtains information relating to an issue time from the personal terminal side clock when the one-time password is issued, applies the information to the predetermined function which is stored in the personal terminal side storage device, and further encrypts the information which is obtained by the predetermined function with the common key which is stored in the personal terminal side storage device whereby issuing the one-time password, wherein the position determination side calculator is configured to obtain a reception time by using the position determination side clock when the position determination side receiver receives the identification information and the one-time password from the personal terminal side transmitter, to retrieve the common key corresponding to the identification information from the position determination side storage device based on the received identification information, decrypt the one-time password by using the obtained common key, and obtain the information relating to the issue time to which the function is applied, to compare a difference between the information relating to the issue time that is obtained at one reception time and information relating to the one reception time with a difference between the information relating to the issue time that is obtained at another reception time and information relating to the another reception time, and to authenticate the personal portable terminal if the compared difference falls within a predetermined time range, or disable the authentication of the personal portable terminal if the compared difference falls out of the predetermined time range.

8. The position determination system according to claim 7, wherein the position determination side calculator stores the difference between the information relating to the issue time that is obtained at one reception time and information relating to the one reception time as authentication reference information in the position determination side storage device, and compares the difference between the information relating to the issue time that is obtained at another reception time and information relating to the another reception time with the authentication reference information which is saved in the position determination side storage device whereby performing the authentication of the personal portable terminal.

9. The position determination system according to claim 8, wherein the authentication reference information which is saved in the position determination side storage device is deleted after a predetermined time period elapses.

10. The position determination system according to claim 5, wherein the position determination side calculator makes a payment when authenticating the personal portable terminal.

11. The position determination system according to claim 1, wherein the position determination apparatus further includes a position determination side controller that controls operations for restricting movement of the person who carries the personal portable terminal in accordance with the position of the personal portable terminal that is measured by the position determination side calculator.

12. The position determination system according to claim 11, wherein the position determination apparatus is a gate including a door that opens/closes to control access of the person who carries the personal portable terminal, and the position determination side controller controls opening/closing of the door.

13. The position determination system according to claim 1, wherein the personal terminal side transmitter and the position determination side receiver communicates through BLE, RFID, or Wi-Fi with each other.

14. The position determination system according to claim 1, wherein the personal portable terminal serves as a ticket of public transportation, and the position determination apparatus makes the authentication of the person who carries the personal portable terminal and a payment for the person's ticket.

15. A position determination system comprising:
a personal portable terminal that is to be carried by a person whose position is determined; and
a position determination apparatus that determines the position of the personal portable terminal,
wherein the personal portable terminal includes
a personal terminal side transmitter that bidirectionally communicates with the position determination apparatus,
a personal terminal side controller that controls the personal terminal side transmitter, a personal terminal side storage device that stores unique identification information which is provided to the personal portable terminal, a unique common key that is assigned to the identification information which is previously exchanged between the personal portable terminal and the position determination apparatus, and a predetermined function that is used to issue the one-time password, and
a personal terminal side clock that issues information relating to a time,
wherein the personal terminal side controller includes
a position determination side receiver that bidirectionally communicates with the personal terminal side transmitter,
a position determination side calculator that performs authentication of the personal portable terminal based on the communication of the position determination side receiver with the personal terminal side transmitter, a position determination side storage device that stores the identification information which is provided to the personal portable terminal and the unique common key which is provided to the identification information so that the associated identification information and unique common key are associates with each other, and a position determination side clock that issues information relating to a time, wherein the personal terminal side controller can provide the unique identification information which is stored in the personal terminal side storage device and a one-time password that is assigned to the unique identification information and can be used only once when communicating with the position determination side receiver through the personal terminal side transmitter, wherein the position determination side calculator authenticates the identification information and the one-time password which are received from the personal terminal side transmitter through the position determination side receiver, wherein in the transmission of the identification information and the one-time password by the personal portable terminal to the position determination apparatus, the personal terminal side controller obtains information relating to an issue time from the personal terminal side clock when the one-time password is issued, applies the information to the predetermined function which is stored in the personal terminal side storage device, and further encrypts the information which is obtained by the predetermined function with the common key which is stored in the personal terminal side storage device whereby issuing the one-time password, and wherein the position determination side calculator is configured to obtain a reception time by using the position determination side clock when the position determination side receiver receives the identification information and the one-time password from the personal terminal side transmitter, to retrieve the common key corresponding to the identification information from the position determination side storage device based on the received identification information, decrypt the one-time password by using the obtained common key, and obtain the information relating to the issue time to which the function is applied, to compare a difference between the information relating to the issue time that is obtained at one reception time and information relating to the one reception time with a difference between the information relating to the issue time that is obtained at another reception time and information relating to the another reception time, and to authenticate the personal portable terminal if the compared difference falls within a predetermined time range, or disable the authentication of the personal portable terminal if the compared difference falls out of the predetermined time range.

16. A position determination apparatus which determines the position of a personal portable terminal that is to be carried by a person whose position is determined, the position determination apparatus comprising:

a plurality of first position determination side receivers that are arranged at a first position which is spaced at a first distance away from the personal portable terminal to receive a position determination signal that is transmitted by the personal portable terminal through a personal terminal side transmitter to the position determination apparatus to determine the position of the personal portable terminal;

a plurality of second position determination side receivers that are arranged at a second position which is different from the first position and spaced at a second distance greater than the first distance away from the personal portable terminal, and a position determination side calculator that determines the position of the personal portable terminal based on a difference between an intensity of the position determination signal that is received by the first position determination side receivers and an intensity of the position determination signal that is received by the second position determination side receivers, and wherein the position determination side calculator evaluates a conditional expression in which whether a difference between the average of radio wave intensities of the position determination signal that are received by the first position determination side receivers and the average of radio wave intensities of the position determination signal that are received by the second position determination side receivers is greater than a predetermined threshold is decided to determine the position of the personal portable terminal.

17. A position determination method which is used in a position determination system including a personal portable terminal that is to be carried by a person whose position is determined and a position determination apparatus that determines the position of the personal portable terminal to determine the position of the personal portable terminal, the position determination method comprising:

detecting that the person who carries the personal portable terminal comes into an area within a predetermined distance from the position determination apparatus by using the personal portable terminal, and activating a personal terminal side transmitter by using a personal terminal side controller;

transmitting a position determination signal to be used for position determination to the position determination apparatus through the personal terminal side transmitter by using the personal portable terminal;

receiving the position determination signal which is transmitted by the personal terminal side transmitter through a plurality of first and second position determination side receivers that are arranged at different first and second positions which are spaced at first and second distances away from the personal portable terminal, respectively, by using the position determination apparatus, the second distance being greater than the first distance; and determining the position of the personal portable terminal based on a difference between an intensity of the position determination signal that is received by the first position determination side receivers and an intensity of the position determination signal that is received by the second position determination side receivers by using a position determination side calculator included in the position determination apparatus, wherein the determining of the position of the personal portable terminal includes evaluating a conditional expression in which whether a difference between the average of radio wave intensities of the position determination signal that are received by the first position determination side receivers and the average of radio wave intensities of the position determination signal that are received by the second position determination side receivers is greater than a predetermined threshold is decided to determine the position of the personal portable terminal.

18. A position determination method which is used in a position determination system including a personal portable terminal that is to be carried by a person whose position is determined and a position determination apparatus that determines the position of the personal portable terminal to determine the position of the personal portable terminal, the position determination method comprising:

detecting that the person who carries the personal portable terminal comes into an area within a predetermined distance from the position determination apparatus by using the personal portable terminal, and activating a personal terminal side transmitter by using a personal terminal side controller;

transmitting a position determination signal to be used for position determination to the position determination apparatus through the personal terminal side transmitter by using the personal portable terminal;

receiving the position determination signal which is transmitted by the personal terminal side transmitter through a plurality of first and second position determination side receivers that are arranged at different first and second positions which are spaced at first and second distances away from the personal portable terminal, respectively, by using the position determination apparatus, the second distance being greater than the first distance; and determining the position of the personal portable terminal based on a difference between an intensity of the position determination signal that is received by the first position determination side receivers and an intensity of the position determination signal that is received by the second position determination side receivers by using a position determination side calculator included in the position determination apparatus, the method further comprising prior to the transmission of the position determination signal through the personal terminal side transmitter, transmitting unique identification information that is stored in a personal terminal side storage device included in the personal portable terminal and a one-time password that is assigned to the unique identification information and can be used only once to the position determination side receiver by using the personal terminal side transmitter, performing authentication of the personal portable terminal based on the identification information and the one-time password by using the position determination side calculator, wherein the transmission of the identification information and the one-time password by the personal portable terminal to the position determination apparatus includes obtaining information relating to an issue time when the one-time password is issued by using the personal terminal side controller from a personal terminal side clock included in the personal portable terminal, applying the information to a predetermined function that is stored in the personal terminal side storage device, and further encrypting the information which is obtained by the predetermined function with a common key that is stored in the personal terminal side storage device whereby issuing the one-time password, wherein the authentication of the personal portable terminal based on the identification information and the one-time password by using the determination side calculator includes obtaining a reception time by using the determination side clock when the measurement side receiver receives the identification information and the one-time password from the personal terminal side transmitter, retrieving the common key corresponding to the identification information based on the received identification information, decrypt the one-time password by using the obtained common key, and obtain the information relating to the issue time to which the function is applied, comparing a difference between the information relating to the issue time that is obtained at one reception time and information relating to the one reception time with a difference between the information relating to the issue time that is obtained at another reception time and information relating to the another reception time, and authenticating the personal portable terminal if the compared difference falls within a predetermined time range, or disabling the authentication of the personal portable terminal if the compared difference falls out of the predetermined time range.

19. A non-transitory computer-readable storage medium or storage device recording a position determination program which is used in a position determination system including a personal portable terminal that is to be carried by a person whose position is determined and a position determination apparatus that determines the position of the personal portable terminal to execute a computer to perform:

detecting that the person who carries the personal portable terminal comes into an area within a predetermined distance from the position determination apparatus by using the personal portable terminal, and activating a personal terminal side transmitter by using a personal terminal side controller;

transmitting a position determination signal to be used for position determination to the position determination apparatus through the personal terminal side transmitter by using the personal portable terminal;

receiving the position determination signal which is transmitted by the personal terminal side transmitter through a plurality of first and second position determination side receivers that are arranged at different first and second positions which are spaced at first and second distances away from the personal portable terminal, respectively, by using the position determination apparatus, the second distance being greater than the first distance; and determining the position of the personal portable terminal based on a difference between an intensity of the position determination signal that is received by the first position determination side receivers and an intensity of the position determination signal that is received by the second position determination side receivers by using a position determination side calculator included in the position determination apparatus, wherein the determining of the position of the personal portable terminal includes evaluating a conditional expression in which whether a difference between the average of radio wave intensities of the position determination signal that are received by the first position determination side receivers and the average of radio wave intensities of the position determination signal that are received by the second position determination side receivers is greater than a predetermined threshold is decided to determine the position of the personal portable terminal.

* * * * *